United States Patent [19]

Kaneko et al.

[11] Patent Number: 4,786,971
[45] Date of Patent: Nov. 22, 1988

[54] IMAGE RECORDING AND/OR REPRODUCING APPARATUS

[75] Inventors: Shuzo Kaneko, Tokyo; Tatsuo Takeuchi, Kawasaki; Tsutomu Toyono, Yokohama; Tohru Takahashi, Tokyo; Nagao Hosono, Hachioji; Fumitaka Kan, Tokyo; Akihiko Tojo, Yokohama; Takayoshi Tsutsumi, Tokyo; Ryo Fujimoto, Kawasaki; Yoshiro Udagawa, Tokyo, all of Japan

[73] Assignee: Canon Kabushiki Kaisha, Tokyo, Japan

[21] Appl. No.: 38,337

[22] Filed: Apr. 14, 1987

[30] Foreign Application Priority Data

| Apr. 14, 1986 | [JP] | Japan | 61-85501 |
| Apr. 14, 1986 | [JP] | Japan | 61-85502 |
| Apr. 14, 1986 | [JP] | Japan | 61-85503 |
| Apr. 14, 1986 | [JP] | Japan | 61-85504 |
| Apr. 14, 1986 | [JP] | Japan | 61-85505 |
| May 10, 1986 | [JP] | Japan | 61-107354 |
| May 10, 1986 | [JP] | Japan | 61-107355 |
| Jun. 11, 1986 | [JP] | Japan | 61-136770 |
| Jun. 11, 1986 | [JP] | Japan | 61-136771 |
| Jun. 17, 1986 | [JP] | Japan | 61-141018 |
| Jun. 17, 1986 | [JP] | Japan | 61-141019 |
| Jun. 19, 1986 | [JP] | Japan | 61-143879 |
| Jun. 19, 1986 | [JP] | Japan | 61-143880 |
| Jun. 19, 1986 | [JP] | Japan | 61-143881 |

[51] Int. Cl.⁴ .............. H04N 1/29; H04N 5/335; H04N 5/80
[52] U.S. Cl. .................... 358/209; 354/121; 358/335; 358/338; 358/909; 358/80; 365/106; 365/215; 365/234
[58] Field of Search .......... 358/209, 213.11, 212, 358/909, 906, 335, 338, 80; 365/106, 112, 114, 115, 215, 234; 352/102; 354/105, 121; 355/67

[56] References Cited

U.S. PATENT DOCUMENTS

| 3,855,583 | 12/1974 | Gudmundsen | 365/114 |
| 4,022,968 | 5/1977 | Keizer | 358/338 |
| 4,143,966 | 3/1979 | Gandini | 355/67 |
| 4,290,676 | 9/1981 | Hozman | 354/121 |
| 4,310,848 | 1/1982 | Carter | 358/80 |
| 4,340,286 | 7/1982 | Carr | 354/105 |
| 4,420,773 | 12/1983 | Toyoda | 358/335 |
| 4,489,351 | 12/1984 | d'Arc | 358/209 |
| 4,584,615 | 4/1986 | Fisch | 352/102 |
| 4,652,926 | 3/1987 | Withers | 358/909 |

Primary Examiner—Howard W. Britton
Attorney, Agent, or Firm—Fitzpatrick, Cella, Harper & Scinto

[57] ABSTRACT

An image recording and/or reproducing apparatus including a recording unit having a recording driving mechanism for recording a plurality of images in the form of electrostatic pattern on different regions of a photosensitive member, a reading unit having a beam source and capable of scanning the photosensitive member by an electron beam so as to convert the recorded pattern into electric signals, and a connecting member for connecting the recording unit and the reading unit without causing any change in the states of these units. This apparatus makes it possible to record and/or to reproduce images with a high image quality. The connecting member includes a container accommodating the recording unit and the reading unit. Alternatively, the connecting member is adapted to keep a portion of the recoding unit and a portion of the reading unit in close contact with each other.

54 Claims, 44 Drawing Sheets

SHUTTER ON
L

FIG.16
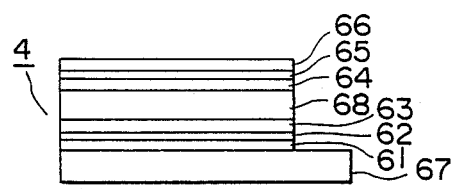
FIG.17A  FIG.17B
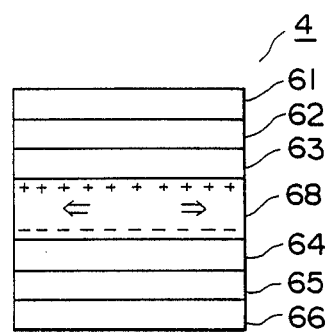 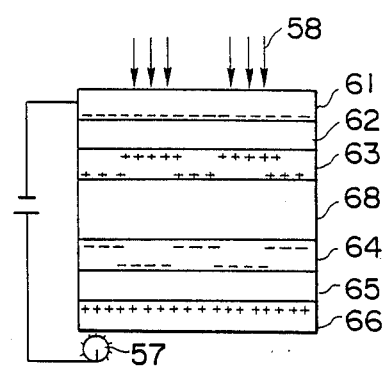
FIG.17C  FIG.17D
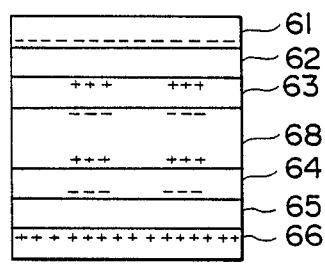 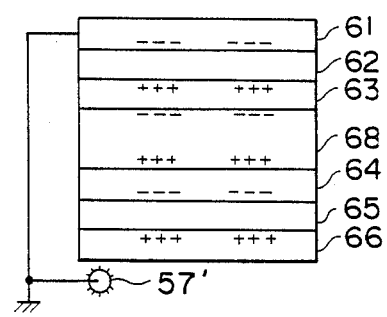

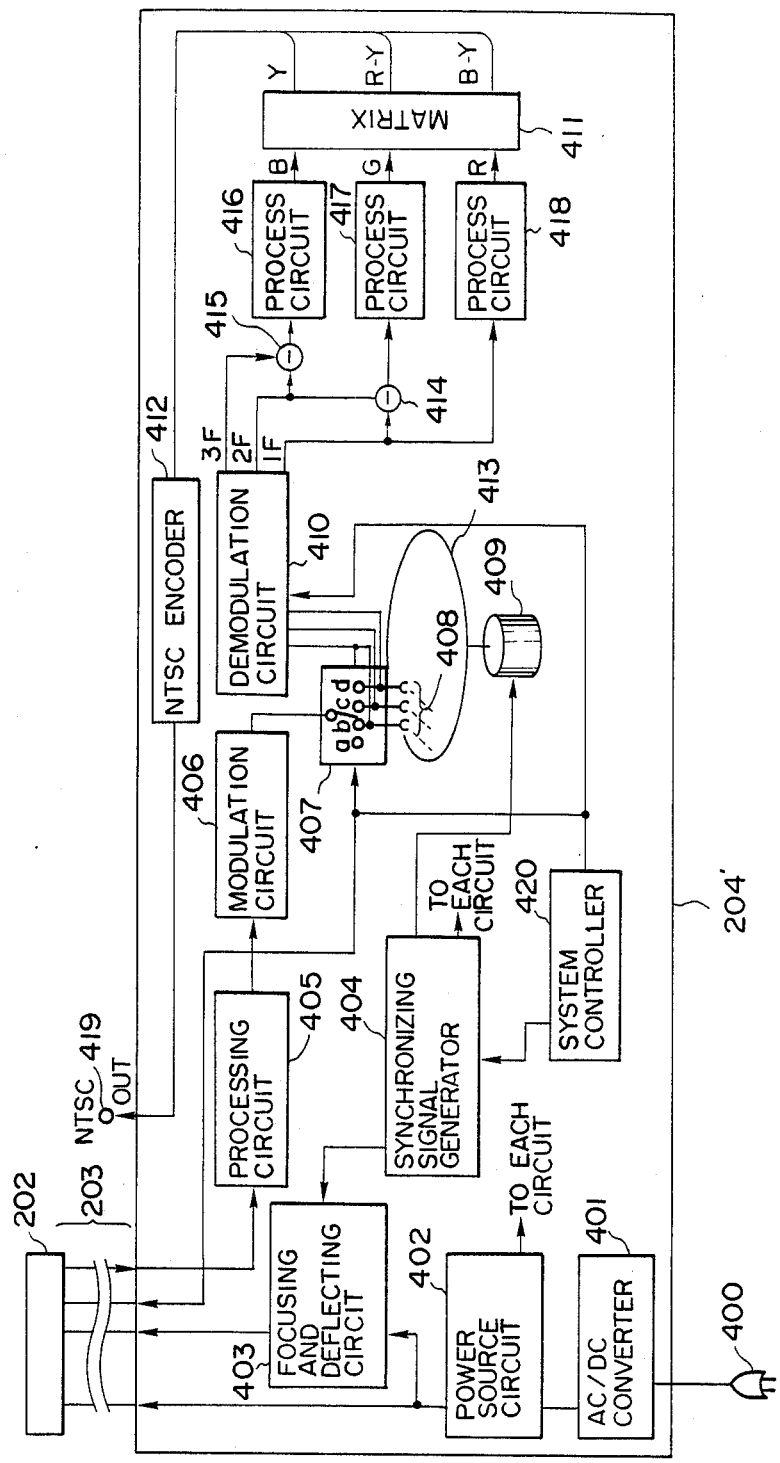

FIG.31A
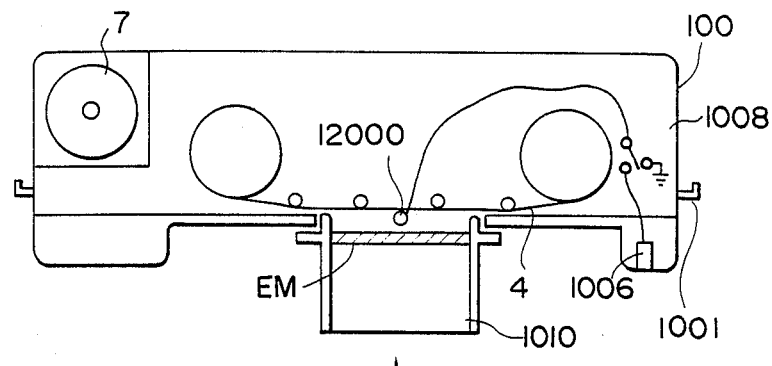
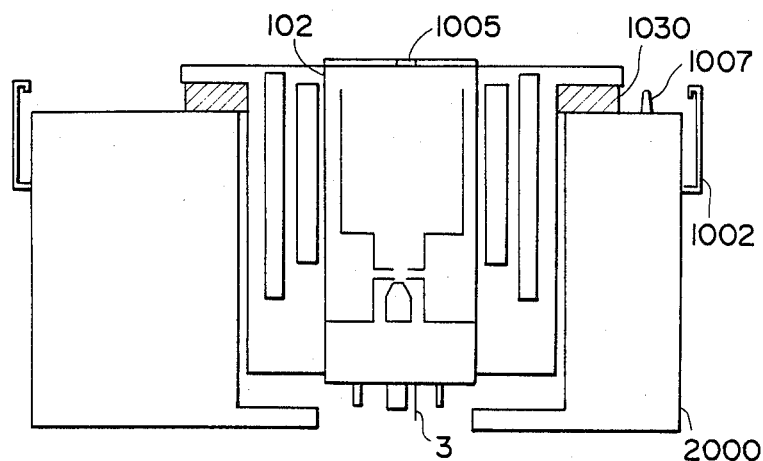
FIG.31B
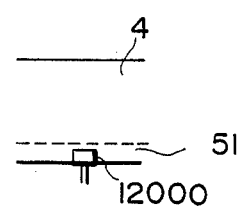

IMAGE RECORDING AND/OR REPRODUCING APPARATUS

BACKGROUND OF THE INVENTION

The present invention relates to an image recording and/or reproducing apparatus capable of recording and/or reproducing an optical image of, for example, an original document or scenery in the form of an electrostatic pattern. More particularly, the invention is concerned with a simple and light-weight apparatus capable of recording the optical image in the form of electric signals and/or outputting the same to an external device in the form of electrical signals.

Hitherto, various image recording systems have been proposed, including an electrophotographic system in which an electrostatic latent image formed through an optical system on a copying medium is developed by a liquid or dry toner and is then transferred to a recording medium, as well as a system in which an original image is read by a digital photoelectric device making use of a CCD (Charge Coupling Device) and converted into electrical output signals.

The image recording apparatus making use of electrophotography enables an image to be formed with high degrees of density and clarity in a multiplicity of gradations, but suffers from the disadvantage that the size and weight of the image recording apparatus are inevitably increased for obtaining large-sized recorded images, insofar as the development of the latent image relies upon application of toner directly to the recording medium. This problem is serious particularly in the development of a color image, which requires a plurality of latent-image forming media, as well as a plurality of kinds of toner. The use of a plurality of media and a plurality of toners is undesirable also from the view point of maintenance and operation cost of the apparatus.

On the other hand, the system incorporating a digital photoelectric conversion device such as a CCD requires the original to be scanned mechanically by the photoelectric conversion device when the latter is composed of a one-dimensional array of photoelectric conversion elements. When the device is composed of elements which are arranged two-dimensionally, the elements have to be arranged with a high degree of density and fineness, in order to read a dense image with a high degree of resolution, with the result that the cost of the apparatus is increased undesirably. In addition, an external memory has to be employed in order to store the read image information. In addition, it is necessary to provide color filters on the surface of the CCD, when the image to be read is a color image. This further raises the cost of production of the apparatus of this kind.

An image recording system also has been known in which an image is converted into electrical signals by means of vacuum tubes, as in the cases of systems which employ an image orthicon or a vidicon. This system enables the original image to be read at a high speed and with a high degree of resolution without necessitating a fine arrangement of the reading elements. However, this system also requires an external memory such as a video tape for recording the read image. The external memory device, and the power unit for activating the vacuum tubes, are of considerably large sizes and weight, so that this system is not suitable for use where a high degree of handiness or portability is required.

Also known is an image recording system which relies upon silver halide photography. This system can record an image at a high resolution and enables the recorded image to be left on a film for a long time, thus allowing an image-recording portion such as a camera to be handled independently of the film and vice versa. This feature is very helpful because the user needs only to carry the image-recording portion, i.e., the camera. This system, however, is disadvantageous in that the film as the medium for carrying an image cannot be used repeatedly and in that a complicated system and troublesome work is required for developing the latent image by means of chemical agents such as a developer.

SUMMARY OF THE INVENTION

Accordingly, an object of the present invention is to provide an image recording and/or reproducing apparatus which has a high degree of portability and which is capable of recording an image with a high density or resolution on a reusable recording medium and outputting or storing the recorded image in the form of electrical signals.

Another object of the present invention is to provide an image recording and/or reproducing apparatus capable of recording or storing a color image with a high degree of resolution.

Still another object of the present invention is to provide an image recording and/or reproducing apparatus which makes use of an electron beam, wherein the electron beam used for the purpose of reading an image can easily be aligned with the desired one of a plurality of image frames recorded in the apparatus.

A further object of the present invention is to provide an image recording and/or reproducing apparatus which has a high degree of portability and which is capable of recording an image with a high density or resolution on a reusable recording medium and outputting or storing the recorded image in the form of electrical signals, while ensuring a good color balance of the image to be recorded or output.

A still further object of the present invention is to provide an image recording and/or reproducing apparatus which is capable of eliminating any unfavorable effect which may otherwise be caused by electrostatic charges.

A still further object of the present invention is to provide an image recording and/or reproducing apparatus which has a compact power source.

A still further object of the present invention is to provide an image recording and/or reproducing apparatus in which photoelectric conversion means in a vacuum container can be displaced by a simple arrangement.

A still further object of the present invention is to provide an image recording and/or reproducing apparatus in which the scanning with a beam emitted from a beam generator can be effected by a simple arrangement.

A further object of the present invention is to provide an image recording and/or reproducing apparatus which employs a flexible photosensitive material of the photoelectric conversion type, wherein an image can be recorded on such a photosensitive material with a high degree of flatness.

A further object of the present invention is to provide an image recording and/or reproducing apparatus capable of recording and/or reproducing an image on or from a simple photoelectric conversion member of a high degree of flatness.

A further object of the present invention is to provide an image recording and/or reproducing apparatus which is improved to attain a high positional accuracy of the scanning of the image.

A further object of the present invention is to provide an image recording and/or reproducing apparatus which is improved to facilitate searching over a plurality of recorded images.

A further object of the present invention is to provide an image recording and/or reproducing apparatus capable of recording and/or reproducing a large number of images.

To these ends, according to one form of the present invention, there is provided an image recording and/or reproducing apparatus comprising: a recording unit including recording driving means for recording a plurality of optical images in the form of electrostatic patterns on different portions of a photosensitive member; a reading unit including a reading means which scans the photosensitive member with an electron beam so as to convert the pattern into electrical signals and for outputting the electrical signals; and coupling means for coupling the recording unit and the reading unit without causing any change in the states of the recording unit and the reading unit.

With this arrangement, recording and reading of images can be conducted independently without causing any change in the states of the images, by virtue of the use of an image accumulating member. It is thus possible to record images of high density by an apparatus having a high degree of portability, thereby eliminating drawbacks of the conventional image recording apparatus.

According to another form of the present invention, there is provided an image recording and/or reproducing apparatus comprising: a photoelectric conversion member for converting an optical image into electrical image data, the photoelectric conversion member is arranged in the form of a thin film on a base member; and means for applying light from predetermined optical images to different areas on the photoelectric conversion member, thus accumulating a plurality of images on the photoelectric conversion member.

With this arrangement, it is possible to accumulate images easily without necessitating any specific semiconductor ICs or magnetic disks, and reading of the recorded image, as well as rewriting of the image, is facilitated advantageously.

According to still another form of the present invention, there is provided an image recording and/or reproducing apparatus comprising: photoelectric conversion means for converting an optical image into electrical image data and for accumulating the electrical image data; scanning means for scanning the photoelectric conversion means with a beam; displacing means for displacing the photoelectric conversion means with respect to the scanning means and for holding a plurality of pieces of the photoelectric conversion means in a stack; and control means for equalizing the levels of potential of the obverse and reverse sides of the photoelectric conversion means previously held by the displacing means.

With this arrangement, it is possible to easily record an image of a high quality and to prevent destruction of the photoelectric conversion member by generation of electrostatic charges.

According to still another form of the invention, there is provided an image recording and/or reproducing apparatus comprising: photoelectric conversion means for converting an optical image into electrical image data and for accumulating the electrical image data; scanning means for scanning the photoelectric conversion means with a beam; displacing means for displacing the photoelectric conversion means with respect to the scanning means; an internal power supply for supplying electric power to internal circuits other than the scanning means; and a connector for connecting an external power supply for the purpose of supplying electric power at least to the scanning means.

With this arrangement, it is possible to easily record and reproduce images of high qualities, while minimizing the requirement for the internal power supply, thus realizing a high portability of the image recording and/or reproducing apparatus.

According to a further form of the present invention, there is provided an image recording and/or reproducing apparatus comprising: photoelectric conversion means for converting an optical image into electrical image data and for accumulating the electrical image data; scanning means for scanning the photoelectric conversion means with a beam; displacing means for displacing the photoelectric conversion means with respect to the scanning means; a vacuum container housing the photoelectric conversion means, scanning means and displacing means; and driving means for driving the displacing means by applying an electromagnetic force externally of the vacuum container.

According to a further form of the present invention, there is provided an image recording and/or reproducing apparatus comprising: a photosensitive member; driving means for moving the photosensitive member; scanning means for scanning the photosensitive member with a beam; a vacuum container housing the photosensitive member; and an optical system through which optical data is supplied to the photosensitive member from the outside of the vacuum container.

With these arrangements, it is possible to record and reproduce images with high quality and to store a good deal of images with a simple construction of the apparatus.

According to a further form of the present invention, there is provided an image recording and/or reproducing apparatus comprising: a photoelectric conversion member capable of converting an optical image into electrical image data and constructed as a thin film formed on a base member; and optical means for applying light of an optical image successively to different areas on the photoelectric conversion member so as to enable a plurality of images to be accumulated on the photoelectric conversion member, the optical means including a plurality of color filters which are arranged in a dispersed manner.

This arrangement enables a simple construction to accumulate a plurality of still images on a photoelectric conversion member. Since the lights from the optical image are applied by the optical means to the photoelectric conversion member through a plurality of dispersed color filters, each still image can contain color data which can be decomposed into respective colors, whereby color still image data can easily be read after recording.

In the apparatus of the invention, it is possible to effect the main scanning by means of a beam generator so as to read an electrostatic pattern signal from the photosensitive member, while effecting a sub-scan by moving the photosensitive member with respect to the beam generator. It is thus possible to simplify the construction of the beam generator. In addition, the arrangement for effecting the sub-scan is utilized as driving means for forming a plurality of still images on the photosensitive member. As a consequence, the construction of the image recording and/or reproducing apparatus is remarkably simplified.

According to a further form of the present invention, there is provided an image recording and/or reproducing apparatus comprising: a photosensitive member capable of recording a plurality of image patterns on different portions thereof; driving means for moving the photosensitive member; reading means for scanning the photosensitive member with a beam so as to convert the data recorded on the photosensitive member into electrical signals; a container hermetically accommodating at least the photosensitive member; and control means for controlling the driving means so as to selectively press a part of the photosensitive member to the inner wall surface of the container.

With this arrangement, the photosensitive member and the reading means for reading the data by a beam are accommodated in the hermetic container, and the photosensitive member is selectively pressed by the control means. It is therefore possible to correctly locate the photosensitive member by making use of the inner wall surface of the container as locating means. The pressing of the photosensitive material onto the inner wall surface of the container also contributes to the stabilization of the flatness of the photosensitive member. In this apparatus, therefore, it is possible to attain a high resolution of the recorded image. In addition, the risk for the photosensitive member to be exposed to undesirable light is avoided during exposure to the image to be recorded.

According to a further form of the present invention, there is provided an image recording and/or reproducing apparatus comprising: a photosensitive member; driving means for moving the photosensitive member; scanning means for scanning the photosensitive member with a beam; a vacuum container housing the photosensitive member, driving means and scanning means; an optical system through which optical data is introduced to the photosensitive member from the outside of the container; fixing means for integrally fixing the vacuum container and the optical system to each other; and a resilient member for resiliently supporting the integral vacuum container and optical system on a camera body.

With this arrangement, any risk of the vacuum container being broken is avoided even when an impact is applied to the camera body. In addition, any misalignment of optical axis between the vacuum container and the optical system is avoided because the vacuum container and the optical system are integrally fixed to each other.

According to a further form of the present invention, there is provided an image recording and/or reproducing apparatus comprising: a photoelectric conversion member for converting an optical image into electrical image data, the photoelectric conversion member being constructed as a thin film formed on a predetermined base and adapted to be moved in a predetermined direction; and means for introducing lights of a plurality of optical images to different areas of the photoelectric conversion member which are arrayed in the direction perpendicular to the direction of movement of the photoelectric conversion.

In this apparatus, the photosensitive member is formed as a thin film on a predetermined base, and is movable in a predetermined direction. In addition, lights from a plurality of optical images are introduced to different areas which are arranged in a direction perpendicular to the direction of movement of the photoelectric conversion member. It is therefore possible to accumulate a plurality of images in areas arranged in the direction of movement of the photosensitive member. Furthermore, a plurality of images are accumulated in areas which are arranged in the direction perpendicular to the direction of movement of the photosensitive member. It is, therefore, possible to accumulate a large quantity of image data without causing any extreme deformation of the photoelectric conversion member. In addition, this apparatus can easily be applied to recording and reproduction of color images. In a specific form of this apparatus, recording of an image and reading of an image can be conducted independently of each other without causing any change in the states of the image, by virtue of the use of the photosensitive member which can accumulate images thereon. This in turn enables an image of a high density to be recorded by an apparatus which is easy to carry, thus remarkably extending the use of the apparatus of the kind described. It is also possible to attain a high accuracy of scanning of the images with the beam, by providing reference marks in the respective images accumulated in the photosensitive member serving as an image accumulator.

According to a further form of the present invention, there is provided an image recording and/or reproducing apparatus comprising: a photoelectric conversion member capable of converting an optical image into electrical image data and constructed as a thin film formed on a disk-like base, the photoelectric conversion member being rotatable so that different portions thereof can receive lights from optical images; and means for introducing lights from a plurality of optical images to different areas on the photoelectric conversion member arrayed in the radial direction of the photoelectric conversion member at each angular position of the photoelectric conversion member.

In this apparatus, the photoelectric conversion member is provided in the form of a thin film on the disk-shaped base. The base carrying the photosensitive member is rotatable so that images can be stored in different areas arranged in the circumferential direction of the photosensitive member. In addition, images are formed also in a plurality of areas which are defined in the radial direction for each angular position of the photosensitive member. It is therefore possible to accumulate a good deal of image data by making use of a limited area of the photosensitive member as a whole. In addition, undesirable charging is avoided and recording and reproduction of color image are facilitated.

According to a further form of the present invention, there is provided an image recording and/or reproducing apparatus comprising: accumulating means for accumulating object images in the form of color images; and reference color forming means for accumulating the color of a light source on another portion of the accumulating means through color filters having different spectral characteristics.

With this arrangement, the accumulating means can accumulate objective images in the form of color images, together with the light source data formed by the reference color forming means, thus facilitating a post-processing for attaining a color balance.

According to a further form of the present invention, there is provided an image recording and/or reproducing apparatus comprising: a beam generator having a window portion in the form of a thin film for introducing an electron beam to a photoelectric conversion member disposed in the vicinity of the beam generator and carrying electrical image data accumulated thereon; and scanning means for scanning the photoelectric conversion member with the electron beam; wherein the photoelectric conversion member in which still image data are accumulated on different areas thereon is selectively moved to bring the areas to a position in the vicinity of the beam generator, thus enabling the still image data to be read by the electron beam.

According to a further form of the present invention, there is provided an image recording and/or reproducing apparatus comprising: a beam generator having a window portion in the form of a thin film for introducing an electron beam to a photoelectric conversion member disposed in the vicinity of the beam generator and carrying electrical image data accumulated thereon; and scanning means for scanning the photoelectric conversion member with the electron beam, thus enabling the still image data to be read by the electron beam.

According to a further form of the present invention, there is provided an image recording and/or reproducing apparatus comprising: photoelectric conversion means for converting an optical image formed by an optical system into electrical image data; displacing means for displacing the optical system and the photoelectric conversion member relative to each other so as to accumulate still image data on a plurality of areas of the photoelectric conversion member; and biasing means for controlling the potential of a predetermined portion of the photoelectric conversion member.

According to these arrangements, the recording of an image and reading of an image can be conducted independently of each other without causing any change in the states of the image, by virtue of the use of the photosensitive member which can accumulate images thereon. This in turn enables an image of a high density to be recorded by an apparatus which is easy to carry, thus remarkably extending the use of the apparatus of the kind described. Furthermore, the beam can effectively be applied to the image-accumulating member by virtue of the window in the form of a thin film provided in the beam generator for the purpose of guiding the electron beam from the beam generator to the outside of the same.

These and other objects, features and advantages of the invention will become clear from the following description of the preferred embodiments when the same is read in conjunction with the accompanying drawings.

BRIEF DESCRIPTION OF THE DRAWINGS

FIG. 16 is a schematic sectional view of a fourth example of the image accumulator;

FIGS. 17A to 17D are illustration of a method for recording images on the image accumulator shown in FIG. 16;

FIG. 25 is a block diagram of the construction of the recording and reproducing apparatus 204 in accordance with the embodiment shown in FIG. 23;

FIGS. 31A and 31B are schematic views of an eleventh embodiment of the image recording and/or reproducing apparatus in accordance with the present invention;

FIG. 36A is a schematic front view of accumulator 4;

FIG. 36B is a schematic side view of holder 102 for holding accumulator 4; and

FIG. 36C is a schematic side view of accumulator 4 and an optical system of the present invention;

FIGS. 37A and 37B are schematic views of a sixteenth embodiment of the image recording and/or reproducing apparatus in accordance with the present invention, wherein FIG. 37A is a schematic front view and FIG. 37B is a schematic side view of accumulator 4;

DESCRIPTION OF THE PREFERRED EMBODIMENTS

Figure 1:
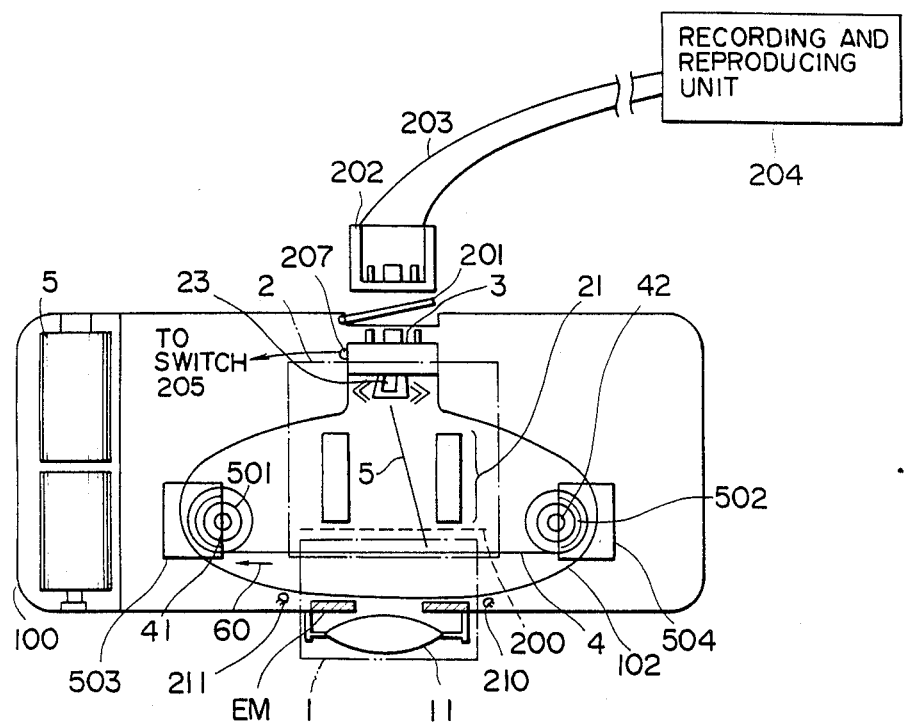
FIG. 1 is a schematic, partially cut away, top view of a first embodiment of an image recording and/or reproducing apparatus in accordance with the present invention.
Figure 2:
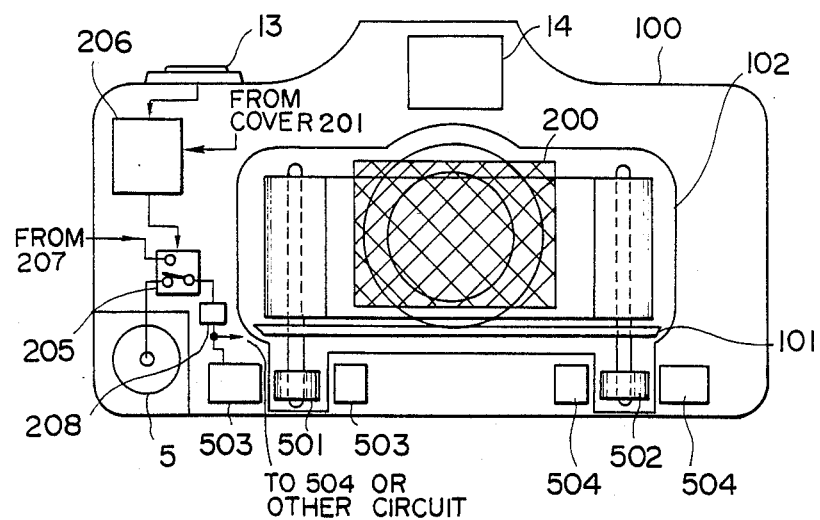
FIG. 2 is a partially cut away front elevational view of the embodiment shown in FIG. 1.

FIG. 1 is a view of an embodiment of the image recording and/or reproducing apparatus in accordance with the present invention as viewed from the upper side, while FIG. 2 is a view of the embodiment shown in FIG. 1 as viewed from front side thereof.

This image recording and/or reproducing apparatus basically has an image accumulator 4 constituted by a thin film capable of electronically accumulating images, an image recording part 1 including an optical exposure member for exposing the image accumulator to an original image, an image reading part 2 for scanning the image accumulator 4 with an electron beam, and a connector part including input terminals for connecting the apparatus to an external power supply for driving the reading part 2 and to an external drive circuit for inputting convergence and deflection signals and output terminals for delivering the signals to an external memory.

To explain in more detail, the recording part 1 incorporates an optical system 11 and an exposure member EM containing an aperture and a shutter. The exposure member EM is capable of controlling the quantity of the light passed by the optical system 11, as well as the time for which the light is applied to the image accumulator through the optical system.

A reference numeral 102 designates a holder container accommodating the image accumulator 4 which is wound at its both ends on winding shafts 41 and 42 so as to be stretched between these shafts. Rotary magnets 501 and 502 are fixed to one ends of the winding shafts 41 and 42. These shafts 41 and 42 are rotatably carried by bearings (not shown) on a stage 101 for rotation together with the rotary magnets 501 and 502. Driving coils 503 and 504 for applying rotational magnetic fields to the magnets 501 and 502 are mounted externally of the container 102. The stage 101, which is omitted from FIG. 1, carries a beam scanning part 21 fixed thereto. The beam scanning part forms an electric field or a magnetic field, the intensity of which is variable to deflect an electron beam emitted from the electron gun 23, thus scanning the predetermined image on the accumulating member.

The beam emitted from the electron gun 23 is deflected through the beam scanning part 21 and is applied to the image accumulator 4 through the mesh electrode 200. The secondary electrons emitted from the accumulating member is detected by the mesh electrode 200. A lead line (not shown) is laid on the inner surface of a wall of the container 102 so as to connect the mesh electrode 200 to the output terminal in the connector portion 3.

Preferably, a predetermined positive bias is applied to the mesh electrode through the lead line.

The winding shafts 41, 42, magnets 501, 502, stage 101, beam scanning part 21, electron gun 23 and other related parts are accommodated by the container 102. The interior of the container 102 is evacuated to a vacuum.

The terminals for the supply of power to the electron gun 23 and the beam scanning part 21, signal input terminals and output terminals are collectively provided in the connector part 3 which can be exposed to the outside of a camera which is designated at a numeral 100, but is usually covered by a cover 201. A reference numeral 202 designates a connector through which a source beam converging deflection signal is supplied to the camera 100 through via a cable 203 from the recording and reproducing unit 204. The connector 202 can connect to the connector 3 when the cover 201 is opened. A reference numeral 207 denotes an external power supply terminal provided in the connector 3. When the connector 202 is connected to the connector 3, the power from the recording and/or reproducing apparatus is supplied also to the terminal 207. The terminal 207 is connected to one end of the switch 205. The switch 205 is connected at its other end to an internal power supply from a battery pack 5. These two types of power supply selectively supply electric power to a drive circuit 208 which drives coils 503, 504 and other electric circuits. A reference numeral 206 designates a system controller which receives signals for operating a shutter switch 13, cover 201 and so forth. The arrangement is such that the switch 205 is connected to the terminal 207 and to the battery pack 5, respectively, as the cover 201 is opened and closed.

Light emitting diodes (LEDs) 210 and 211 are adapted for applying light to the image accumulator 4, as will be explained later. A reference numeral 14 designates a finder.

According to this arrangement, when the image is being recorded through the camera 100, power is supplied to the drive circuit 208 from the battery pack in the camera, so that the image accumulator 4 is moved intermittently at a predetermined timing, whereby the optical images are recorded in the form of latent images in successive frames on the image accumulator 4.

For reading the recorded image data, the connector 202 of the recording and reproducing unit 204 is connected to the connector 3 of the camera 100. As a result of the opening of the cover 201 in advance of the connection of the connector 202 to the connector 3, the power supply line is changed-over by the switch 205, thus enabling the power supply in the recording and/or reproducing apparatus to supply the power.

Thus, the camera can have a reduced size by virtue of the compact arrangement of the power supply so that it can be handled and carried easily.

In addition, since the external power supply and the internal power supply are automatically changed-over in response to the connection and disconnection of the connectors 3 and 202 to and from each other, the internal power supply in the camera, which has only a limited capacity, is not consumed during reading of the image data from the accumulating member.

In the described embodiment, the image accumulator 4 is sealed in a vacuum chamber and is constructed so as to be moved by an operation from the outside of the container, so that a large quantity of image data can be accumulated on the image accumulator 4.

In addition, the reading of the stored image data can be conducted by a simple operation without necessitating any specific large-sized apparatus which heretofore has been necessary.

Furthermore, the drive shafts for moving the image accumulator 4 are actuated an electromagnetic force which is applied externally of the container, so that the maintenance of vacuum in the container is easier as compared with the case where the driving motor is installed in the container.

The image can be stored in the image accumulator 4 in the form of electronic latent image pattern such as an electrostatic latent image or a latent image formed by electronic trap distribution.

When the latent image pattern of the type mentioned above is scanned by an electron beam, secondary electrons are discharged in accordance with the density of the latent image, so that the contrast of the image is detected as a difference in the quantity of the secondary electrons discharged from the image accumulator. It is therefore possible to read the image by converting the latent image into electrical signals.

Although the image accumulator 4 in the described embodiment is a tape-like member, the invention is not limited thereto and the image accumulator 4 may be constructed as a planar member formed on a rotary disk having a glass substrate. It is also possible to construct the image accumulator 4 as a thin film formed on a glass slide which is adapted to be moved linearly thus allowing a plurality of still images to be formed thereon. This arrangement ensures a high level of flatness of the image accumulator.

It is also to be understood that the reading of the latent image can be done through detection of electron beam reflected by the image accumulator, although in the second embodiment the latent image is read through sensing the secondary electrons by means of a slit electrode.

The constructions of various portions constituting the image recording and/or reproducing apparatus of the present invention will be described hereinunder.

The description will first mention the image accumulator and the method of recording an image on such an image accumulator.

Figure 3:
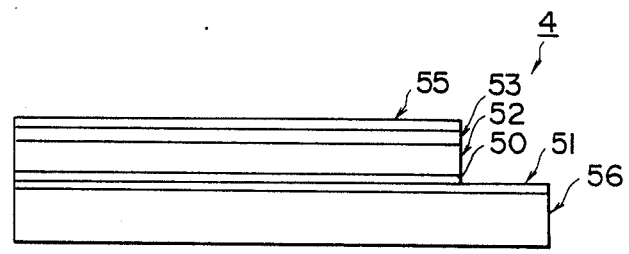
FIG. 3 is a longitudinal partial view of an image accumulator used in the embodiments shown in FIGS. 1 and 2.

FIG. 3 is a longitudinal partial view of the image accumulator which is suitable for use in the embodiment shown in FIGS. 1 and 2. The image accumulator as the whole has a form of a film constituted by a transparent substrate film 56, a barrier layer 50, a transparent conductive layer 51, an N-type photoconductive layer 52, a transparent insulating layer 53 and a semiconductor layer 55 which are laminated in the above mentioned sequence.

The nature of each layer will be explained hereinunder. The substrate film 56 is made of a material which has high levels of flexibility and light-transmittance and which exhibits a strength large enough to prevent any breakage or tearing when tensed during film loading. Preferably, the substrate film 56 is made of a polymeric material such as polyethylene terephthalate, polyimide or the like. In order to attain the desired properties, the thickness of the substrate film 56 ranges between 10 and 50 μm, and 5 and 50 μm, respectively, when polyethylene terephthalate and polyimide are used as the material. It is also preferred that, when the image accumulator 4 is constructed as a rotary disk, the substrate is formed of a glass sheet having a thickness of about 100 μm.

The transparent conductive layer 51 is made of tin oxide, indium oxide or a mixture of indium oxide and tin oxide with small content of tin oxide. This layer 51 is formed by a known method such as spattering. In order to ensure a high light transmittance and electrical conductivity, this layer 51 preferably has a thickness on the order of several of tens to several of hundreds of nm.

The N-type photoconductive layer 52 is formed by evaporation deposition or spattering from an N-type photoconductive material such as CdS, CdSe and ZnO. The thickness of this layer is selected to provide a sufficiently large quantity of electron-hole pairs in response to light impinging thereon, while ensuring high insulation in the dark regions and reducing the internal scattering of light to a negligible level. Thus, the thickness of this layer preferably ranges between 100 nm and several μm.

The insulating layer 53 is a thin film of a material having a high insulating nature, e.g., $SiO_2$, MgO or the like formed by spattering or a similar method. In order that this layer 53 may exhibit a high insulating power, the thickness of this layer preferably ranges between several hundreds of nm and several tens of μm.

The semiconductor layer 55 is intended for protecting the conductive layer from the beam. To this end, this layer 55 is made of a glass or a porous material such as KCl (potassium chloride) which exhibits higher resistance along its surface than in the thicknesswise direction thereof, as well as a high insulating power. The thickness of this layer should be determined to be sufficiently small for the pitch of resolution of the image to be formed. For instance, for the purpose of obtaining a resolution on the order of 1000 pieces/mm, the film thickness should range between several nm and several hundreds of nm.

The barrier layer 50 provided between the photoconductive layer 52 and the transparent conductive layer 50 is intended for preventing any dark attenuation and injection of negative charge in the dark areas. This layer 50 is formed by spattering from $CdSO_3$, $CdSeO_3$ or the like material, and has a thickness of 2 to several tens of nm.

Figure 4A:
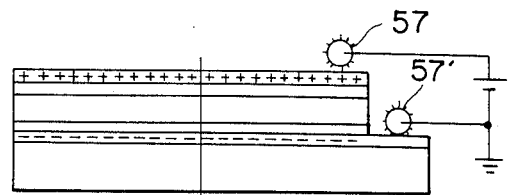
FIGS. 4A to 4D are illustrations of a method for recording image data on the image accumulator shown in FIG. 3.

A description will be made hereinunder as to the method for recording an image on the image accumulator, with specific reference to FIGS. 4A to 4C.

Figure 4B:
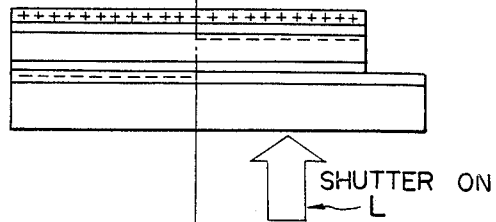

Positive charges are imparted to the semiconductor layer 55 by means of a conductive brush or rolls 57, 57' in a dark place, while grounding the transparent conductive layer 51 or keeping the same at a negative potential. The thus applied positive charges are injected through the semiconductor layer 55 without delay. Then, the exposure member EM shown in FIG. 1 is opened so as to expose the image accumulator to an image. As a result, the resistance of the photoconductive layer 52 is lowered in the region where the light L is applied so that the negative charges are injected into the photoconductive layer 52 through the barrier layer, as shown in FIG. 4B. Then, after closing the exposure member EM, the transparent conductive layer 51 is grounded so that the positive charges in the dark areas and the negative charges in the transparent conductive layer 51 are negated by each other through the conductive brush or the rolls 59, 59' contacting the grounded transparent conductive layer 51. At the same time, the charges are distributed to the semiconductor layer 55 and the transparent conductive layer 51 such that the surface potential of the bright region becomes zero. Then, while grounding the transparent conductive layer 51, the whole area of the image accumulator 4 is exposed to the light from the LEDs 210 and 211, so that the electrical resistance is reduced in the photoconductive layer 52, so that the positive and negative charges across the photoconductive layer are negated by each other. In consequence, charges appear only across the insulating layer 53 as shown in FIG. 4D, and the image is recorded in such a manner to leave positive charges on the surface.

The image accumulator and the image recording method described hereinbefore offer the following advantages. First of all, it is to be appreciated that the image accumulator can be produced with a high degree of uniformity because it can be formed by spattering of the successive layers. This advantageously reduces the factors which would cause any unevenness in the recorded images. In addition, a high rate of absorption of light and, hence, a high sensitivity are attained by the use of the thin photosensitive (photoconductive) layer. The use of the photoconductive material in the form of a thin film increases the resolution of the image to a level which is more than ten times as large as that obtained by the prior art.

Figure 5:
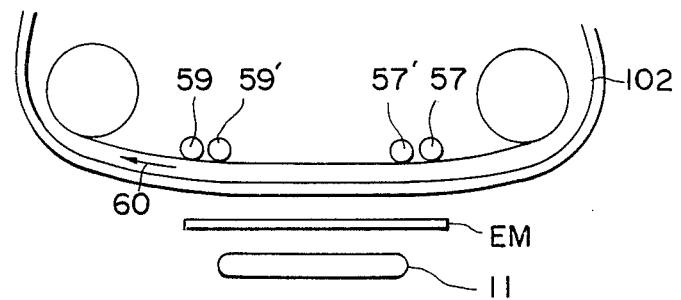
FIG. 5 is a top plan view of a recording part of the apparatus employing the image accumulator shown in FIG. 3.

FIGS. 5 and 6 show the detail of the recording part 1 in the image recording and/or reproducing apparatus of the invention having the described construction. An example of the operation of this recording part will be explained with reference to FIGS. 5 and 6.

Aiming at the object, the user turns the shutter switch 13 shown in FIG. 2 to the state of half-switching. As a result, a voltage is applied between the charging brush roller 57 and the grounding brush 57' and the driving coils 503 and 504 are actuated so as to feed the film in the direction of an arrow 60.

In consequence, the entire area of the image accumulator 4 is uniformly charged. Then, the user turns the shutter switch 13 to the state of full switching, thereby actuating the exposure member EM, so that the image accumulating member 4 is exposed to a predetermined quantity of light through the optical system 11, thereby recording the image of the object in a manner shown in FIG. 4B. Then, the shutter switch 13 is released so that the driving coils 503 and 504 are activated again to feed the film by a distance corresponding to one frame in the direction of the arrow 60. Meanwhile, the electrostatic charges are removed from the whole area through the grounded brushes 59 and 59', whereby the image is held in the state shown in FIG. 4C. Then, the film is reversed, i.e., moved in the direction opposite to the arrow 60, by the distance corresponding to one frame, thus locating the next frame at a position suitable for the uniform charging.

Referring to FIGS. 1 and 5, the container 102 is formed of a glass or the like material. The container 102 has a sufficiently high level of transparency at least at a portion thereof facing the image recording part 1. In addition, the portion constituting the passage for the exposure light is a flat surface so as to avoid any undesirable effect such as strain interference. It is also preferred that the portion is kept in parallel with the plane of the image accumulating member.

Alternatively, the portion of the container 102 providing the passage for the exposure light may be formed directly as a lens.

Referring again to FIGS. 5 and 6, the brush rollers 57, 57', 59 and 59' are arranged not only to apply voltages but also to apply a slight tension to the image accumulating part 4, thus keeping the image accumulator at a predetermined angle, preferably a right angle, to the exposure light or to a later-mentioned scanning electron beam, thereby to ensure a high resolution in the recording and reading of the image.

It is possible to simplify the construction by allowing the charging or charge-eliminating rollers or brushes as tension rollers for ensuring flatness of the image recording part 1.

Figures 6A, 6B:
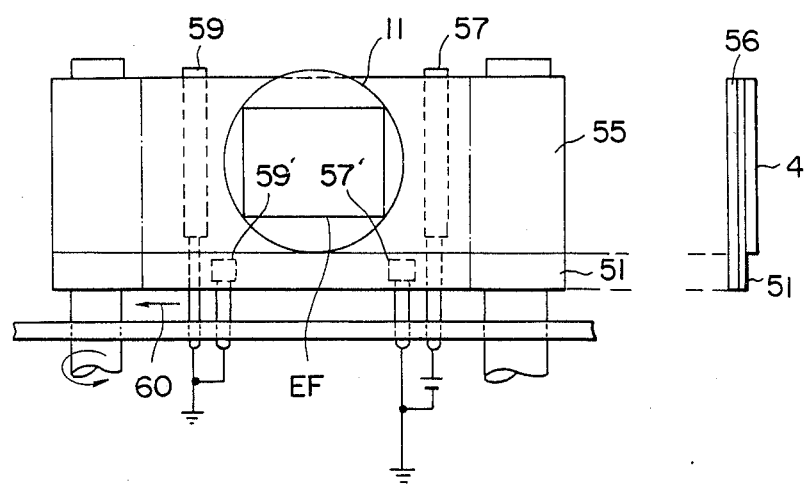
FIG. 6A is a front elevational view of the recording part shown in FIG. 5.
FIG. 6B is an illustration of the recording part shown in FIG. 6A as viewed from a lateral side thereof.

FIGS. 6A and 6B show a modification. As shown in FIG. 6A, one of the charging or charge-eliminating rollers which is grounded is disposed outside the effective field EF (out of the area scanned by the electron beam) and on the breadthwise end of the film-type image accumulator 4. The construction of the layers of the image accumulator 4 is modified correspondingly as shown in FIG. 6B. With these arrangements, it is possible to further simplify the construction of the apparatus.

Figure 4C:
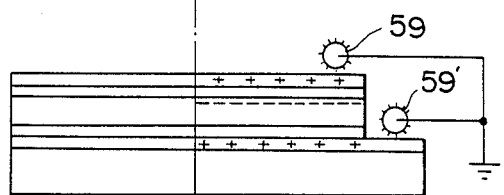
Figure 4D:
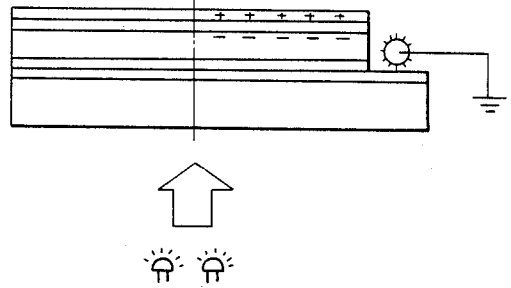

Preferably, the image stored in the image accumulator 4 is preserved in the state after completion of the process shown in FIG. 4C. By keeping the surface of the image accumulator 4 at a potential which would not produce external electric field, i.e., at the grounded level, it is possible to avoid any undesirable mutual influence between frames when the image accumulator 4 in the form of a film is rolled for storage, whereby any degradation in the quality of the image is avoided. This effect is remarkable particularly when the image accumulator employs a conductive substrate which is composed of the substrate 56 and the conductive layer 51.

Needless to say, the image can be preserved also in the state shown in FIG. 4D.

Although in the foregoing description the surface of the image accumulator is charged uniformly in advance of the formation of the image, this is not exclusive and the recording can be conducted by other methods.

In the recording method described before, conductive brushes and rolls are used for the purpose of supplying and removing electrostatic charges to and from the image accumulator 4. This, however, is only illustrative and the charging may be conducted by means of an electron gun 23 incorporated in the image recording and/or reproducing apparatus of the present invention. This charging method will be explained hereinunder with reference to FIG. 3.

When the electron gun 23 is used, the conductive layer is utilized as the backing electrode, so as to cause a change in the polarity of the electric charges which are imparted to the semiconductor layer 55 of the image accumulator 4 by the accelerating voltage. Namely, a collector electrode is provided beforehand in the vicinity of the image accumulator 4 in advance of the charging. Alternatively, the collector electrode is provided only when the charges are eliminated and the potential of this electrode is maintained at a sufficiently high level while reducing the velocity of the electron beam. Assuming here that the initial potential of the semiconductor layer 55 is zero volt (0V), the quantity of the primary electrons directed from the electron gun towards the semiconductor layer 55 is greater than the quantity of the secondary electron produced by collision so that the semiconductor layer is negatively charged until the accelerating voltage exceeds a predetermined voltage $V_A$. When the accelerating voltage is the same as the predetermined voltage $V_A$, the quantities of the primary and secondary electrons balance each other so that the surface potential of the semiconductor layer is maintained at 0V. Then, as the accelerating voltage is increased to exceed $V_A$, the quantity of the primary electrons is exceeded by the quantity of the secondary electrons, so that the surface of the semiconductor layer is charged positively. The threshold voltage $V_A$ varies depending on the material but generally ranges between about 20 and 50V since the lower part of the semiconductor layer is composed of the insulating layer 53. The above-described method can be carried out successfully on condition that almost the whole of the secondary electrons is arrested by virtue of high positive collector voltage.

When the charging of the image accumulator 4 is conducted negatively, it is possible to utilize an internal tungsten filament together with the electron gun, so as to make use of thermal electrons emitted from the filament.

In the method described hereinbefore, the control of the charging potential is conducted by controlling the collector voltage in the region where the emission of the secondary electrons exceeds the injection of the primary electrodes. For charging the surface of the semiconductor layer of the image accumulator from about 0V to $+V_C$ volt, a voltage $-(V_A+\alpha)$ is applied to the cathode of the accelerating electrode of the electron gun, while applying the voltage $+V_C$ to the collector electrode. At the same time, the conductive layer 51 is grounded. In consequence, as the primary electrons are charged into the semiconductor layer 55 on the image accumulator, the secondary electrons are emitted at a rate greater than the injection rate of the primary electrons, and the whole of the emitted secondary electrons is captured by the collector electrode, so that the semiconductor layer is gradually charged positively. As this charging proceeds, the surface potential of the semiconductor layer is raised above the potential of the collector electrode, so that the secondary electrode can no more move towards the collector electrode. In consequence, the secondary electrodes are returned to the semiconductor layer, with the result that the potential is lowered by amount corresponding to the injection of the primary electrons, whereby the surface potential is maintained substantially constant at $V_C$.

An explanation will be made hereinunder as to the case where the semiconductor layer 55 is charged negatively to a level expressed by $-V_C$. In this case, the cathode is maintained at a potential expressed by $-(V_A+V_C+\alpha)$. It is to be noted, however, the surface potential of the semiconductor layer 55 is maintained substantially at 0V. In this case, the semiconductor is gradually charged negatively at a rate corresponding to the rate of injection of the primary electrodes, because the entire emitted second electrons are returned to the semiconductor. When the potential is lowered to a level below $-V_C$, the collector electrode exhibits a positive potential relative to the surface potential of the semiconductor layer, so that the secondary electrons are trapped thus allowing the semiconductor layer to be charged positively. In consequence, the semiconductor layer 55 is stably charged to $-V_C$ volt.

The charging with the electron gun ensures a higher uniformity of charging, as well as shorter charging time and easier control of the potential, as compared with the case where the charging is effected by means of the brushes and rolls.

A description will be provided hereinunder as to the method of removing the electrostatic charge. As will be understood from the foregoing description, the state of charging can be controlled through the control of the collector voltage. This means that charges can be removed by setting the collector potential at 0V. In another charge removing method, the collector potential is raised so as to trap whole secondary electrons only when the semiconductor layer has been charged positively, and the semiconductor layer is irradiated with an electron beam under a condition expressed by $(V_S-V_K)<V_A$, where $+V_S$ represents the potential of the semiconductor layer while $V_K$ represents the potential of the cathode. In the case where the condition of $V_S<V_A$ is met, however, the removal of the charges is possible by keeping the cathode potential $V_K$ at 0V. Needless to say, the conductive layer 51 is grounded during the removal of the charges.

This charge removing method enables a higher uniformity of the charge removal than a method which relies upon the brushes and rollers and, in addition, provides means of varying the charge potential. In addition, the mechanical construction is simplified due to the elimination of the mechanical charge removing members such as brushes and rollers. In addition, the capacity of the power supply can be reduced because the electric current consumed for charge removal is small and the charge removal voltage is lowered to a sufficiently low level.

The erasure of the image recorded on the image accumulator 4 is conducted by a process including exposure of the whole surface while grounding the transparent conductive layer, and by moving the grounded brushes or rolls in contact with the semiconductor layer 55. It is possible to employ the above-mentioned charge removing means instead of the brushes and rollers.

The removal of the charges from other types of image accumulator can be effected by the same method: namely, by lowering the potential of the semiconductor layer to 0V by means of the charge removing brushes or rollers or by application of electron beam, and by applying light to the whole area while maintaining the transparent conductive layer at 0V.

A description will be provided hereinunder of the image reading part 2 in the image recording and/or reproducing apparatus of this embodiment. The reading may be conducted by a method which is disclosed in detail in Japanese Patent Laid-Open No. 29915/1979 of the same applicant.

Referring to FIG. 1, as the cable 203 leading from the recording and/or reproducing apparatus incorporating reading power supply and the external memory is connected to the connector 3, the apparatus is ready for reading the stored image. The control of deflection of the beam is effected by a reading part drive control circuit which may be provided in the recording and/or reproducing apparatus or, alternatively, in the camera 100.

The principle of the reading of the stored image data will be explained briefly. As the electron beam impinges upon the image accumulator 4, the secondary electrons are emitted from the latter. The secondary electrons which are released from the image accumulator 4 are those generated in a shallow area of a depth which is not greater than $0.1\mu$ from the surface of the image accumulator 4. The emission of the secondary electrons to the outside of the image accumulator is affected by the surface potential of the image accumulating part. More specifically, when the surface potential is positive, the secondary electrons can hardly be emitted because they are attracted by the surface of the image accumulator 4. Conversely, when the surface potential is negative, the emission of the secondary electrons is enhanced because of repulsion between the secondary electrons and the surface of the image accumulator. Therefore, if a mesh electrode 200 for trapping the secondary electrons is disposed in the vicinity of the photosensitive plate, the electrode 200 produces an output of a level which corresponds to the surface potential of the point to which the electron beam is being applied. Thus, the output from the electrode 200 is a time-series electrical signal converted from the image data. The use of the electron beam as the reading means offers advantages such as the fully-electronic control of the scanning by means of electronic lenses and high resolution afforded by small beam diameter less than several $\mu$. It is also to be noted that the reading is possible without substantially destroying the latent image on the image accumulator, by moderating the intensity of the electron beam.

Figure 7:
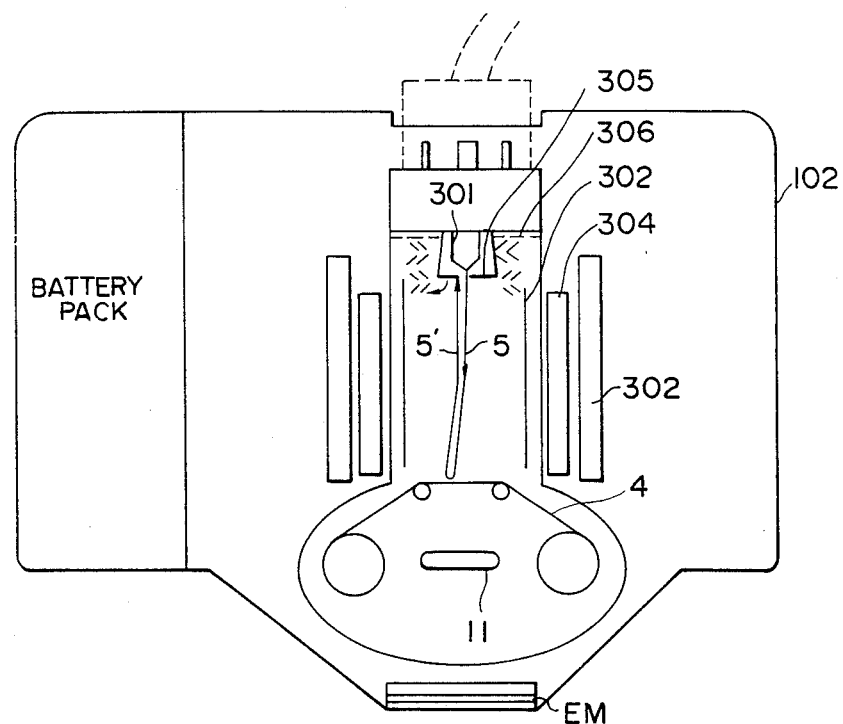
FIG. 7 is a top plan schematic view of a second embodiment of the recording and/or reproducing apparatus in accordance with the present invention.

FIG. 7 illustrates another example of the reading method applied to the apparatus in accordance with the present invention. This reading method is basically the same as the known electrostatic charge reading method represented by image orthicon, so that only the outline of this method will be explained.

The electron beam 5 emitted from the electron gun 301 is focused by a focusing coil 302 and a focusing electrode 303, and is deflected by a deflecting coil 304 so as to scan the charge image formed on the image accumulator 4. When the electron beam impinges upon the charge image, part of the electrons of the beam neutralizes the positive charge of the charge image, and the remainder of the electrons are returned as a return beam 5'. Thus, the intensity of the return beam has a certain relation to the contrast of the charge image formed on the image accumulator 4. The returning electron beam is received by a dynode 305 and the secondary electrons from the dynode 305 are amplified in a plurality of stages and taken out in the form of an electrical signal from the collector 306.

The above-explained method for reading the latent image by means of electron beam is only illustrative and various other methods can be used equally well but the description of such methods is omitted for the purpose of simplification of explanation.

A description will be provided hereinunder with specific reference to FIGS. 1 to 4 as to the operation of the reading part 2 of the image recording and/or reproducing apparatus employing the recording method explained in connection with FIGS. 3 and 4. It is assumed here that the image accumulator 4 is stored in the form of a roll after the recording completion of the recording process shown in FIG. 4C.

The camera 100 is connected to the recording and reproducing unit 204 through the connectors 3 and 202, and the reading operation is commenced by a switch which is not shown. The images on the film stored in the form of a roll may assume the state as shown in FIG. 4D due to dark attenuation of the photosensitive layer as a result of a long storage. In this embodiment, however, the image accumulator is wholly exposed for a predetermined time to the light from the LEDs 210 and 211 so as to realize a good surface potential pattern of the electrostatic image as shown in FIG. 4D in advance of the reading scanning by the electron beam.

Subsequently, the surface of the image accumulator is scanned with the reading electron beam and a timeseries image signal obtained through detection and processing of the secondary electrons or returning beam is delivered to the recording and/or reproducing apparatus incorporating the external memory. The image signal is then output or stored in the form of electrical signal. It is, therefore, possible to see the image through, for example, a CRT or to obtain a hard copy by means of a printer.

In the case where the reading of image from the image accumulator is conducted through detection of the secondary electrons or the returning beam, the formation of the image may be conducted by using a P-type photoconductive layer or a photoconductive layer of dual polarity, instead of the N-type photoconductive layer mentioned before. It is also to be noted that the charging of the whole area of the image accumulator may be conducted to charge the whole area negatively.

Figure 8:
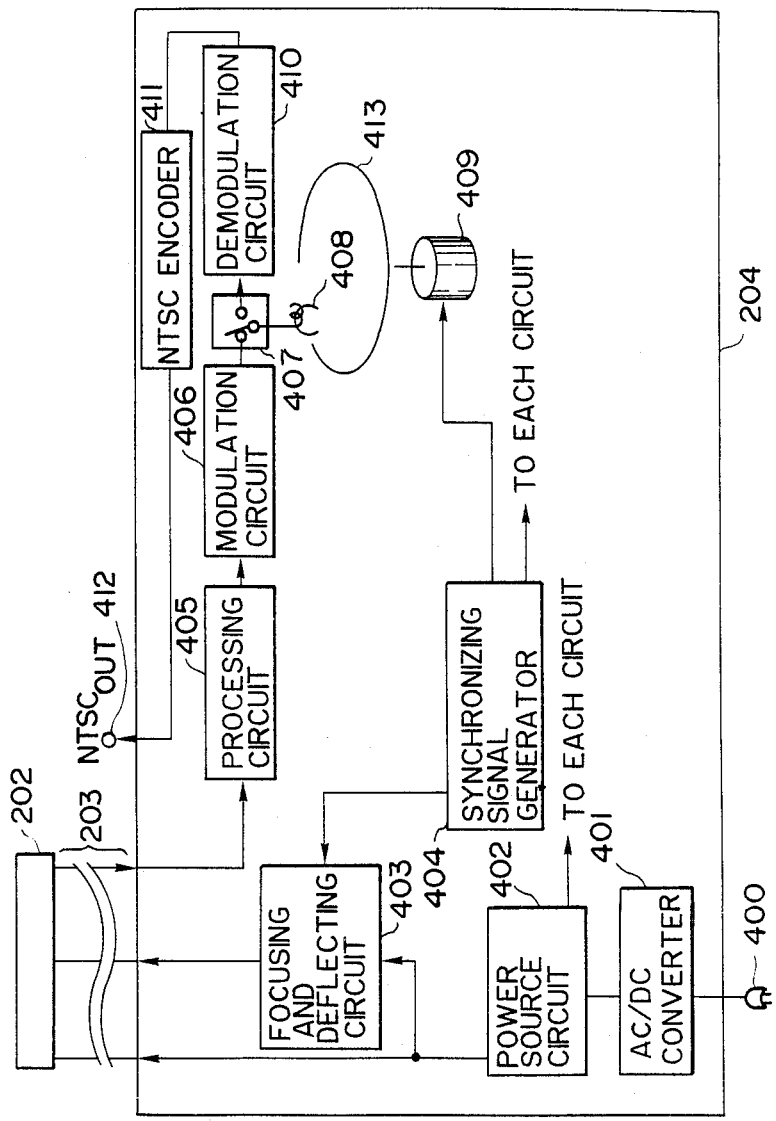
FIG. 8 is a block diagram of an example of recording and reproducing apparatus.

FIG. 8 shows an example of the construction of the recording and reproducing unit 204. The apparatus 204 includes an AC cord 400, an AC/DC converter 401, a power supply circuit 402, a focusing and deflection circuit 403, a synchronizing signal generating circuit 404, a processing circuit 405, a modulation circuit 406, a recording-reproduction change-over switch 407, a recording head 408, a disk motor 409, a demodulation circuit 410, an encoder circuit 411, an image signal output terminal 412 and a disk-like recording medium 413.

The AC power supplied through the cord 400 is converted into DC power by the AC/DC converter and is transformed to suitable voltages by the power supply circuit 402 which delivers these voltages to various circuits in the apparatus. The power is supplied also to the connector 202 through the cable 203. The focusing deflection circuit 403 generates a saw-tooth wave for beam deflection in accordance with the horizontal and vertical synchronizing signals from the synchronizing signal generator 404, and delivers the saw-tooth wave to the connector 202 also through the cable 203.

The image signal supplied through the cable via the connector 202 is supplied to the processing circuit 405 which performs various operations such as α correction, aperture correction, black-level clamp, white clip and so forth, and the thus processed image signal is delivered to the modulation circuit 406 where a suitable modulation is conducted to optimize the image signal for the recording. The modulated image signal is delivered through a switch 407 and a head 408 to the recording medium 413 having a multiplicity of tracks each of which stores image signals corresponding to one field. In the reproduction of the stored image data, the signal read by the head 408 is demodulated by a demodulation circuit and is converted by an encoder into a standard television signal such as NTSC signal which is then sent to the output terminal 412. It is, therefore, possible to monitor the image on the field basis by means of a TV receiver connected to the NTSC output terminal 412. It is of course possible to store image data signals corresponding to two fields in each track of the disk-like medium, so that the image can be monitored on the frame basis. Needless to say, the encoder used in the reproduction may be such one as adapted for PAL or SECAM.

Figure 9A:
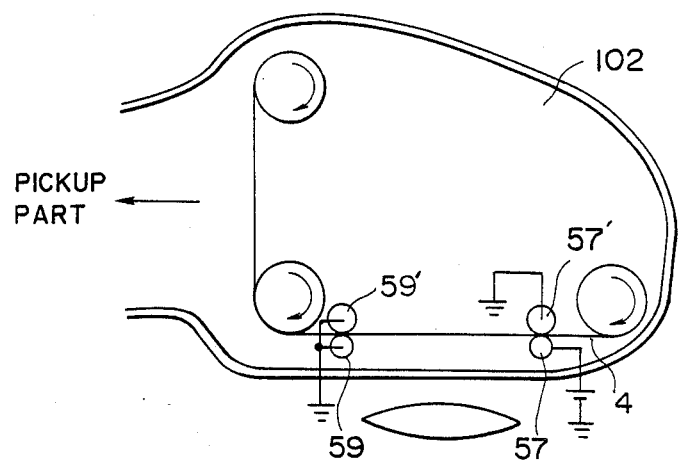
FIG. 9A is a schematic top view of the recording section of a third embodiment of the image recording and/or reproducing apparatus in accordance with the present invention.
Figure 9B:
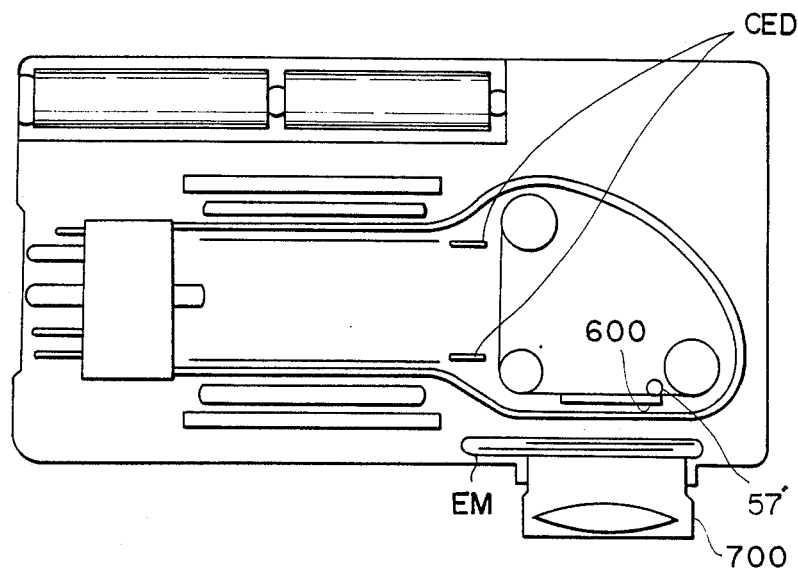
FIG. 9B is a schematic top view of the recording section of a fourth embodiment of the image recording and/or reproducing apparatus in accordance with the present invention.
Figure 10:
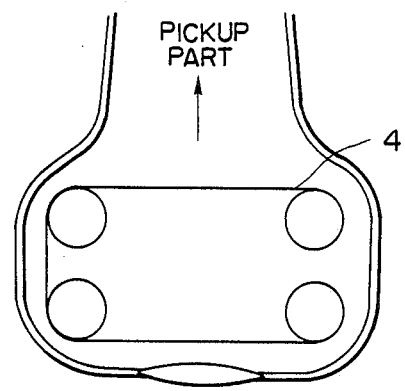
FIG. 10 is a schematic top view of the recording section of fifth embodiment of the image recording and/or reproducing apparatus in accordance with the present invention.

FIGS. 9A, 9B and 10 show the constructions of modifications of the described embodiment. In these modifications, the same surface of the image accumulating medium 4 is used both for the exposure and scanning by electron beam. The illustrated arrangement provides a remarkable effect partly because the image accumulator 4 is capable of recording a latent image pattern and partly because the image accumulator 4 has an accumulating area capable of storing a plurality of independent images.

More specifically, FIGS. 9A and 9B show an arrangement which makes use of the image recording method explained before in connection with FIG. 5. With this arrangement, it is not necessary that the substrate 56 and the conductive layer 51 are transparent, because the same surface of the image accumulator is used both for the exposure for recording and scanning by the electron beam. It is therefore possible to form both the substrate 56 and the conductive layer 51 as a conductive substrate made of, for example, a thin metallic film. In such a case, it is possible to eliminate accumulation of static charges due to friction. Furthermore, the arrangement is made compact in the direction of the optical axis of the camera, because the reading scanning part is disposed at a lateral side. In order to eliminate any flare and interference during the exposure, the conductive substrate is preferably subjected to a treatment such as blasting or deposition of a reflection-prevention layer. One of the brush and roller 59' and 57' for the purpose of grounding may be dispensed with.

Another modification shown in FIG. 10 is basically the same as the modification shown in FIGS. 9A and 9B. This modification also enables the construction of the image accumulator to be simplified, although it does not make any contribution to the reduction in the thickness of the camera in the direction of the photographing optical axis.

FIG. 9B shows an example of the construction for detecting secondary electrons emitted in accordance with the pattern of the latent image as a result of the scanning by the electron beam. In this case, a collector CED capable of detecting the secondary electrons is used in place of the mesh electrode. In addition, a transparent electrode 600 and a grounding electrode 57' are used for the purpose of applying voltage to the image accumulator. A reference numeral 700 designates an interchangeable lens.

Figure 11:
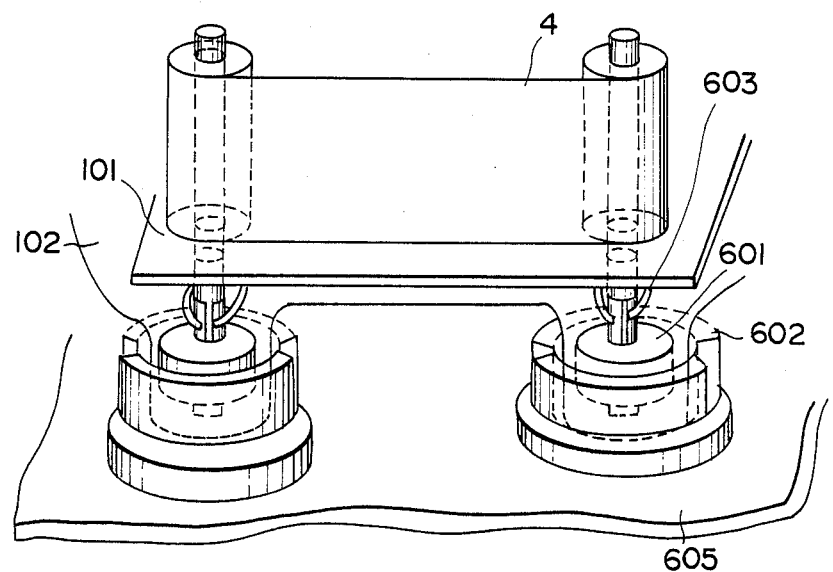
FIG. 11 is a perspective view of an example of driving arrangement for driving an image accumulator.

FIG. 11 shows another example of the film loading means. This example is basically the same as that shown in FIG. 2 except that the positions of the magnets 501, 502 and the positions of the driving coils 501, 502 are reversed with respect to each other. Namely, in this example, a driving coil 601 is disposed in the vacuum container 102, while a magnet 602 is mounted on a supporting frame 605 outside the container 102. The driving coil 601 is supplied with electric power through a conductive brush 603. The arrangements shown in FIGS. 2 and 11 are basically the same as known driving systems employing DC motors and, hence, the operation is materially the same as those of the conventional method.

It is possible to further improve the image recording and/or reproducing apparatus of the present invention by modifying the arrangement shown in FIG. 11 in a manner explained below. Namely, any influence produced by the magnetism from the magnet 602 on the reading scanning beam 602 can be eliminated by arranging the device such that the magnet 602 can be moved away from the container 102 as desired during reading of the image data.

Figure 12:
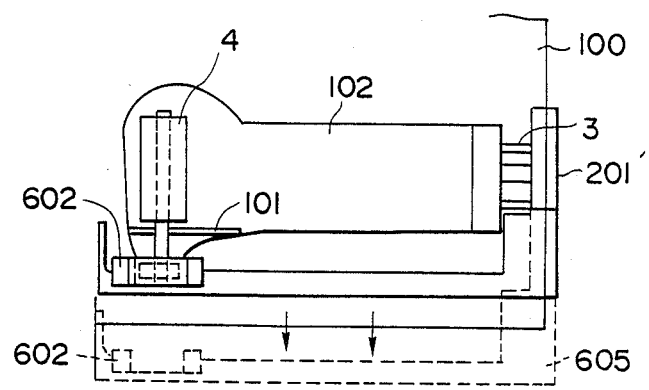
FIG. 12 is a side elevational view of the arrangement shown in FIG. 11.

FIG. 12 shows an example of the means for moving the magnet 602 away from the container 102. Namely, in the arrangement shown in FIG. 12, the supporting frame 605 carrying the magnet 602 serves also as the cover 201' of the connector 3. When the image recorded in the image accumulator 4 is to be read, the cover 201' is opened to enable the external connector 3 to be connected to the connector 202. This can be done by sliding the supporting frame 605 as a whole downward as indicated by arrows in FIG. 12, so that the magnet 602 also is moved away from the container 102. Preferably, the supporting frame 605 is connected to the container so that it may not be lost when moved apart from the container.

Figure 20:
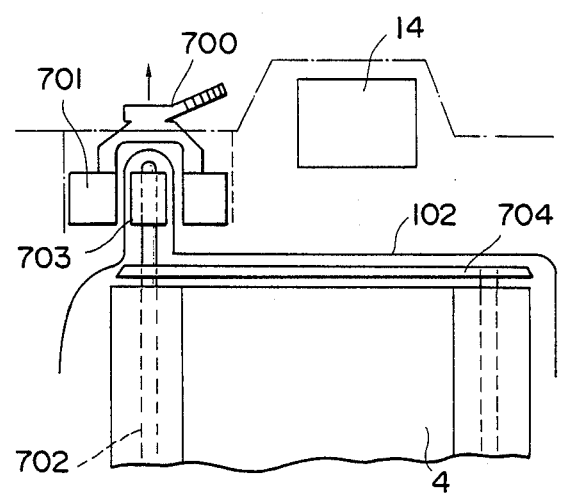
FIG. 20 is a schematic rear view of another example of the driving arrangement for driving the image accumulator.

FIG. 20 shows an example in which the film is wound manually by means of a film winding lever 700. In the illustrated embodiment, a magnet 701 is rotated by means of the film winding lever 700 thereby rotating also a magnet 703 which is fixed to the film winding shaft 702 for winding the image accumulator 4.

With this arrangement employing the manual winding lever 700, the operation of the manual winding lever 700 can effect a part of the operation to be performed by the recording part in the half-switching state explained in connection with FIGS. 1 and 2. In the described example, a magnetic shield plate 704 is provided at least between the magnets 701, 703 and the beam scanning unit 2, so that no unfavorable effect is caused on the beam scanning. Needless to say, however, the magnetic shield plate 704 may be installed externally of the container 102.

Referring to FIG. 20, in reading the recorded image data, it is possible to move the magnet 701 away from the container 102 by lifting the film winding lever as a whole.

Figure 21:
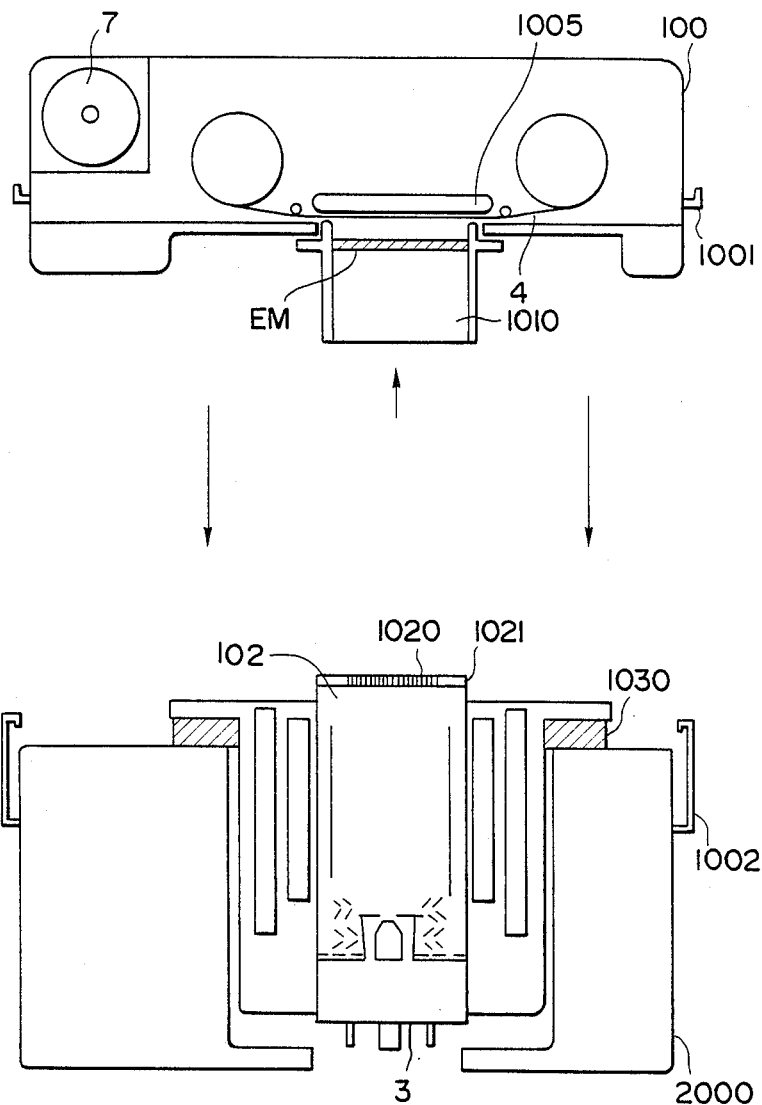
FIG. 21 is a schematic top view of a sixth embodiment of the image recording and/or reproducing apparatus in accordance with the present invention.

FIG. 21 shows an arrangement in which the camera 100 and the reading part 2000 are separable from each other, and are adjoined together by means of joint members 1001 and 1002. The joint between the camera 100 and the reading part 2000 is achieved at the lens mount after demounting the interchangeable lens unit 1010.

This arrangement obviously improves the portability of the recording part of the apparatus, i.e., the camera.

The camera 100 is provided with various means necessary for the functions described above, i.e., charging means, film driving means and so forth. The camera 100 also is provided with a pressing plate 1005 for ensuring close contact between the reading part 2000 and the film surface, while keeping a high degree of flatness of the film surface.

After the recording of an image by the camera 100, when it is desired to read the recorded image, the lens unit 1010 is demounted and the reading part 2000 is coupled to the camera instead. When this coupling is conducted, a junction plate 1021 of the reading part 2000 having a multi-line pin electrode 1020 is brought into close contact with the film. A resilient member 1030 is provided for the purpose of ensuring this close contact. The multi-line pin electrode 1020 has a plurality of pins which are arranged at a high density without contacting each other and are adapted for independently providing connections between the obverse and reverse sides of the junction plate, thus enabling the latent image on the film to be read by means of the electron beam.

As will be understood from the foregoing description, the apparatus in accordance with the present invention may be constructed such as to permit the recording part and the reading part to be separated from each other. Thus, the major feature of the described embodiment is that the recording part and the reading part can be driven independently of each other without causing any change in the states of the respective parts.

The commercial value of the apparatus of this type will be significantly impaired if the recording and reading of image requires a complicated process including independent steps such as extraction of the image accumulator from the camera 100, loading of the image accumulator in the container of the reading part and, evacuation of the container and reading operation. According to the invention, however, it is possible to conduct the recording of image and the reading of image independently of each other without causing any change in the states of the recording part and the reading part, not only in the case where the recording and reading parts are separable but also in the case where the recording and reading parts are built-in in the container. Thus, the present invention can instantaneously conduct both the recording of an image and reading of a recorded image.

A description will be provided hereinunder of another example of the image accumulator and an image recording method which makes use of such an image accumulator.

Figure 13:
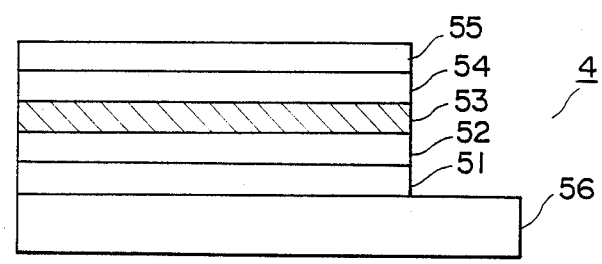
FIG. 13 is a schematic sectional view of a second example of the image accumulator.

FIG. 13 is a sectional view of another example of the image accumulator 4 used in the apparatus of the present invention. The image accumulator has the form of a film having a plurality of layers: namely, a transparent substrate film 56, a transparent conductive layer 51, an N-type photoconductive layer 52, a transparent insulating layer 53, a P-type photoconductive layer 54 and the semiconductor layer 55. The substrate film 56 is made of a material having a sufficiently high level of flexibility and light transmittance, as well as a high strength which prevents the substrate film from being torn by tension applied during film loading. Preferred examples of the material of the substrate film 56 are polymeric materials such as polyethylene terephthalate and polyimide. In order to attain the desired properties, the thickness of the substrate film 56 ranges between 10 and 50 $\mu$m, and 5 and 50 μm, respectively, when the polyethylene terephthalate and polyimide are used as the material.

The transparent conductive layer 51 is made of tin oxide, indium oxide or a mixture of indium oxide and tin oxide with small content of tin oxide. This layer 51 is formed by a known method such as spattering. In order to ensure a high light transmittance and electrical conductivity, this layer 51 preferably has a thickness on the order of several of tens to several hundreds of nm.

The N-type photoconductive layer 52 is formed by evaporation deposition or spattering from an N-type photoconductive material such as CdS, CdSe and ZnO. The thickness of this layer is selected to provide sufficiently large quantity of electron-hole pairs in response to light impinging thereon, while ensuring high insulation in the dark regions and reducing the internal scattering of light to a negligible level. Thus, the thickness of this layer preferably ranges between 100 nm and several μm.

The insulating layer 53 is a thin film of a material having a high insulating nature, e.g., $SiO_2$, MgO or the like formed by spattering or a similar method. In order that this layer 53 may exhibit a high insulating power, the thickness of this layer preferably ranges between several μm and several hundreds of μm.

The P-type photoconductive layer 54 is formed by evaporation deposition or spattering from an N-type photoconductive material such as amorphous Se, amorphous SeTE and amorphous Si. The condition for forming this layer is materially the same as that for the formation of the N-type photoconductive layer 52.

The semiconductor layer 55 is made of a glass or a porous material such as KCl (potassium chloride) which exhibits a higher resistance along its surface than in the thicknesswise direction thereof, as well as a high insulating power. The thickness of this layer should be determined to be sufficiently small for the pitch of resolution of the image to be formed. For instance, for the purpose of obtaining a resolution on the order of 1000 pieces/mm, the film thickness should range between several nm and several hundreds of nm.

Figure 14A:
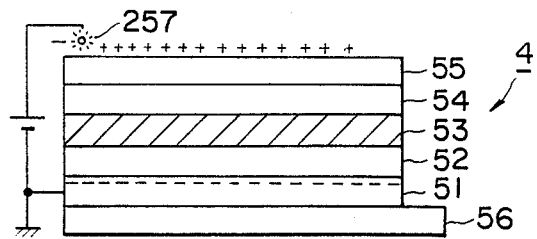
FIGS. 14A to 14E are illustrations of a method for recording image data on the image accumulator shown in FIG. 13.
Figure 14B:
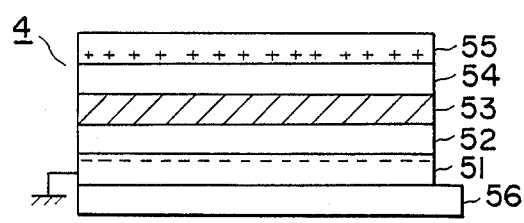
Figure 14C:
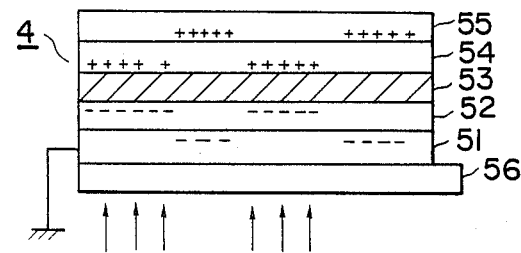

A description will be provided hereinunder as to the method of recording an image on the image accumulator of the type described, with specific reference to FIGS. 14A to 14C.

Figure 14D:
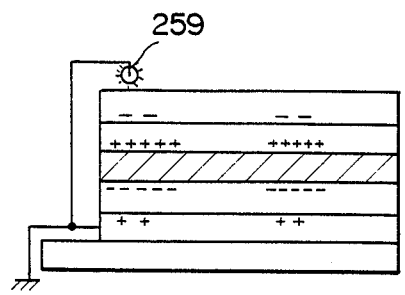
Figure 14E:
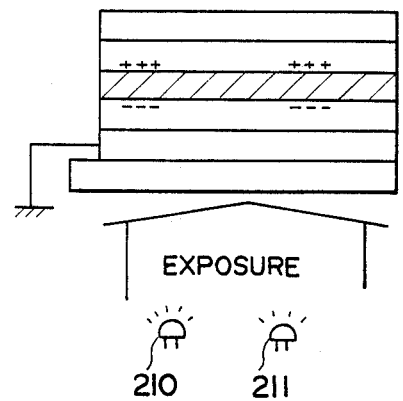

Positive charges are imparted to the semiconductor layer 55 by means of a conductive brush or rolls 257 in a dark place, while grounding the transparent conductive layer 51 or keeping the same at a negative potential, as shown in FIG. 14A. The thus applied positive charges are injected through the semiconductor layer 55 without delay to create a state as shown in FIG. 14B. Then, the exposure member EM shown in FIG. 1 is opened so as to expose the image accumulator to an image. As a result, the resistance of the photoconductive layers 52, 54 is lowered in the region where the light L is applied so that the negative charges are injected into the photoconductive layer 52 from the transparent conductive layer 51, as shown in FIG. 14C. Then, after closing the exposure member EM, the transparent conductive layer 51 is grounded so that the positive charges in the dark areas of the semiconductor layer 55 and the negative charges in the transparent conductive layer 51 are negated by each other through the conductive brush or the rolls 59, 59' contacting the grounded transparent conductive layer 51. At the same time, positive and negative charges are injected into the semiconductor layer 55 and the transparent conductive layer 51 such that the surface potential of the bright region becomes zero, as shown in FIG. 14D. Then, while grounding the transparent conductive layer 51, the whole area of the image accumulator 4 is exposed to the light from the LEDs 210 and 211, so that the electrical resistance is reduced in the photoconductive layers 52 and 54, so that the positive and negative charges across the photoconductive layers are negated by each other. In consequence, charges appear only across the insulating layer 53 as shown in FIG. 14E, and the image is recorded in such a manner to leave positive charges on the surface.

According to this recording method, the charge image accumulated on the image accumulator is held inside the image accumulator, so that a higher image storage characteristic is ensured insofar as the film is preserved in a dark place.

A description will be made hereinunder with specific reference to FIGS. 15A to 15D as to the modification of the image accumulator shown in FIG. 13 and a recording method making use of the same. The image accumulator 4 shown in FIG. 15 is discriminated from the image accumulator 4 shown in FIG. 13 in that an electrode plate 59 having a conductive layer contacting the P-type photoconductive layer 54 is used in place of the semiconductor layer 55. Other portions of this image accumulator is materially the same as those of the image accumulator shown in FIG. 13. The electrode plate 59 is composed of a substrate such as of glass and a conductive layer formed by spattering or the like method from a suitable material such as tin oxide, indium oxide or their mixture.

The image recording method conducted with this image accumulator will be explained with reference to FIGS. 15A to 15D.

Figure 15A:
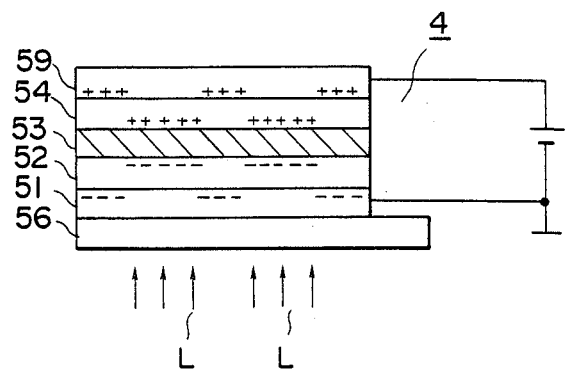
FIGS. 15A to 15D are illustrations of a method for recording images on a third example of the image accumulating member.
Figure 15B:
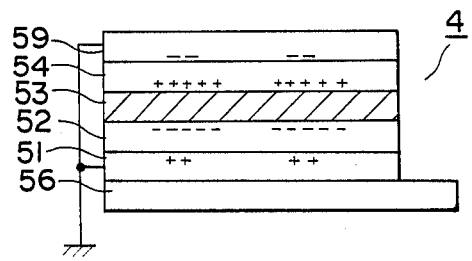
Figure 15C:
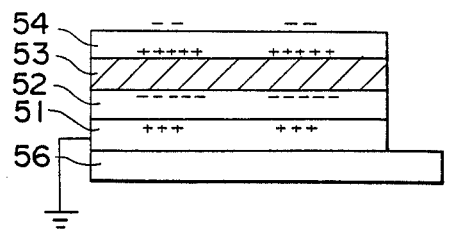
Figure 15D:
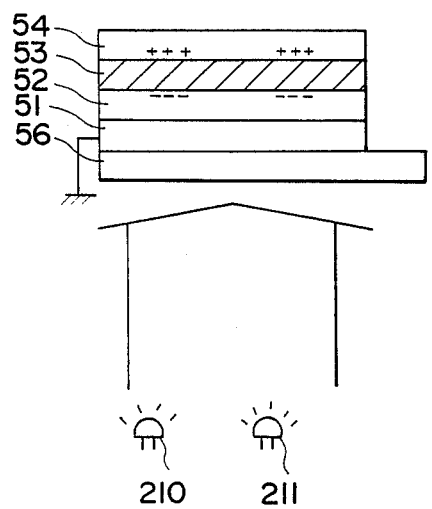

A voltage in the form of pulses is applied between the transparent conductive layer 51 (negative) and the electrode plate 59 (positive), and image exposure is conducted by the exposure member EM. In consequence, as shown in FIG. 15A, the values of resistance are lowered in the photoconductive layers 52 and 54 within the region which receives the light L, so that negative charges are injected from the transparent conductive layer 51 to the photoconductive layer 52. At the same time, positive charges are injected into the photoconductive layer 54. Then, the exposure through the exposure member EM is ceased and the application of the pulse voltage is stopped. Consequently, charges of inverse polarities are injected into the respective conductive layers within the exposed region, so as to reduce the potential of the external surface of the image accumulator 4 to zero, as shown in FIG. 15B. Then, the electrode plate 59 contacting with the image accumulator 4 is separated from the latter so as to create a state as shown in FIG. 15C. The image accumulator stores the recorded image well even in this state. However, the image accumulator 4 may store the image in such a state that charges are held only across the insulating layer. To this end, the whole area of the image accumulator 4 is exposed to the light from LEDs 210 and 211.

According to this recording method, any wasteful movement of the film during film loading operation is eliminated because the charging and the removal of the charges can be effected through a brush or a roll, so that the mechanical construction as a whole is advantageously simplified.

Although in the described embodiment the electrostatic charges are given externally, this is not exclusive and the electrostatic charges may be generated inside the image accumulator, as will be understood from the following description.

FIG. 16 shows still another example of the image accumulator 4 which employs piezoelectric materials for the material of a charge generating layer. This image accumulator 4 has a laminated structure composed of a plurality of layers including a transparent substrate film 67, a transparent conductive layer 61 formed on the substrate film 67, a transparent insulating film 62, a P-type photoconductive layer 63, a piezoelectric layer 68, an N-type photoconductive layer 64, a transparent insulating layer 65, and a semiconductor layer 66.

The transparent substrate film 67 is of the same type as the substrate film 56 mentioned before Namely, this film has high levels of light-transmittance, strength and flexibility, and is preferably made from a polymeric material such as polyethylene terephthalate, polyimide or the like.

The transparent conductive layer 61 is a layer having a thickness ranging between several tens and several hundreds of nm and made of indium oxide or a mixture of indium oxide and tin oxide with small tin oxide content. This layer exhibits a sufficiently high level of light-transmittance. The transparent insulating layers 62, 65 are films which are formed by spattering or evaporation deposition from a high-resistance material such as $SiO_2$, MgO and so forth. The thickness of this film is selected from a range which ensures high levels of light-transmittance and insulating power. Preferably, the thickness of this layer is from several hundreds to several thousands of Å.

The semiconductor layer 66 is made of a glass or a porous material such as KCl (potassium chloride) which exhibits higher resistance along its surface than in the thicknesswise direction thereof, as well as a high insulating power. The thickness of this layer should be determined to be sufficiently small for the pitch of resolution of the image to be formed. For instance, for the purpose of obtaining a resolution on the order of 1000 pieces/mm, the film thickness should range between several nm and several hundreds of nm.

The piezoelectric layer 68 is a thin layer of $Pb(Zr, Ti)O_3$ ceramics or $BaTiO_3$ ceramics. A sufficiently high level of light-transmittance is obtained when the thickness does not exceed $10\mu$ for each material. A sufficiently high piezoelectric effect is produced when the thickness of this layer exceeds 5000 Å. This piezoelectric layer is sufficiently applied in consideration of polarities of charges which will be formed on both sides of this layer. The P-type photoconductive layer 63 is made of a positive type photoconductive material made from an amorphous SeTe alloy or an amorphous Si, while the N-type photoconductive layer 64 is made of a negative-type photoconductive material such as CdS, CdSe and ZnO. Both layers are formed by evaporation deposition. The thicknesses of these layer can be selected suitably within regions which would not impair light transmittance and which would ensure sufficient generation of photoelectrons. More specifically, these photoconductive layers have thicknesses generally ranging between about 1000 Å and several $\mu m$.

An image recording method which makes use of this image accumulator will be explained hereinunder with reference to FIGS. 17A to 17D from which the substrate film 67 has been neglected for the simplification of the drawings.

As the first step, tension is applied to the whole image accumulator 4 in the direction of an arrow A or a pressure is applied in the thicknesswise direction of the image accumulator 4 (see FIG. 17A). In consequence, positive and negative charges appear on both sides of the piezoelectric layer 68, in accordance with the palling which has been conducted beforehand. Then, an image exposure is effected as indicated by arrows 58 in a dark place, while applying a bias voltage to the semiconductor layer 66 through a conductive brush or roll 57 while the transparent electrode layer 61 is grounded or kept at a negative potential, such that the semiconductor layer 66 is held at a positive potential whereas the conductive layer 61 is held at a negative potential.

Since the resistance levels are lowered in the respective photoconductive layers in the region where the light has been applied and since the bias voltage is applied as explained before, the charges on both sides of the piezoelectric layer 68 in the regions where the light is applied are moved to the boundaries between the respective photoconductive layers and the adjacent insulating layers, as will be seen from FIG. 17B.

Then, as the pressure which has been applied to the image accumulator is extinguished, the charges on the non-exposed regions of the piezoelectric layer are extinguished and charges of the inverted polarity appear on the exposed regions as shown in FIG. 17C.

Then, the conductive layer 61 and the semiconductor layer 66 are connected through a conductive brush or a roll 57' and are commonly grounded, so that charges remain only on the exposed region, whereby the electrostatic image is preserved in the image accumulator as shown in FIG. 17D. In this state, both surfaces of the image accumulator are held at zero potential lvel.

Thus, in this embodiment, the recording potential remains through the whole thickness of the image accumulator because the recording is effected by the charges which are produced internally of the image accumulator. In this embodiment, therefore, the surface potential of the image accumulator can be increased as compared with the cases where other types of image accumulator are employed. In addition, any problem which would be caused otherwise by the mutual contact between the photosensitive member and the electrode is eliminated, because there is no chance for such mutual contact to occur.

Figure 18:
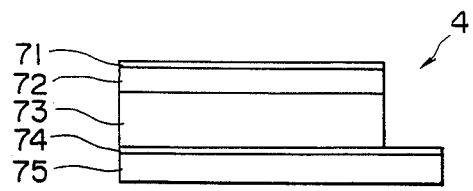
FIG. 18 is a schematic sectional view of a fifth example of the image accumulator.

A further example of the image accumulator which also employs a piezoelectric layer will be explained hereinunder, photoconductor material such as CdS, CdSe, ZnO and ZnTe are used in most cases as the materials of photoconductive elements in the form of mixtures with suitable binders. These materials, however, can be used also as the materials of piezoelectric photo-semiconductors. To this end, the material is formed as a film having a high crystallinity by spattering or a similar method followed by palling. When only an inferior crystallinity is obtainable, the piezoelectric nature can be realized by effecting a strong palling with an electric field of a large intensity. FIG. 18 shown, in section, the image accumulator 4 which employs this piezoelectric photoconductive element. More specifically, this image accumulator 4 has a laminated structure having a plurality of layers: namely, a transparent substrate film 75, a transparent conductive layer 74, an N-type piezoelectric photoconductive layer 73, an insulating layer 72 and a semiconductor layer 71.

The substrate film 75 is made of a material which exhibits sufficiently large flexibility and light-transmittance, as well as strength which is large enough to prevent the image accumulator 4 to be torn by any tension which may be applied during loading of the image accumulator. The substrate film 75 is preferably made of a polymeric material such as polyethylene terephthalate, polyimide or the like. In order to realize these properties, the thickness of the substrate film 75 is selected to fall within the range between 10 and 50 μm and between 5 and 50 μm, when the material is polyethylene terephthalate and polyimide, respectively.

The transparent conductive layer 74 is made of a material containing tin oxide, indium oxide or a mixture of tin oxide and indium oxide with small tin oxide content. This layer can be formed by a known method such as spattering, preferably in a thickness of several tens to several hundreds of nm which ensures sufficiently high light transmittance and conductivity.

The piezoelectric N-type photoconductive layer 73 is formed from an N-type photoconductive material such as CdS, CdSe and ZnO by a known method such as spattering, e.g., a method disclosed in the specification of U.S. Pat. No. 4,363,711 in which a single-crystal layer of CdS or other material is laminated by an RF spatter in a field of a frequency on the order of MHz. The thus formed photosensitive layer is subjected to palling which is effected under the influence of a strong DC electric field so that the film may show a first piezoelectric characteristic in the desired orientation. The thickness of this layer 73 is selected such that a sufficiently large number of electron-hole pairs is generated in response to light and that a high level of insulating power is ensured in the dark region, with the internal diffusion of light reduced to a negligible level. Thus, the thickness preferably ranges between 100 and several μm.

The insulating layer 72 is a thin film made of a material having a large insulating power, e.g., $SiO_2$, MgO and so forth, by a suitable method such as spattering. In order to attain a sufficiently high level of insulation, the thickness of this layer is preferably several to several tens of μm.

The semiconductor layer 71 is formed of a film of a glass or the like material, or from a porous material such as KCl (pottasium chloride). This layer exhibits a higher resistance along the surface than in the thicknesswise direction, thus assuring a high level of electric insulation. The thickness of this layer should be selected to be sufficiently small for the width of resolution of the recording of the image. For instance, when the resolution is on the order of 1000/mm, the thickness preferably ranges between several nm and several tens of nm.

Figures 19A, 19B:
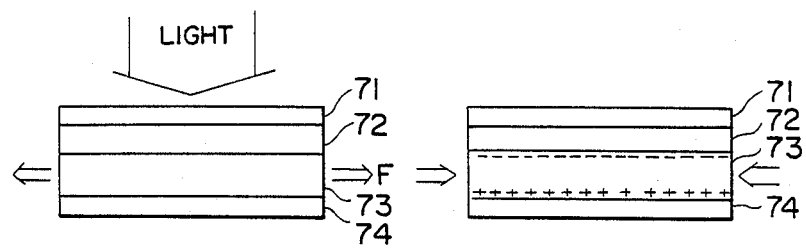
FIGS. 19A to 19D are illustration of a method for recording images on the image accumulator shown in FIG. 18.
Figures 19C, 19D:
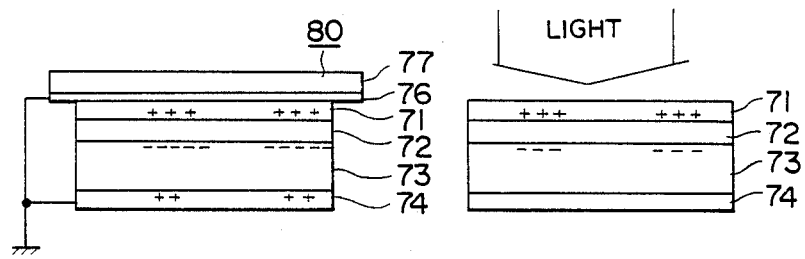

A description will be provided hereinunder of the method of recording an image in this image accumulator 4, with specific reference to FIGS. 19A to 19D. For the purpose of recording, an auxiliary electrode 80 is placed in contact with the glass substrate, as shown in FIG. 19C. The auxiliary electrode 80 has a conductor layer formed by evaporation deposition from a material such as tin oxide.

For the purpose of recording an image, as shown in FIG. 19A, the image accumulator 4 is wholly exposed to the light from LEDs 210, 211 while the same is pulled in the direction of the arrows OF, and then the pressure is relieved after interrupting the light.

In consequence, positive and negative charges are generated across the piezoelectric photoconductive layer 73 in the direction of the palling previously given thereto, as shown in FIG. 19B. Thereafter, the auxiliary electrode 80 is placed such that its conductive layer 76 contacts the semiconductor layer 71, while commonly grounding the conductive layers 76 and 74, as shown in FIG. 19C. Then, the image accumulator 4 is exposed to a predetermined light image through the exposure member EM shown in FIG. 1. In consequence, the resistance level is lowered in the exposed region of the piezoelectric photoconductive layer 73 and charges accumulated in such region are eliminated. On the other hand, in the non-exposed region, i.e., the region which has not been subjected to light, positive and negative charges are injected into the respective photoconductive layers 76, 74 so as to reduce the surface potential of the image accumulator to zero. The positive charges injected into the conductive layer is charged into the semiconductor layer 71 without delay. In this state, the auxiliary electrode 80 is removed while grounding the conductive layer 74, followed by exposure of the whole surface to the light from LEDs 210 and 211, whereby the charges are maintained to store the image as shown in FIG. 19D.

Thus, the image accumulators explained in connection with FIGS. 17A to 17D and FIGS. 19A to 19D are capable of generating electrostatic charges by itself, so that there is no need for the apparatus to have any external charging means. In consequence, the mechanism and the process are remarkably simplified.

A description will be provided hereinunder as to the sixth embodiment of the present invention.

Figure 22:
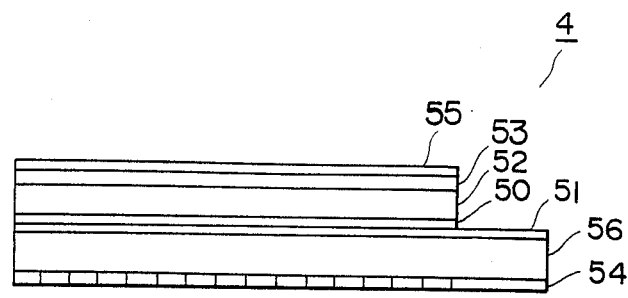
FIG. 22 is a schematic sectional view of a sixth example of the image accumulator.

FIG. 22 shows in section an image accumulator 4 which is suitable for use in this embodiment. The image accumulator 4 has a film-like form which is substantially the same as that explained in connection with FIG. 3. More specifically, the image accumulator 4 has a transparent substrate film 56, and laminated layers on one side of the substrate film 56 including a transparent conductive layer 51, an N-type photoconductive layer 52, a transparent insulating layer 53, and a semiconductor layer 55. On the other side of the transparent substrate film is formed a color filter layer 54. Thus, in this Figure, the same reference numerals are used to denote the same parts or members as those appearing in FIGS. 1 to 21.

The color filter layer 54 in the above-explained image accumulator 4 is formed by a known technique such as evaporation from various organic pigments. Examples of such organic pigments are: copper phthalocyanine pigments; lead phthalocyanine pigments; pelylene pigments; indigo pigments; thioindigo pigments; disazo pigments; trisazo pigments; tetrazo pigments; and so forth. A color separation filter for three primary colors of R, G and B can be formed with these pigments by forming, through vacuum evaporation method, a red filter composed of irgazine red BPT (produced by CHIBAGAIGEE) having a thickness of about 3000Å, a blue filter composed of copper phthalocyanine having a thickness of about 5000Å, a green filter composed of Fastogen Super Yellow GROH (produced by Dai-Nippon Ink K.K.) having a thickness of about 4000Å, and a copper phthalocyanine layer of about 1500 Å formed on the blue filter.

It is possible to produce a tri-color filter having a mozaic or striped pattern by employing suitable photolithographic technique in the respective steps. Although the invention may be successfully carried out using such filters having mozaic or striped patterns, in the embodiment under description, pigments of three colors are simultaneously evaporated or spattered in any desired pattern so that color mozaic filter is formed without using any photolithographic process. With this filter, it is possible to obtain a color image having an extremely high level of resolution.

It is also possible to form the filter using colored agents such as colored polyimide, colored polyamideimide, colored esterimide, and colored polyester. The coloring of these elements may be effected by dispersing organic pigments together with a dispersing agent in a solution of polyamic acid as a precursor together with a dispersing agent such as azo dyestuffs, phthalocyanine dyestuffs and triphenylmethane dyestuffs having a substitutive group, e.g., hydroxy group, carboxyl group, sulfonic group, and carbonamide group.

Figure 23:
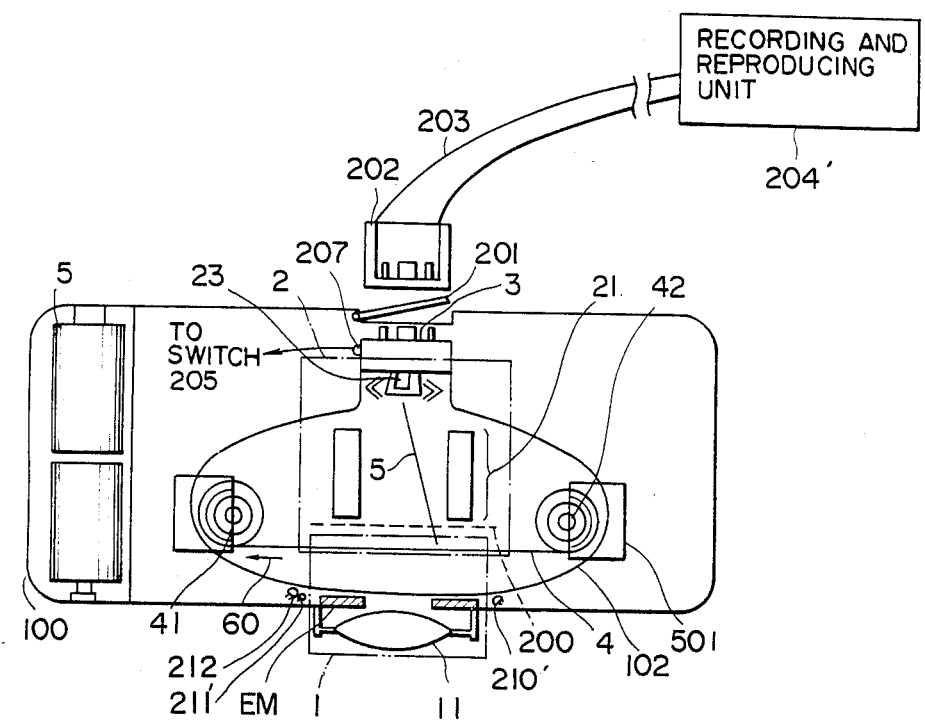
FIG. 23 is a schematic top view of a seventh embodiment of the image recording and/or reproducing apparatus in accordance with the present invention which employs the image accumulator shown in FIG. 22.

FIG. 23 shows the construction of the image recording and/or reproducing apparatus embodying the present invention and suitable for use with the image accumulator 4 shown in FIG. 22. This apparatus is different from that shown in FIG. 1 in that light-emitting diodes 210', 211' and 212 are used for successively irradiating the image accumulator 4 with colors such as R, G and B during reading of the recorded image and in that the construction of the recording and reproducing unit 204' is somewhat different from the unit 204 explained in connection with FIG. 1.

The recording of an image on the image accumulator 4 shown in FIG. 22 is conducted in a manner which will be explained hereinunder with specific reference to FIGS. 24A to 24C.

Figure 24A:
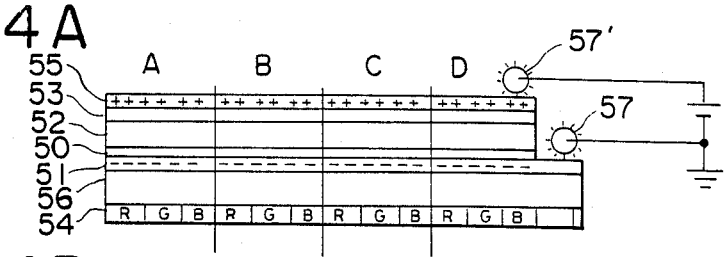
FIGS. 24A to 24F are illustrations of methods for recording and reproducing images in and from the image accumulator shown in FIG. 23.
Figure 24B:
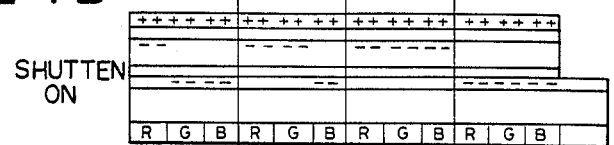
Figure 24C:
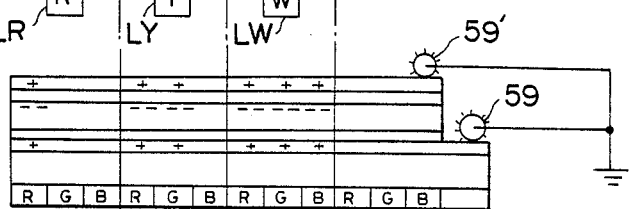

With the image accumulator 4 placed in a dark place, positive charges are supplied into the semiconductor layer 55 through a conductive brush or roller 57, 57' while the transparent conductive layer 51 is grounded or held at a negative potential, as shown in FIG. 24A. The thus supplied positive charges are immediately injected through the semiconductor layer 55.

The exposure member EM shown in FIG. 23 is then opened to expose the image accumulator 4 to an image. It is assumed here that regions A, B and C on the image accumulator receive, respectively, red color light $L_R$, yellow color light $L_Y$ and white color light $L_W$ and that a region D does not receive any light. In the region which receives the red color light $L_R$, only the portion of the photoconductive layer corresponding to the red filter R receives the light, so that the resistance level is lowered only in this portion of the photoconductive layer 52, thus allowing negative charges to be injected into the photoconductive layer 52 from the transparent conductive layer 51 through the barrier layer 50. In the region to which the yellow color light $L_Y$ is applied, the light is transmitted only at portions corresponding to the red and green filters R and G and negative charges are injected only at these portions into the photoconductive layer 52. In the region which receives the white color light $L_W$, the injection of negative charges takes place over the entire area of this region, because the light passes all the filters R, G and B. In consequence, the image accumulator is charged to the state as shown in FIG. 24B. Then, after closing the exposure member EM, the transparent conductive layer 51 is grounded and, using conductive brushes or rollers 59, 59' grounded through this layer 51, the positive charges on the dark region and the negative charges of the bright region are negated by each other through the semiconductor layer 55. At the same time, the charges are distributed to the semiconductor layer 55 and the transparent conductive layer 51 such that the surface potential of the bright region is reduced to zero, as shown in FIG. 24C.

After the completion of the recording process explained in connection with FIGS. 24A to 24C, the image accumulator 4 which has stored the image in the form of electrostatic charges is wound into the form of a roll so as to be stored.

For the purpose of reading the stored image, the image accumulator is connected to the recording and reproducing unit 204 through coupling of the connectors 3 and 202 to each othr, and the reading operation is commenced in response to the operation of a switch which is not shown.

As the reading operation is started, latent images of the respective colors are formed and read in a process which will be explained hereinunder with reference to FIGS. 24D to 24F.

Figure 24D:
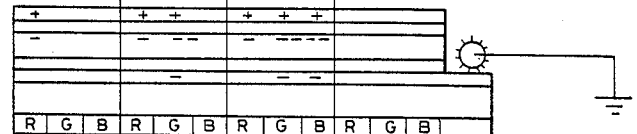

More specifically, in the state shown in FIG. 24D, the whole surface of the image accumulator 4 is exposed to red color from the red light emitting diode 210' while the transparent conductive layer is grounded. In this case, the light is passes only through the portions where red filters R are provided and reduction in the electric resistance takes place only in these portions of the photoconductive layer 52. As a result, the positive and negative charges across these portions of the photoconductive layer 52 are negated by each other. In consequence, only the charges across the insulating layer 53 remain in the portions corresponding to the red filters R in the respective regions A, B and C.

Then, the image accumulator 4 is scanned by an electron beam and secondary electrons or returning beam is detected in a manner explained before, where the pattern of the portions of image having red color component is read in the form of a time-series electrical signal. This time-series electrical signal is then sent to the external memory incorporated in the image recording and reproducing unit 204 so as to be stored therein on the field basis, i.e., in the form of a first field signal.

Figure 24E:
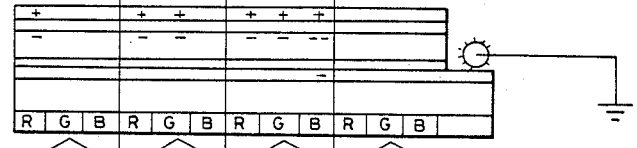

In the state shown in FIG. 24E, an operation is conducted substantially in the same manner as the state shown in FIG. 24D, except that the whole area of the image accumulator is exoosed to the light from the green light emitting diode 211' instead of the red light emitting diode. In this case, therefore, the light is transmitted only through the green filters G with the result that positive charges appear in the portions of the insulating layer 53 corresponding to the green filters G in the respective regions B and C. Then, the scanning with the electron beam is conducted again. In this case, positive potential appear in the red portions shown in FIG. 24D and also in the portions corresponding to the green filters G, so that a second field signal is read as the sum of the red component and the green component of the exposure light. The second field signal also is stored in the external memory.

Figure 24F:
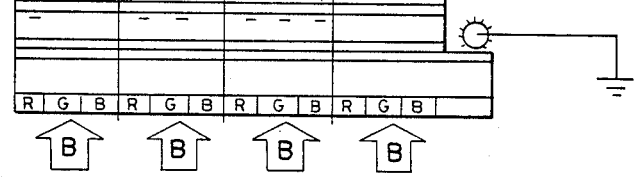

Then, in the state shown in FIG. 24F, the whole surface exposure is conducted by using the blue light emitting diode 212, so that a positive potential is established in the portion of the region C corresponding to the blue filter B.

Then, reading scanning is conducted with electron beam so that a third field signal is read as the sum of the red, green and blue components of the exposure light. This third field signal also is stored in the memory in the recording and reproducing unit 204.

Using the first to third field signals thus stored, color separation signals R, G and B of red, green and blue colors are obtained. Namely, the signal B is obtained by substrating the second field signal from the third field signal, and the signal G is obtained by substrating the first field signal from the second field signal. The signal R is directly derived from the first field signal.

FIG. 25 shows the arrangement of the image recording and reproducing unit 204 suitable for use with the above-described image accumulator. In this Figure, the same reference numerals are used to denote the same parts or elements as those appearing in FIG. 8. The recording and reproducing unit 204 has subtractors 414, 415, process circuits 416 to 418, an NTSC output terminal 419 and a system controller 420.

The image signal derived through the cable via the connector 202 undergoes various correcting operations conducted by the processing circuit 405 and is fed to the modulation circuit 406 where a modulation suitable for the recording is effected on the processed image signal. The modulated image signal is then recorded in the recording medium 413 through a switch 407 and a head 408, such that image signals corresponding to one field are recorded in one track on the medium 413. By supplying the first to third field signals to the contacts b, c and d of the switch 407, it is possible to record these field signals in three tracks at the same rotational phase. For reproducing the recorded image signals, the switch 407 is turned to connect the contact a thereof, and the image signals are simultaneously read from three tracks by means of three heads 408. These signals are then demodulated by the demodulation circuit into signals of original forms, and subtracting operations are performed: namely, the second field signal is subtracted from the third field signal thus determining the B signal, and the first field signal is subtracted from the second field signal thus determining the G signal. At the same time, the signal R is obtained from the first field signal.

The R, G and B signals thus obtained are then subjected to shaping processing conducted by the processing circuit and are converted into Y, R-Y signals in a matrix circuit 411. These signals are then converted into standard television signals such as NTSC signals by an encoder 412 and are delivered to an output terminal 419. It is, therefore, possible to monitor the color image on the frame basis through a TV receiver connected to the output terminal 419. The control signals for controlling the switch 407 and the demodulation circuit 410 from the system controller are delivered to the camera 100 through the connector 203, thereby attaining synchronous control of the LEDs 210', 211' and 212 in the camera.

It will be clear to those skilled in the art that the monitoring of the color image can be conducted on the frame basis provided that two fields of color signals are recorded in each track of a disk-shaped medium. Needless to say, the encoder used in this embodiment may be of the type which corresponds to PAL or SECAM system.

In this embodiment, the image is stored in the form of electrostatic charges left in the conductive layer and the semiconductor layer across the insulating layer. Such form of storage of image, however, is only illustrative and various forms the accumulation of electrostatic charges and various methods of storage are within the scope of the present invention.

As will be understood from the foregoing description, the present invention enables the image recording operation and the image reading operation to be conducted independently without causing any change in the states of the recorded and read images, by virtue of the use of a specific image accumulator. It is, therefore, possible to record an image with a high degree of resolution by a simple device which is easy to handle and carry, thus widening the application of image recording and/or reproducing apparatus of the kind described. In addition, recording of color images can be conducted with a high degree of fineness.

Figure 26:
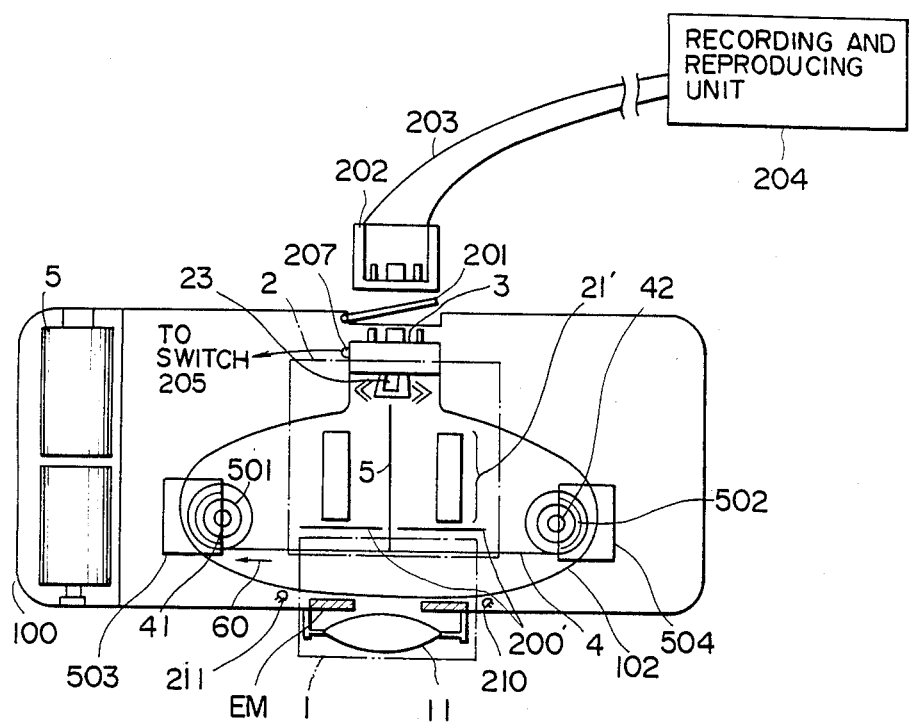
FIG. 26 is a partially cut away top view of an eighth embodiment of the image recording and/or reproducing apparatus in accordance with the present invention.
Figure 27:
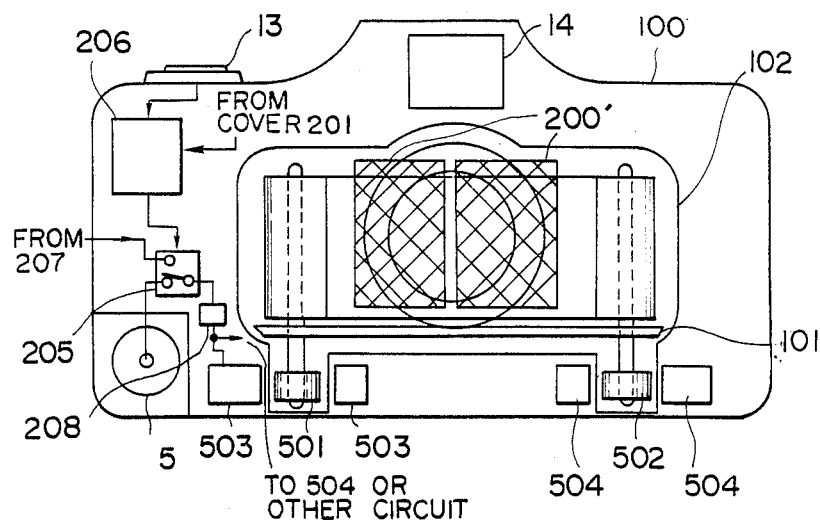
FIG. 27 is a front elevational perspective view of the eighth embodiment.
Figures 28A, 28B:
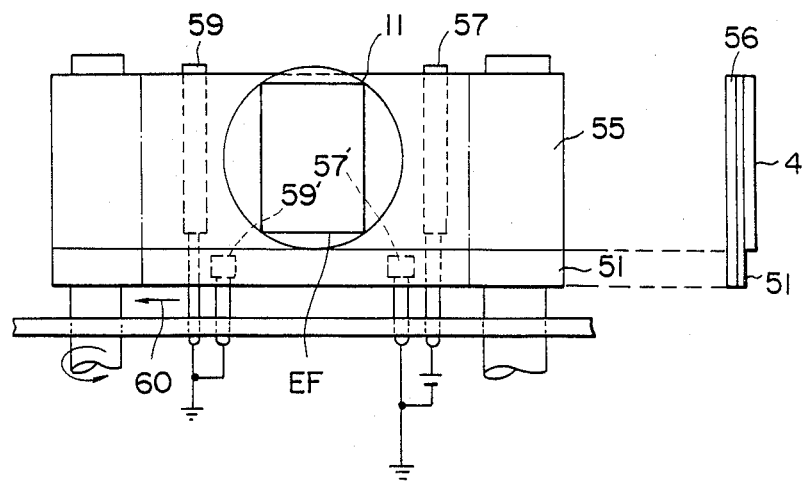
FIGS. 28A and 28B are illustrations of selected details of the embodiment shown in FIG. 27.

FIGS. 26 and 27 show an eighth embodiment of the image recording and/or reproducing apparatus in accordance with the present invention. More specifically, FIG. 26 is a transparent view as viewed from the upper side, while FIG. 27 is a transparent view as viewed from the front side of this embodiment. As will be explained later in connection with FIG. 28, the effective frame in this apparatus has a form which is elongated in the vertical direction as viewed in FIG. 27, so that the user aims at the object with the apparatus turned sideways from the position shown in FIG. 27.

The basic arrangement of this embodiment of the image recording and/or reproducing apparatus is substantially the same as that shown in FIG. 1. A beam scanning section 21' forms an electric field or a magnetic field which is varied in a controlled manner so as to deflect the electron beam only in the direction of the main scan which is perpendicular to the plane of FIG. 26. At the same time, coils 501, 502 are moved in the direction of the sub-scan indicated by an arrow 60 by energization of the coils 501, 502 which constitute moving means, whereby the image carrying surface of the image accumulator is scanned by the electron beam, thus allowing the accumulated image to be read. In consequence, the effective frame EF has a shorter size in the direction of winding than in the widthwise direction of the film, i.e., the image accumulator.

The electron beam emitted from the electron gun 23 is applied to the image accumulator 4 through a slit electrode 200' after focusing and deflection effected by the beam scanning unit 21, and the secondary electrons emitted from the image accumulator as a result of application of the electron beam are detected by the slit electrode 200'. A lead line (not shown) leads from the slit electrode 200' to the output terminal in the connector 3 through the inner wall surface of the container 102. Preferably, a predetermined bias voltage is applied to this slit electrode 200' through the lead line mentioned above. Thus, in this embodiment, the main scan is effected by the focusing and deflection of the electron beam, while the sub-scan is accomplished by the movement of the image accumulator itself. This arrangement may appear to complicate the scanning system. Actually, however, the construction of the beam scanning unit is simplified because the apparatus inherently has means for moving the image accumulator with respect to the beam source. In addition, the collecting efficiency of the collector electrode also is improved appreciably.

In this embodiment, the charging of the image accumulator 4, as well as the removal of charged therefrom, may be conducted by means of conductive brushes or rollers or, alternatively, by making an efficient use of the electron gun 23 incorporated in the apparatus in synchronizm of the sub-scan movement of the image accumulator 4.

The charging and charge elimination by means of the electron gun 23 is conducted in the following manner. Namely, the conductive layer 51 is used as a back electrode and a collector electrode is placed in the vicinity of the image accumulator 4. With this arrangement, it is possible to change the polarity of the charges supplied to the semiconductor layer 55 of the image accumulator 4, through a suitable control of the acceleration voltage.

For charging the image accumulator 4, the voltage of the collector electrode is increased to a sufficiently high level, while the velocity of the electrons of the electron beam is reduced. In such a case, the quantity of the electrons from the electron gun exceeds that of the secondary electrons generated as a result of collision, so that the semiconductor layer is charged negatively. Conversely, when it is desired to charge the surface of the semiconductor layer positively, the acceleration voltage is selected at a considerably high level so that the quantity of the electrons from the electron gun is exceeded by the quantity of the secondary electrons, thus allowing the surface of the semiconductor layer to be charged positively.

The charging of the image accumulator 4 in negative polarity may be effected by other means than the described electron gun, i.e., by a tungsten filament installed internally of the apparatus and capable of emitting thermal electrons.

In the charging method described above, the control of the positive potential is possible through a control of the collector voltage within a region where the rate of emission of the secondary electrons exceeds the rate of discharge of the primary electrons.

Figure 29:
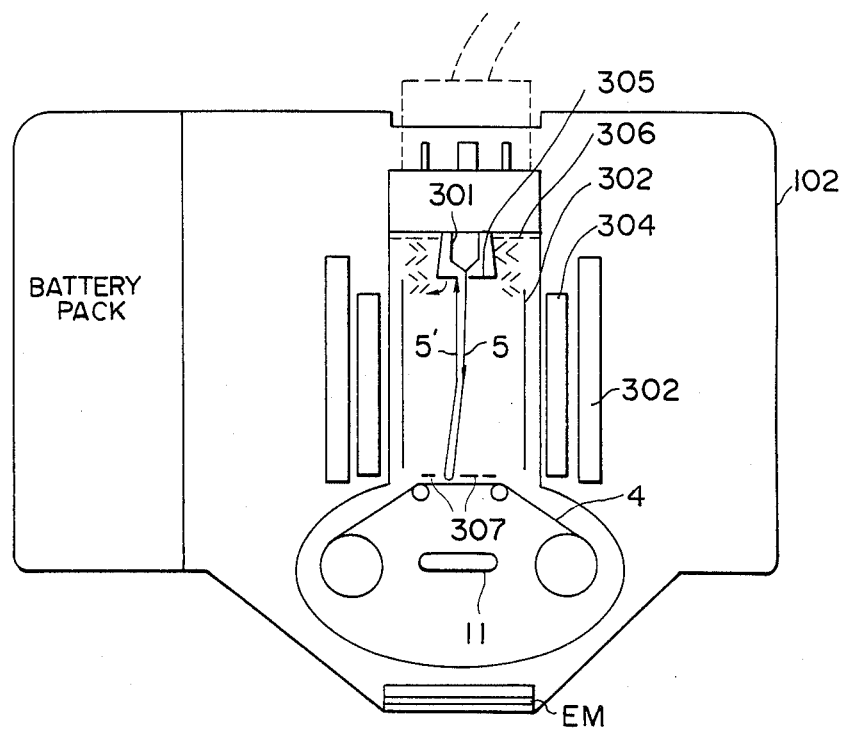
FIG. 29 is a partially cut away top view of a ninth embodiment of the image recording and/or reproducing apparatus in accordance with the present invention.

FIG. 29 shows a modification of the arrangement shown in FIG. 26 and is similar to the arrangement shown in FIG. 7, except that a slit plate 307 is provided in addition to the arrangement of FIG. 7.

The slit plate 307 is effective in materially thinning the electron beam 5. The electron beam scans only in the direction the main-scan and the sub-scan is effected by moving the image accumulator in the direction perpendicular to the direction of the main scan, as in the case of the preceding embodiment. Thus, this modification also contributes to a simplification of the arrangement for the focusing and deflection of the scanning electron beam.

The construction of the recording and reproducing unit 204 is materially the same as that shown in FIG. 8. The focusing and deflection circuit 403 forms a beam-deflecting saw-tooth wave signal in accordance with main-scan synchronizing signal derived from the synchronous signal generator 404, and delivers this saw-tooth wave signal to the connector 202 also through the cable 203. The main-scan synchronizing circuit produces the saw-tooth wave signal corresponding to one period of the horizontal scan for each of the interval $T_m = nT_v + mT_H$ ($T_H$ represents one television horizontal period, m represents an integer from 1 to N and represents the total number of scan lines) between the m—th and (m−1)—th main scan periods on the condition that $T_s = nT_v$ ($T_v$ represents one television field period and n represents an integer).

The image signal obtained through the cable via the connector 202 is sent to the processing circuit 405 where various operations are conducted such as marking detection, α correction, aperture correction, black-level clamp, white clip and so forth, and the thus processed signal is then modulated by the modulation circuit 406 into a form suitable for recording. The modulated signals are then recorded in the medium 413 through a switch 407 and a head 408, such thateach of the tracks formed in the medium accommodates signals corresponding to one field. As stated before, the main scan signal is obtained for each time interval $T_m$. The main scan signal therefore is written in the same track on the disk each time it is obtained. Since the disk motor is constructed to make one full revolution in the period $T_v$, signals corresponding to one horizontal line are recorded for each n-revolutions of the disk and the horizontal line signals are rearranged in such a manner as to be continuous on one track. During the reproduction, the signals read from the head 408 are demodulated into signals of original form by the demodulation circuit. In this state, the main scan signals (horizontal line signals) are continuous and the demodulated signal is converted by the encoder into standard television signal such as NTSC signal which is then output through an output terminal 412. It is therefore possible to monitor the image on the field basis by a TV receiver connected to the NTSC output terminal 412.

Figure 30:
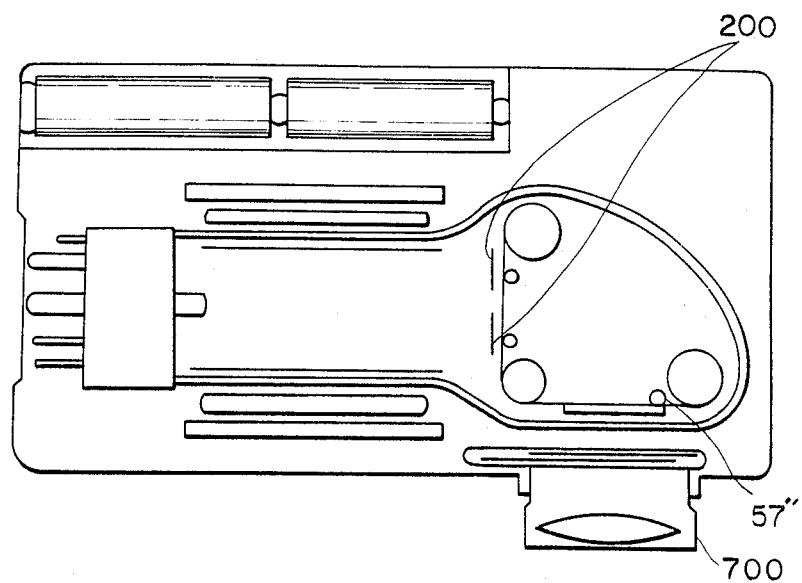
FIG. 30 is a schematic view of a tenth embodiment of the image recording and/or reproducing apparatus in accordance with the present invention.

FIG. 30 shows a modification of the image recording and/or reproducing apparatus of the invention shown in FIG. 26. This modification is similar to the arrangement shown in FIG. 9 except that a grounded electrode 57″ is disposed on the back side of the image accumulator 4 in the recording part, in place of the grounded brush or roller 57′. The grounding electrode 57″ serves to keep a high degree of flatness of the image accumulator 4. The modification shown in FIG. 30 has a slit electrode 200′ similar to that employed in the arrangement shown in FIG. 26. Thus, the modification shown in FIG. 30 is a further simplification of the construction of to the arrangement shown in FIG. 9.

FIGS. 31A and 31B show another modification of the image recording and/or reproducing apparatus of the invention shown in FIG. 26. This modification is similar to the arrangement shown in FIG. 21 except that a beam extraction window 1005 is provided in the front side of the container 102 in place of the multi-line pin electrode 1020 used in the arrangement shown in FIG. 21. The beam extraction window 1005 has the form of a slit which extends in a direction perpendicular to the lane of the sheet.

The arrangement shown in FIGS. 31A and 31B enables the image to be read through a brush roller 12000 from the same side as the substrate. The brush roller 12000 also is connected to a signal output terminal 1006 through a switch 1008. A signal pick-up pin 1007 provided on the reading part 1007 is adapted to be connected to the signal output terminal 1006 when the camera 100 is coupled to the reading part 2000.

In this modification, the reading of an electronic pattern is conducted by a method the principle of which is disclosed in, for example, "Diode detection of information stored in electron-beam addressed MOS structure" by G. W. Ellis et al, Applied Physics Letters Vol. 24, No. 9, May 1, 1974, so detailed description of this method is omitted. Thus, the eighth embodiment of the present invention features an image recording part and an image reading part that are operable independently of each other without causing any change in the state of each other. Thus the construction is simplified due to the fact that the electron beam conducts only the main-scan while the sub-scan is conducted by the driving means which is inherently provided in the apparatus for the purpose of feeding the image accumulator.

Figure 32A:
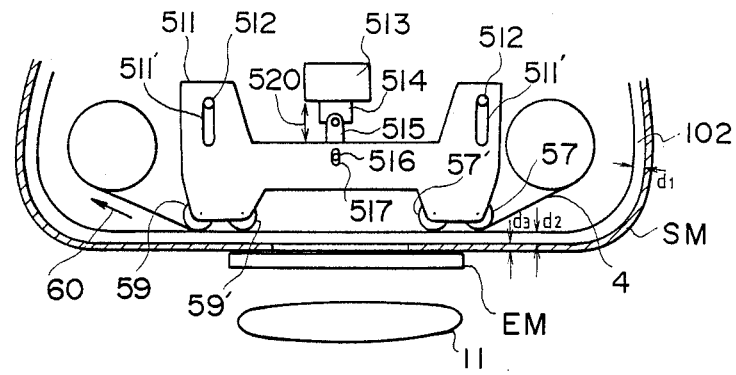
FIGS. 32A and 32B are schematic views of another example of the recording part of the present invention.
Figure 32B:
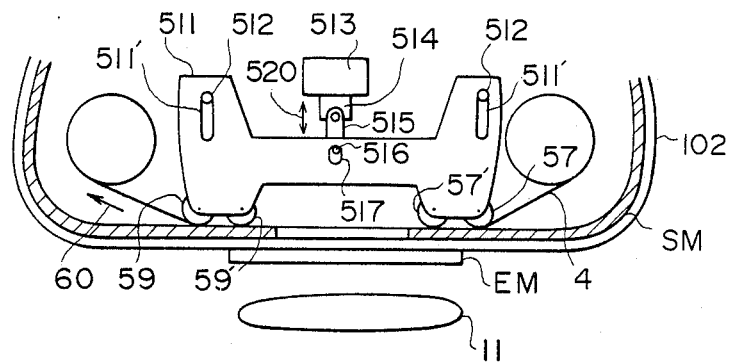

FIGS. 32A and 32B show the detail of the image recording part 1 in the embodiment shown in FIG. 1.

Referring first to FIG. 32A, rollers 59, 59′, 57 and 57′ are rotatably mounted on a slide plate 511. A reference numeral 511′ denotes an elongated hole formed in the slide plate 511 and adapted for receiving a pin 512 projected from the stage 101. Thus, the slide plate 511 is slidable along the elongated hole 511' in the direction of the arrow 520.

A plunger 513 has an armature 514 which is connected to the slide plate 511 through a lever 515. The armature 514 also is provided with a pin which is received in a hole 517 formed in the slide plate 511.

In a first state in which the armature 514 has been moved by the plunger 513 to the uppermost position, the rollers 59, 59', 57 and 57' are spaced from the inner wall surface of the container 102. However, in a first state in which the armature 514 has been moved by the plunger 513 to the lowermost position, the rollers 59, 59', 57 and 57' serve to press the image accumulator 4 onto the inner wall surface of the container 102. The plunger 513 is provided with a magnet therein so that it is held either in the first or the second state even when the electric power supply to the coil is stopped.

A shield member SM is a coating member provided on the surface of the container and having a thickness d3. Thus, the light is allowed to pass only through a window corresponding to the effective field EF shown in FIG. 6A, and is interrupted by other portions of the container. The surface of the container 102 confronting the optical system 11 is finished to have a high degree of flatness. The wall thickness d2 of the portion of the container 102 facing the optical system 11 is smaller than the thickness d1 of other portions.

In the initial state of the operation, the plunger is held in the first state. Then, after aiming the camera at an object, the user turns the shutter switch 13 to the state of half switching, so that a voltage is applied between the charging brush roller 57 and the grounding brush roller 57' shown in FIGS. 32A and 32B and the driving coils 503, 504 are activated to feed the film in the direction of the arrow 60, whereby the whole surface of the image accumulator 4 is uniformly charged.

In this state, the plunger is held in the first state so that the image accumulator 4 is not held in contact with the wall of the container 102 although it is contacted by the rollers 59, 59', 57 and 57'. Therefore, the feed of the image accumulator 4 in the direction of the arrow 60 can be effected without encountering substantial resistance.

After the feeding of the image accumulator by a predetermined amount corresponding to one frame, the power supply to the coils 503 and 504 is stopped and the coil associated with the plunger 513 is energized to move the plunger 513 to the second state, whereby the image accumulator 4 is pressed onto the inner wall surface of the container 102 by the rollers 59, 59', 57 and 57'.

Therefore, the image accumulator is suitably braked and the flatness of the image accumulator is enhanced because it is spread on the inner wall surface of the container.

Subsequently, the shutter switch 13 is turned to the full-switching state, so that the exposure member EM is operated thereby causing the image accumulator 4 to be exposed through the optical system 11, thus recording an image as shown in FIG. 4B.

In this arrangement, when the exposure is finished, the distance between the aperture of the exposure member EM and the image accumulator 4 is as small as the sum of the thickness d2 of the container 102 and the thickness d3 of the shield member SM, so that the undesirable effect of diffraction of light is minimized. In consequence, any fogging due to application of light on unexposed portion is avoided so as to ensure a high quality of the recorded image.

Then, the shutter switch is freed so that the electric power is supplied again to the coil of the plunger 513 so that the latter resumes the first state. In addition, the driving coils 503, 504 are activated again to feed the image accumulator in the direction of the arrow 60 by a distance corresponding to one frame. Meanwhile, the electrostatic charges are removed from the whole area through the grounding brushes 59, 59', whereby the image is held in the state shown in FIG. 4C. Subsequently, the image accumulator is reversed in the direction opposite to the arrow 60 by a distance corresponding to one frame, whereby the image accumulator is located at a position suitable for the uniform charging prior to the recording on the next frame.

In the embodiments explained in connection with FIG. 1 and FIGS. 32A and 32B, the container 102 is made of glass. However, as explained before, all that is necessary is that the container 102 is transparent at least the image recording part 1 and is flat and parallel to the plane of the image accumulating surface in the portion constituting the passage for the exposure light so as to avoid any unfavourable effect, such as distortion or interference of the image light. In order to minimize the diffraction of light and the consequent flare, the shielding member SM for shielding the light is preferably formed on the inner surface of the container 102 as shown in FIG. 32B.

It is also possible to construct the light passage portion of the container 102 in the form of a lens.

In this embodiment, the brush rollers 59, 59', 57 and 57' not only conduct the application of voltage for the purpose of charging or charge removal but also serves to selectively press the image accumulator 4 onto the inner wall surface of the container 102. It is, therefore, possible to set the image accumulator at a high degree of flatness and exactly at a right angle to the optical axis, simply by forming the front portion of the container 102 with a high degree of flatness and exactly at a right angle to the optical axis. In consequence, it is easy to obtain a high resolution of the image in the recording and reproduction thereof. Thus, the construction is simplified appreciably by making use of the rollers or brushes as charging or charge removal means also as means for attaining high flatness of the image accumulator 4 in the image recording part.

In the embodiments explained hereinbefore, the apparatus includes a vacuum container which accommodates various movable parts such as the winding shafts 41, 42, magnets 501, 502, and so forth. Thus, the apparatus described hereinbefore exhibits a small resistance to vibration. However, the utility of this apparatus will be seriously limited if the handling thereof requires greatest care.

Figure 33A:
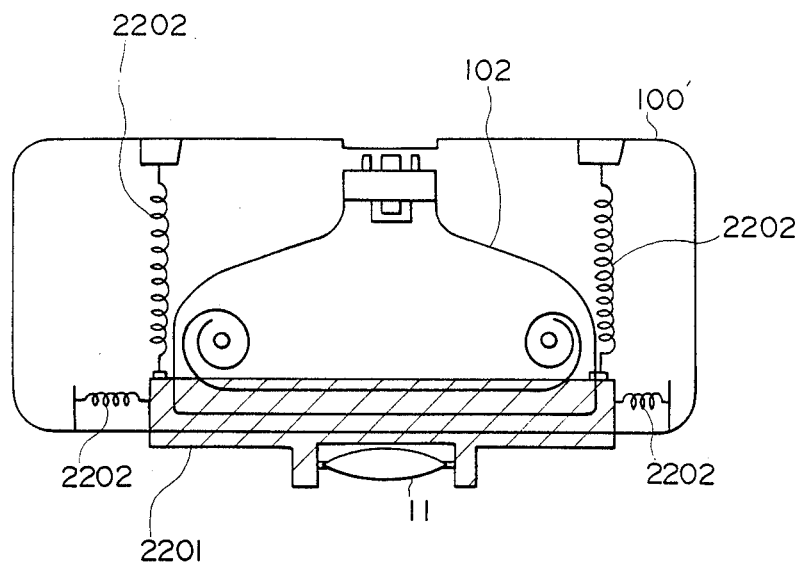
FIGS. 33A and 33B are a top plan view and a front elevational view, respectively, of a twelvth embodiment of the image recording and/or reproducing apparatus in accordance with the present invention.
Figure 33B:
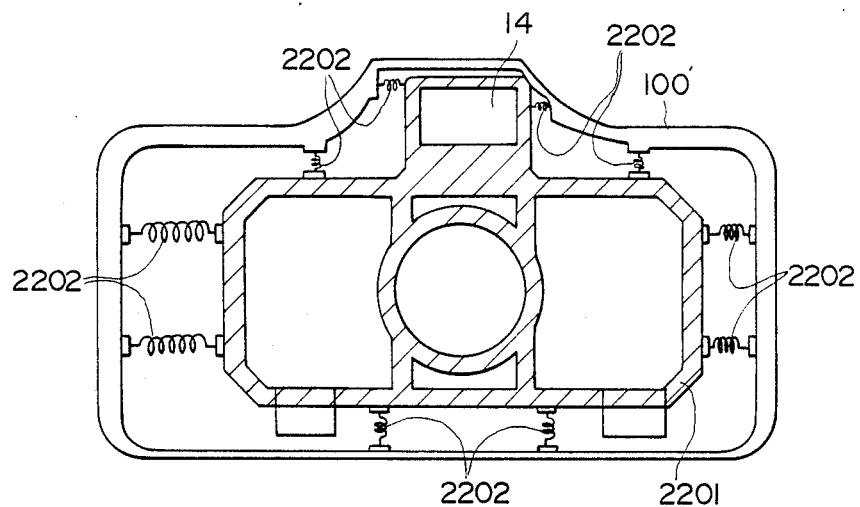

Therefore, it is advisable to hold the container 102 on the camera housing 100' in a floating manner through a resilient member such as a spring, as shown in FIGS. 33A and 33B. This, however, enhances the risk of undesirable offset of the image focusing position, if the optical system 11 is fixed to, for example, the camera housing 100'.

According to the invention, the optical system 11 is rigidly and integrally fixed to the container 102 through a fixing member 2201 which may be a die-cast member, and the optical system 11 and the container 102 as whole is resiliently fixed to the housing 100' through the intermediatery of the resilient member 2202. Preferably, the finder optical system 14 also is held together with the fixing member 2201. It is to be understood that FIGS. 33A and 33B illustrates only the essential portions for the purpose of simplification of illustration.

A detailed description will be provided hereinunder of the means of preventing or damping vibration, with reference to FIGS. 33A and 33B which are a top plan view and a front elevational view of the apparatus. In these Figures, the same reference numerals are used to denote the same parts or members as those appearing in FIGS. 1 to 32. The fixing member 2201 made by die-casting and the resilient holding members 2202 such as springs are used as the means for preventing or damping the vibration. As shown in these Figures, the optical system 11 and the container 102 are integrally connected to each other through the fixing member 2201 and the integral body is supported in a floating manner on the camera 100 through the resilient holding members, thereby preventing any vibration from being transmitted to the container 102. In view of the small error involved by the finder optical system, it is not essential that the finder optical system be fixed to the integral body.

The fixing member 2201 need not always be a die-cast member. Any suitable member formed by a suitable method from a hard resin, metal or other material may be used, provided that it can rigidly hold the optical system 11 on the container 102. The resilient holding members also may be substituted by suitable alternative means having a damping effect, e.g., a pneumatic or hydraulic vibration damper. Needless to say, the vibration damping arrangement of this embodiment can equally be applied to the embodiments which are shown in FIGS. 1, 2, 5 to 7, 9, 10, 12, 20, 23, 26 to 30 and 32. With this arrangement, the resistance of the image recording and/or reproducing apparatus to impact is remarkably improved and the maneuverability also is improved because of elimination of any risk of optical axis misalignment.

Figure 34A:
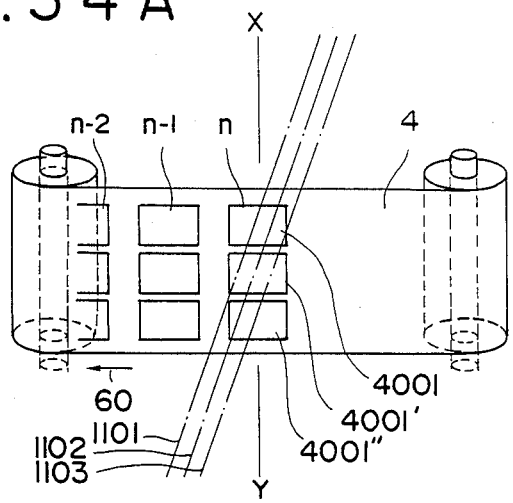
FIG. 34A is a schematic perspective view of a thirteenth embodiment of the image recording and/or reproducing apparatus in accordance with the present invention.
Figure 34B:
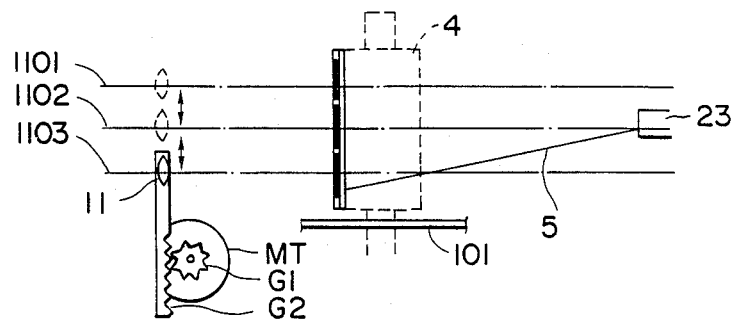
FIG. 34B is a schematic sectional view taken along line X-Y in FIG. 34A.

FIGS. 34A to 34D and FIG. 35 show a thirteenth embodiment of the image recording and/or reproducing apparatus in accordance with the present invention, designed for recording data such as color images on the image accumulator 4. This thirteenth embodiment can be used in combination with any one of the arrangements shown in FIGS. 1 to 33. FIG. 34A is a perspective view of this embodiment, while FIG. 34B is a sectional view taken along a plane which contains a straight line X-Y and optical axes, e.g., three optical axes 1101 to 1103. FIG. 34B also shows diagrammatically the positions of the optical system and the electron gun.

The image accumulator 4 used in this embodiment is characterized in that a plurality of frames of image are arranged not only in the winding direction 60, i.e., the longitudinal direction, of the image accumulator but also in the direction perpendicular to the winding direction, i.e., also in the direction of the line X-Y. This is possible because the image accumulator enables images to be packed at an extremely high density. For instance, when images are accumulated at a resolution on the order of 1000 lines/mm which is equivalent to or higher than that provided by silver chloride negative film, the size of square or rectangular frame is as small as 4 to 6 mm in side length. Thus, the image accumulator 4 has the form of a tape rather than a film, provided that the images are accumulated only in the direction of winding. The tape-like form of the image accumulator 4 does not cause any inconvenience. However, if the image accumulator has a width which is large enough to accomodate a plurality of rows of frames, the image storing capacity is remarkably increased without being accompanied by any complication in the construction or any deterioration in the image quality. For the same reason, if the film storage capacity is given, the length of the image accumulator 4 can be reduced remarkably. This in turn reduces the number of turns of the image accumulator on the winding shafts, with the result that troubles such as unintentional charging due to radial lamination of the winding shaft. The reduced number of turns on the winding shaft in turn enables the winding shaft to have a greater diameter without increasing the size of the apparatus, while reducing stress on the image accumulator due to an increased radius of curvature of the innermost turn of the image accumulator on the winding shaft.

The accumulation of images on the image accumulator 4 can be effected by shifting the optical system 11 so as to correspond to the image positions 4001, 4001' and 4001" in FIG. 34B, namely, by shifting the optical system 11 in parallel with the line X-Y, i.e., in the vertical direction as viewed in FIGS. 34A and 34B. This is accomplished by the illustrated driving mechanism which includes a stepper motor MT, a pinion GI on the shaft of the stepper motor MT and rack G2 meshing with the pinion G1 and having an extension carrying the lens.

Figure 34C:
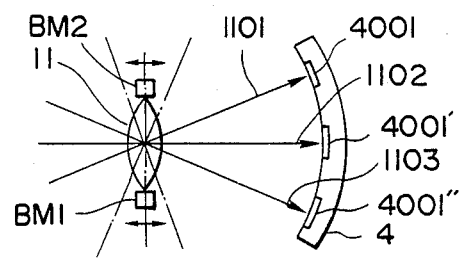
FIG. 34C is a schematic view of the oscillating optical system of the present invention.

In another known method, the optical axis of the optical system 11 is made to oscillate with respect to a reference axis as shown in FIG. 34C. In this embodiment, in order to prevent any abberation from occurring in the images 4001 and 4001" on the optical axes 1101 and 1103, the image accumulator is held in a curved state. In such a case, the shifting of the optical system 11 can be achieved by simply by moving bimorph member BM1 and BM2 in opposite directions.

The holding of the image accumulator 4 in the curves state may be realized by, for example, a pair of curved frames on both lateral sides of the effective frame EF near the exposure position so as to clamp the image accumulator 4 therebetween.

Figure 34D:
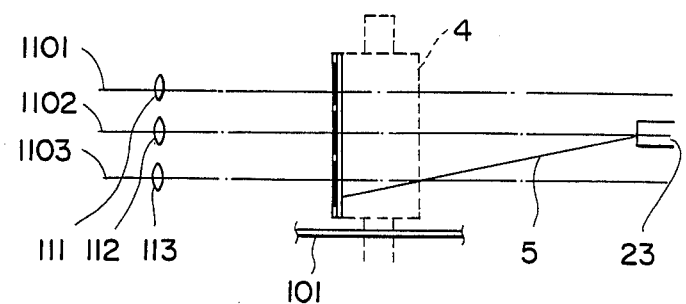
FIG. 34D is a detailed schematic sectional view of modifications of the embodiment shown in FIGS. 34A–34C.

FIG. 34D shows an arrangement which is different from that shown in FIGS. 34A to 34C. In this arrangement, independent optical systems 111, 112 and 113 are provided so as to correspond to the images 4001, 4001' and 4001". In contrast to the arrangement shown in FIGS. 34A to 34C which requires the optical axis to be moved translationally or to swing, the arrangement shown in FIG. 34D does not require such a motion and only one exposure member EM can be used for this purpose. The use of three sets of optical system is of course undesirable from the view point of simplification of the construction, but the reliability is improved because the optical axes are fixed. In addition, this arrangement does not requires the image accumulator 4 to be held in a curvature, unlike the arrangement shown in FIGS. 34A to 34C.

Needless to say, the images 4001 to 4001" formed by the arrangement shown in FIGS. 34A to 34D can be read by a scanning means having a single electron gun. The reading may be conducted in such a manner as to read the images 4001 to 4001" successively one-by-one or, alternatively, the images on the same line as the image 4001 are read in series followed by the reading of the images including the image 4001" and then by the reading of the next line.

Figure 35:
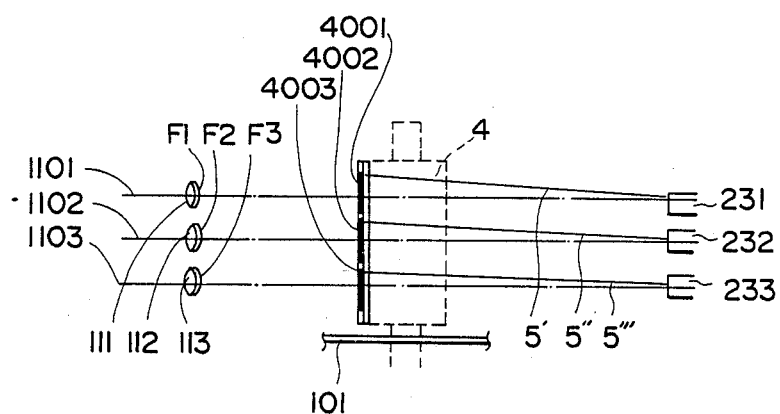
FIG. 35 is a schematic sectional view of a fourteenth embodiment of the image recording and/or reproducing apparatus in accordance with the present invention, designed for recording and/or reproduction of a color image.

FIG. 35 shows the application of the arrangement shown in FIG. 34D in the accumulation of the color image. The arrangement shown in this Figure is basically the same as that shown in FIG. 23 in so far as both includes a plurality of, i.e., three, optical systems. In addition to these optical systems, the arrangement shown in FIG. 23 employs color filters F1 to F3 having different spectral characteristics. The filters maybe of R, G and B colors, although combinations of other color filters can be used. The combination of the filters may be determined in accordance with the known color signal processing methods, so that the description is omitted as to the way of determining the types of color filters to be used.

In the arrangement shown in FIG. 35, the images simultaneously formed through optical systems having color filters can be read simultaneously by means of three electron guns 231, 232 and 233. However, the reading can be conducted in succession by a single electron gun, provided that a slight elongation of the reading time is permissible.

As has been described, in this embodiment, a plurality of images can be formed and arrayed in the direction perpendicular to the direction of feed of the image accumulator 4 simultaneously or successively, so that color images of high resolution can be formed without difficulty.

Although the described embodiment have three optical systems having filters F1 to F3, this arrangement is only illustrative and the separation of three colors may be conducted by means of a combination of a dichroic mirror and a color filter.

When the images to be recorded are monochrome as in the embodiment shown in FIGS. 34A to 34D, the number of turns of the image accumulator 4 on the winding shafts can be reduced, thus contributing to a reduction in the size of the apparatus. Instead of reducing the number of turns of the image accumulator 4 on the winding shaft, it is possible to increase the diameter of the winding shaft as to reduce the tensile stress applied to the image accumulator wound on the shaft.

FIGS. 36A to 36C and FIGS. 37A and 37B show an embodiment in which the image accumulator 4 is constructed as a disk composed of a glass disk GD and an image accumulator layer formed on the glass disk GD.

The disk-type image accumulator 4 is driven by a motor MM so as to rotate about an axis MM'. The motor MM is sealed in the vacuum container 102 together with the electron gun 23 and is connected to the connector through a lead line which is not shown. This arrangement also employs a beam deflecting means which is omitted from these figures. This arrangement enables images to be formed on different angular positions of the rotaty disk, in accordance with the rotation of the latter. This arrangement is designed also such that a plurality of images 4001, 4001' and 4011" are formed and arrayed in the direction perpendicular to the direction of rotation, i.e., along a radial line, for each angular position of the rotary disk. These images 4001, 4001' and 4001" are formed on the image accumulator through different optical axes 1101, 1102 and 1103.

Figure 36A:
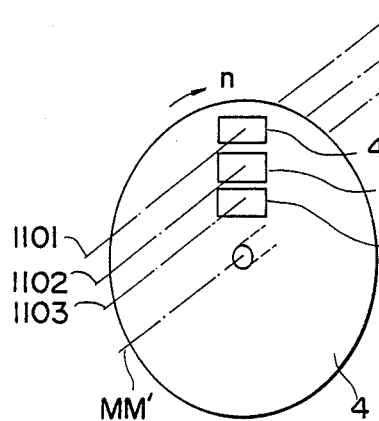
FIGS. 36A to 36C are schematic front and side views of a fifteenth embodiment of the image recording and/or reproducing apparatus in accordance with the present invention, as well as illustrations of modifications thereof.
Figure 36B:
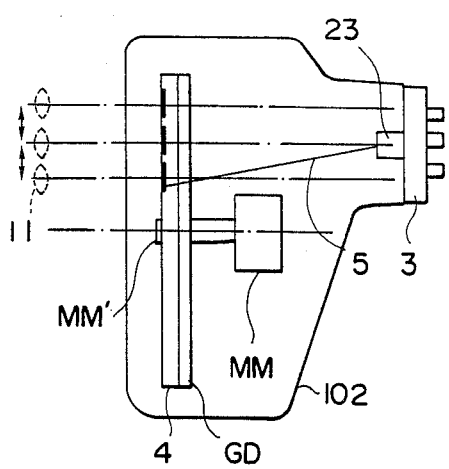
Figure 36C:
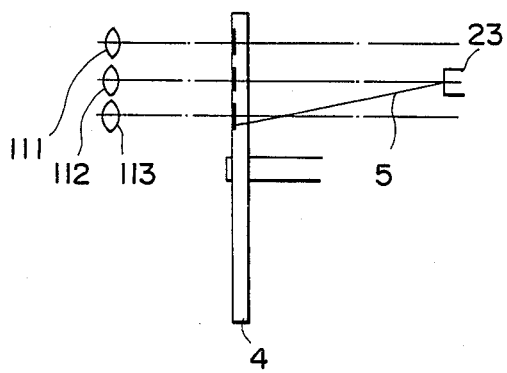

As shown in FIG. 36B, the optical axes 1101 to 1103 may be presented by translational shifting of the optical system, as in the case of the embodiment explained in connection with FIG. 34B or alternatively, three independent stationary optical systems 111 to 113 are provided.

The arrangement shown in FIG. 36 can be modified to enable recording of color images. An example of such a modification is shown in FIGS. 37A and 37B.

Figure 37A:
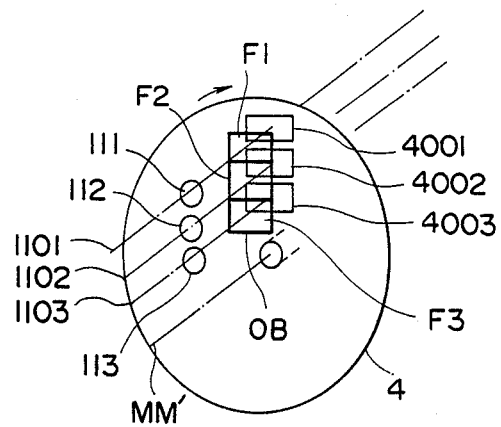

More specifically, the arrangement shown in FIG. 37A employs color filters F1 to F3 placed in the path of the incident light. In this case, the filters F1 to F3 are an R, G and B filters, although combinations of other types of color filters can be used. A light shielding mask OB is provided around the filters F1 to F3.

Figure 37B:
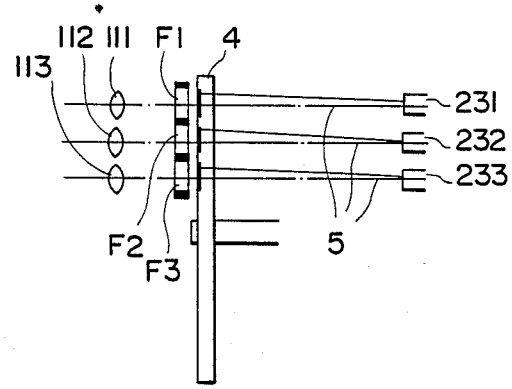

FIG. 37B schematically shows the construction of how other functions are performed, including the reading by an electron beam or beams. In this embodiment, R, G and B images 4001, 4001' and 4001" are read simultaneously by means of three electron guns 231, 232 and 233, although the arrangement may be such that the images 4001 to 4003 are read successively by an electron beam from a single electron gun.

When the image accumulator 4 has a disk-like form as described before, it is not necessary to wind the image accumulator on a winding shaft, so that problems such as distortion or break down of the image accumulator itself due to friction or the omission of electrical signals due to electrostatic charges which may be generated by friction are avoided. In addition, the disk-shaped image accumulator 4 exhibits a high degree of flatness. Needless to say, the arrangements shown in FIGS. 36 and 37 may be used in combination with any one of the embodiments described before in connection with FIGS. 1 to 32.

As will be understood from the foregoing description, the embodiment shown in FIGS. 34 to 37 ensures a high quality of the recorded and reproduced image, by virtue of the specific form of the image accumulator.

Figure 38:
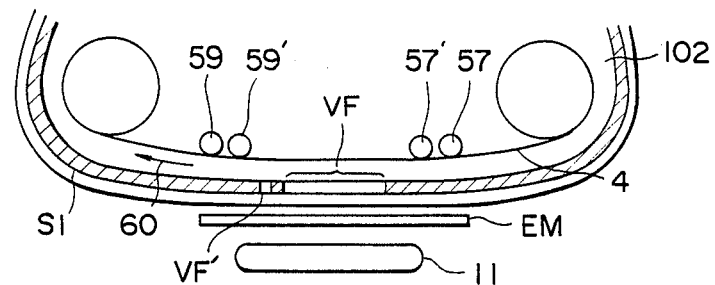
FIG. 38 is a schematic top view of a seventeenth embodiment of the image recording and/or reproducing apparatus in accordance with the present invention.
Figures 39A, 39B:
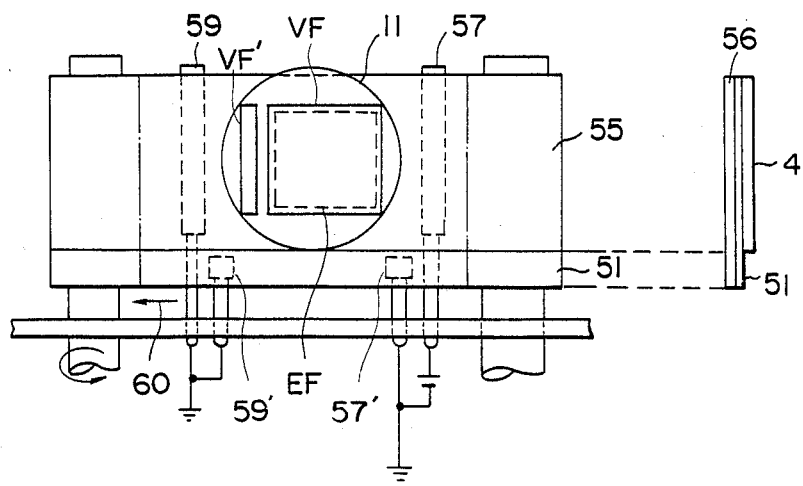
FIG. 39A is a front elevational view of the embodiment shown in FIG. 38.
FIG. 39B is an illustration of an essential part as viewed from a lateral side of the apparatus shown in FIG. 38.

FIGS. 38 and 39 show the detail of the image recording part 1 of a seventeenth embodiment of the image recording and/or reproducing apparatus in accordance with the present invention. This embodiment is a modification of the embodiment shown in FIGS. 5 and 6. In FIGS. 38 and 39, SI represents a shielding mask which coats the inner surface of the container 102 and which is provided with an aperture VF which defines the frame. A reference aperture VF' is formed in the vicinity of the aperture VF. The reference aperture VF' is intended for defining the effective frame EF. The effective frame EF is sized to be somewhat smaller than the image pickup frame so as to eliminate any unfavourable effect due to, for example, diffraction of light around the edge of the light shielding mask SI.

The size of the effective frame EF corresponds to the periods of the horizontal and vertical scans performed by the electron beam.

Other portions are materially the same as those in FIGS. 5 and 6 and, hence, are denoted by the same reference numerals.

Figure 40A:
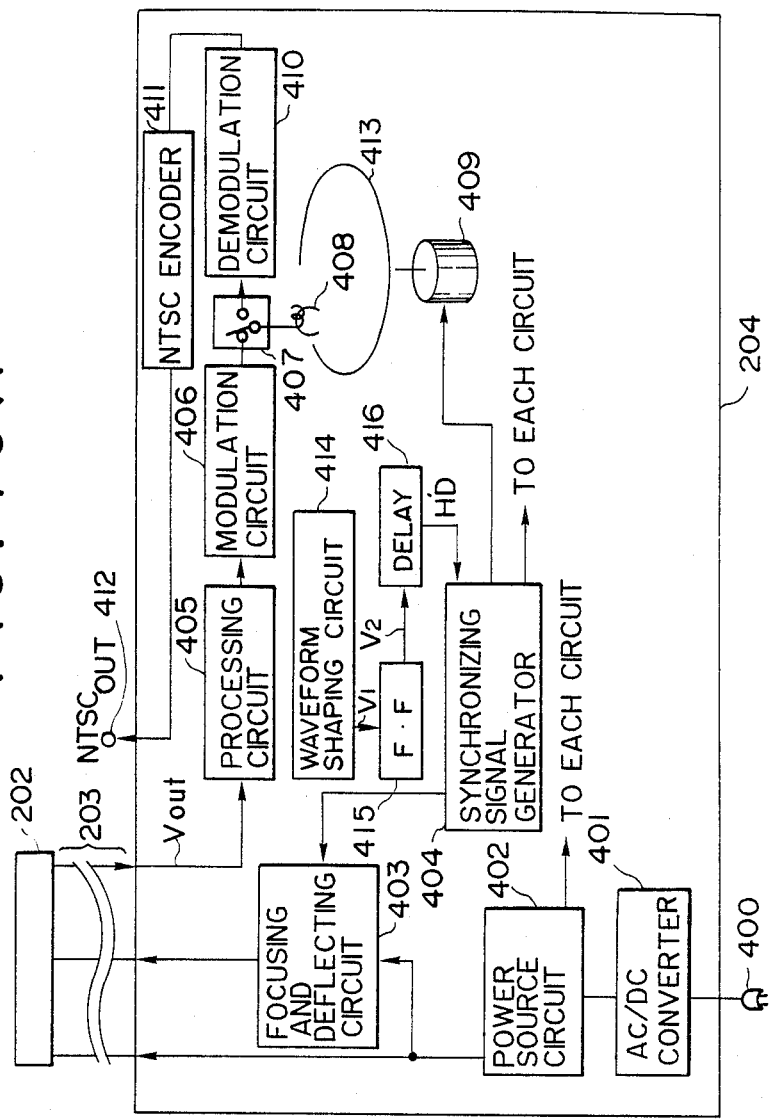
FIG. 40A is a schematic view of the example of the recording and reproducing apparatus shown in FIG. 38.
Figure 40B:
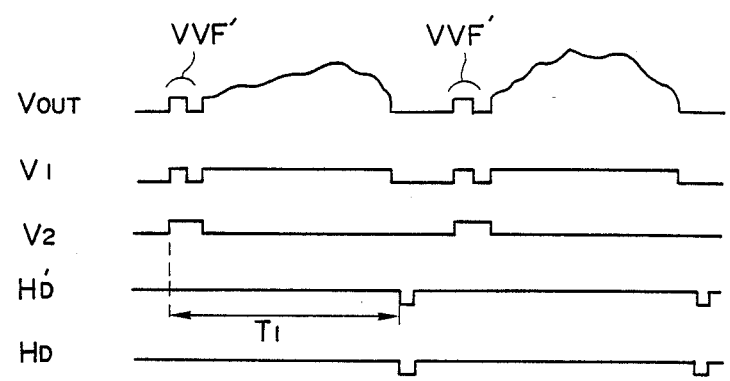
FIG. 40B is an operation timing chart of the recording and reproducing apparatus shown in FIG. 40A.

FIGS. 40A and 40B are illustrations of the construction of an image recording and reproducing unit suitable for use in the embodiment shown in FIG. 17 and a waveform chart illustrating the operation of the image recording and reproducing unit. The circuit arrangement shown in FIG. 40A features a wave shaping circuit 414, flip-flop circuit 415 and a delay circuit 416 in addition to the circuit elements explained in connection with FIG. 8. The operation of these additional circuit elements will be explained with reference to FIG. 40B. Operations of other portions are materially the same as those in the circuit arrangement explained before in connection with FIG. 8.

The video signal $V_{OUT}$ supplied to the processing circuit through the cable 203 via the connector 202 includes, in the beginning of the horizontal scan period, a signal portion VVF' from the reference aperture VF'. The wave shaping circuit 414 clips the signal $V_{OUT}$ at a predetermined threshold level so as to form a signal $V_1$. The flip-flop 415 inverts the state in response to each rise of the clipped signal $V_1$ so as to form a synchronizing signal $V_2$ corresponding to the reference aperture VF' as shown in FIG. 40B. The delay circuit 416 operates to delay the signal by a time $T_1$ which is slightly shorter than the horizontal scan period, so as to form a pulse H'D of a suitable pulse width. A horizontal synchronizing pulse HD from the synchronizing signal generating circuit 404 is phase-locked by this pulse H'D.

With this arrangement, horizontal synchronization is achieved automatically in reading successive images from the image accumulator 4, so that undesirable lateral offset of the frame on the monitor TV is prevented and the necessity for any manual adjustment for attaining horizontal synchronization is eliminated.

In this embodiment, the reference aperture is provided at a position corresponding to the beginning portion of the horizontal scan period. This, however, is not exclusively the case and the reference aperture may be provided at a portion corresponding to the end portion of the horizontal scan period. The area of scan by the electron beam is preferably sized to be slightly greater than the required size, in order to allow the reference aperture to be detected. In such a case, the width of the horizontal blanking period is shortened correspondingly.

Although in the described embodiment a reference aperture is provided at a position corresponding to the beginning or ending portion of the horizontal scan period, it is possible to substitute such a reference aperture by a frame of a metallic film formed around each image frame. Arrangements also may be made for a reference aperture or a metallic film to be provided at a position corresponding to the beginning or ending portion of the vertical scan period.

The embodiment shown in FIGS. 38 to 40 enables the electron beam to precisely scan the image frame, so that a high reading accuracy is obtained even when there is a slight error in the control of running of the film-like image accumulator. It is also possible to search a desired image from a plurality of images recorded therein.

Figure 41:
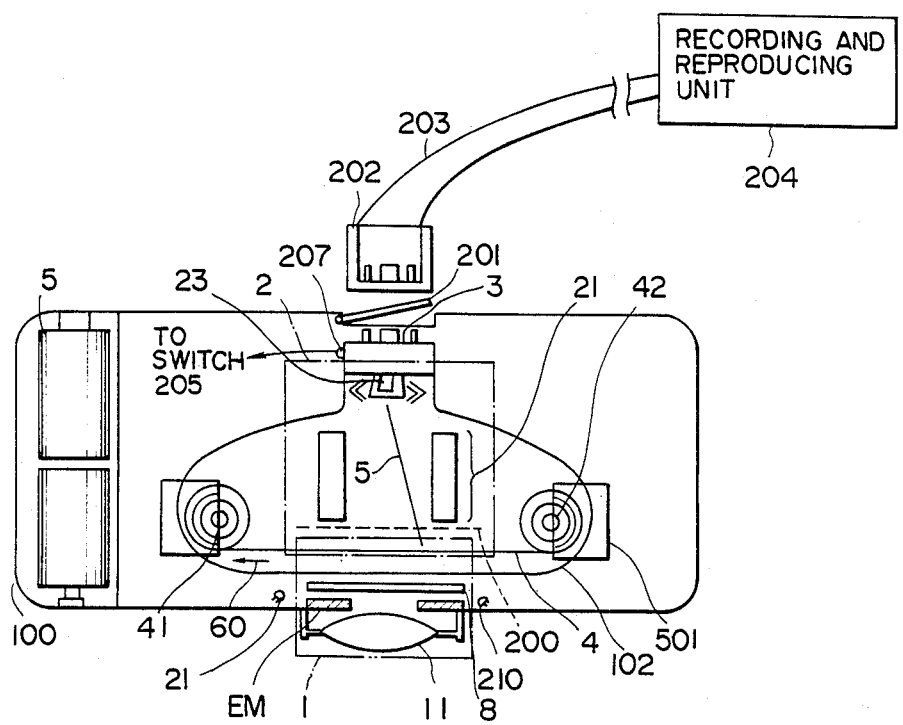
FIG. 41 is a schematic partially cut away top plan view of an eighteenth embodiment of the recording and/or reproducing apparatus in accordance with the present invention.
Figure 42:
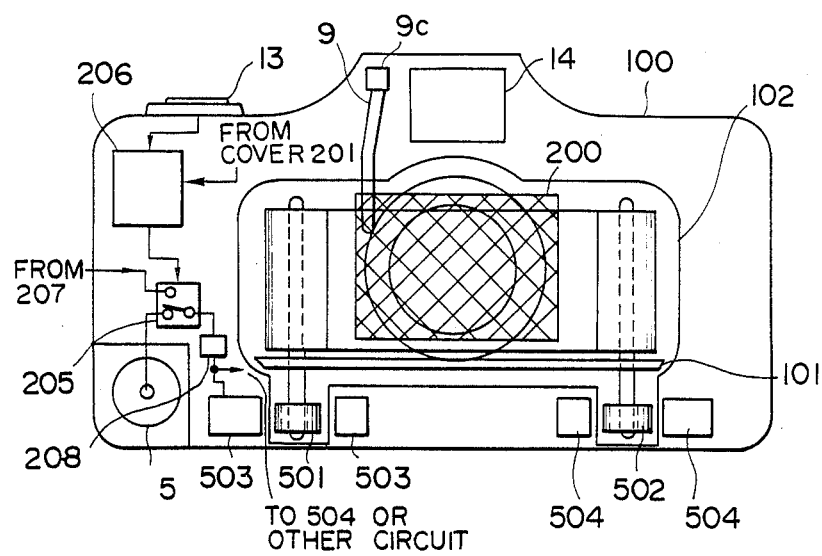
FIG. 42 is a schematic front elevational view of the eighteenth embodiment of the present invention.
Figure 43:
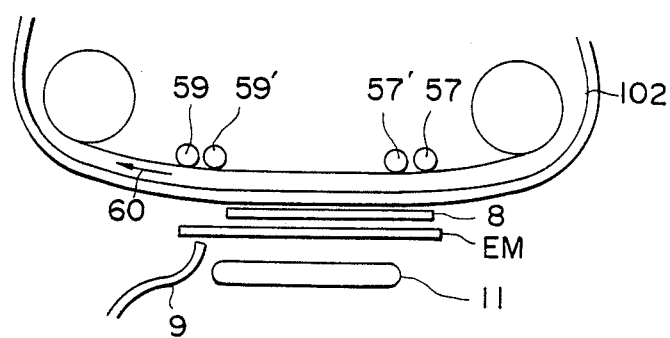
FIG. 43 is a schematic view of the recording part in the eighteenth embodiment as viewed from the upper side thereof.
Figures 44A, 44B:
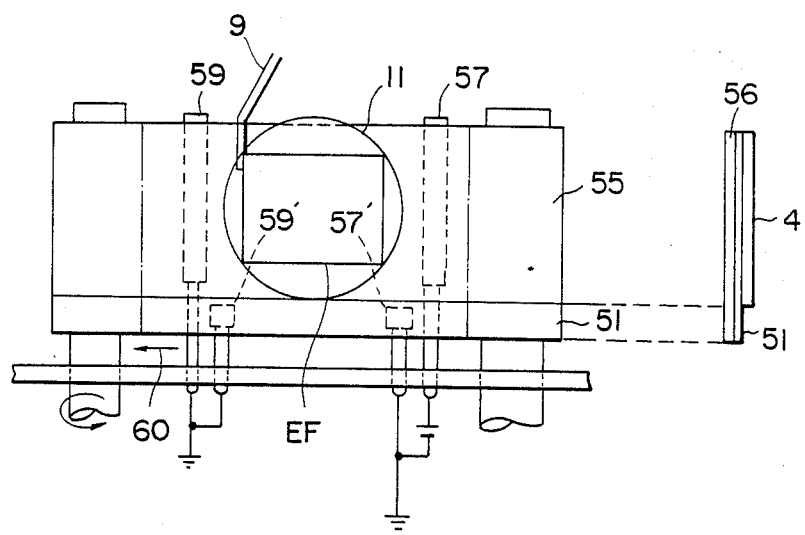
FIG. 44A is a schematic front elevational view of the recording part as shown in FIG. 43.
FIG. 44B is an illustration of the essential portion as viewed from a lateral side of the arrangement shown in FIG. 44A.

FIGS. 41 and 42 are a transparent top plan view and a front elevational view of an eighteenth embodiment of the image recording and/or reproducing apparatus in accordance with the present invention. This embodiment is descriminated from the embodiment shown in FIGS. 1 and 2 by the provision of a fiber glass portion 9 and a color-temperature detection window 9C, as well as by a color filter array 8 provided on the front side of the image accumulator 4. The fiber glass portion 9 receives at its one end the light from the color temperature detection window having a white color diffusion plate, while the other end is constructed so as to be able to apply the light to a portion of the image accumulator 4 in the vicinity of the effective frame EF through the exposure member EM as shown in FIGS. 43 and 44.

In operation, after uniformly charging the surface of the image accumulator 4, the shutter switch 13 is operated into the full-switching state, thereby activating the exposure member EM, so that the image accumulator 4 is exposed to a predetermined quantity of light through the optical system 11 and the color filter array 8. In consequence, the image is recorded in the state as shown in FIG. 4B.

At the same time, recording of three separated colors, e.g., R, G and B is made in a region in the vicinity of the image recording portion EF, through the fiber glass portion 9.

Figure 45:
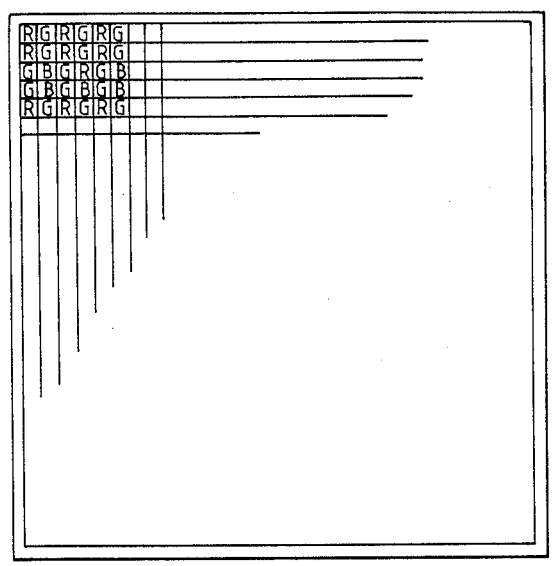
FIG. 45 is an illustration of an example of a color filter pattern.

FIG. 45 shows an example of the color filter array 8. This color filter array employs, only by way of example, R (red), G (green) and B (blue) color filters. These color filters are arrayed in accordance with a pattern known as "Beyer pattern". Needless to say, the color filter array 8 preferably employs as many color filters as possible.

It is of course possible to employ a quartz filter for the purpose of elimination of Moire, although it is not shown in the drawings. The quartz filter, if employed, is positioned immediately in front of the color filter array.

Figure 46:
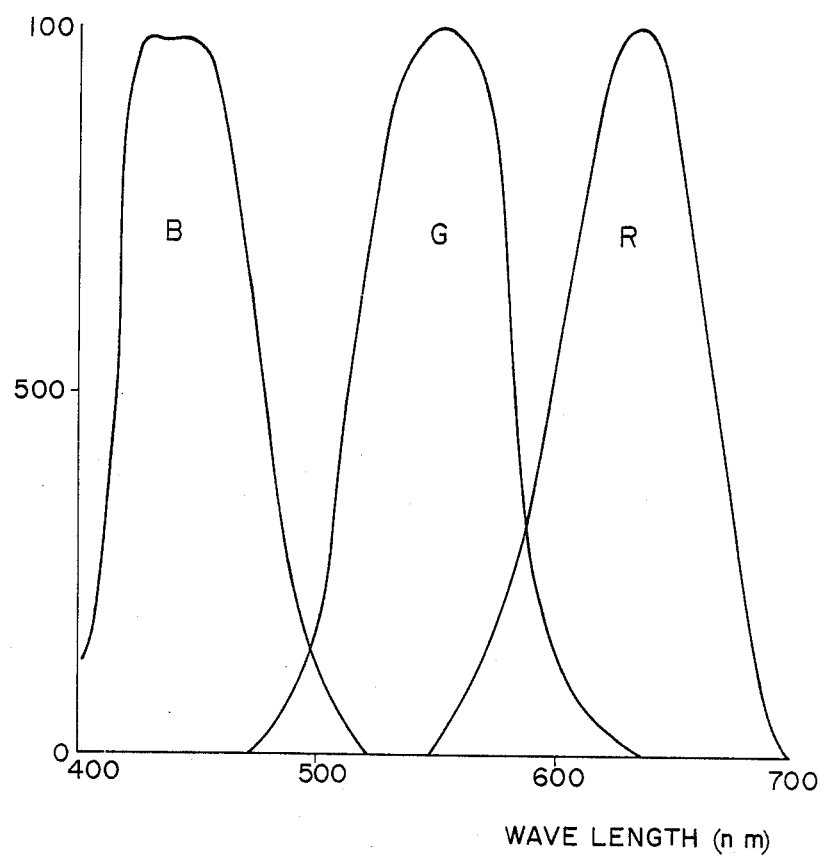
FIG. 46 is a spectral characteristic chart of a color filter.

FIG. 46 shows the spectral sensitivity characteristics of the color filter. When the NTSC system is employed, the filters should show spectral characteristics approximating those specified for R, G and B colors by the NTSC.

Figure 47:
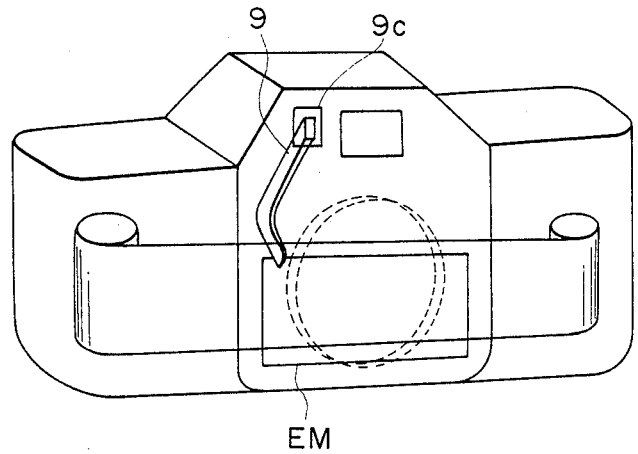
FIG. 47 is a schematic perspective view of a camera of the present invention using fiber glass.

FIG. 47 is a perspective view of a fiber glass for transmitting the light from a light source. The light from the source impinges upon one end 9a of the fiber glass exposed at one side of the finder and is passed to the other end 9b of the fiber glass which is positioned in the vicinity of the film-type image accumulator 4, thus applying the light of three colors as reference lights to the image accumulator the rough the exposure member EM.

Figure 48:
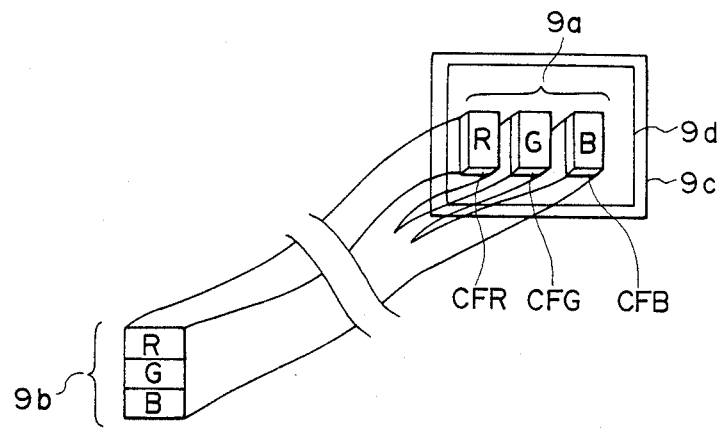
FIG. 48 is an illustration of fiber glass used in the present invention.

FIG. 48 shows the form of the fiber glass around its output end. As will be seen from this Figure, filters CFR, CFG and CFB of three colors R, G and B are adhered to the end surface 9a. These filters have spectral characteristics which are the same as those of the filters R, G and B of the color filter array 8. A white color diffusion plate $9_0$ is disposed on the incidence side of the filters CFR, CFG and CFB. The light from the light source is detected by this diffusion plate.

Figure 49:
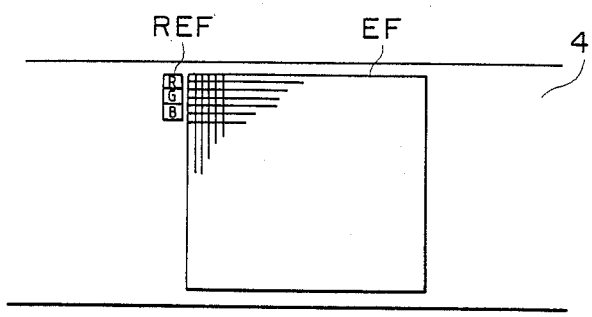
FIG. 49 is an illustration of an example of the position for recording reference color on an image accumulator.

FIG. 49 shows an example of the recording of image on the image accumulator. The reference lights introduced through the fiber glass after passing through the filters R, G and B are recorded in a reference region REF adjacent to the recording portion EF where the optical image is formed.

A description will be provided hereinunder of the method of utilization of the record formed by the fiber glass portion in the location and color balancing during the reading of the recorded image.

Figure 50:
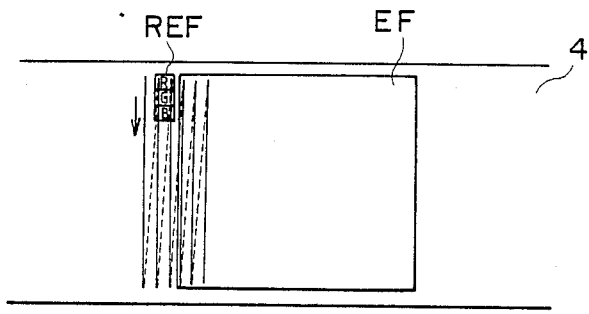
FIG. 50 is an illustration of an example of the beam scanning direction.

FIG. 50 exemplarily shows the direction and sequence of the reading scanning by an electron beam.

Figure 51:
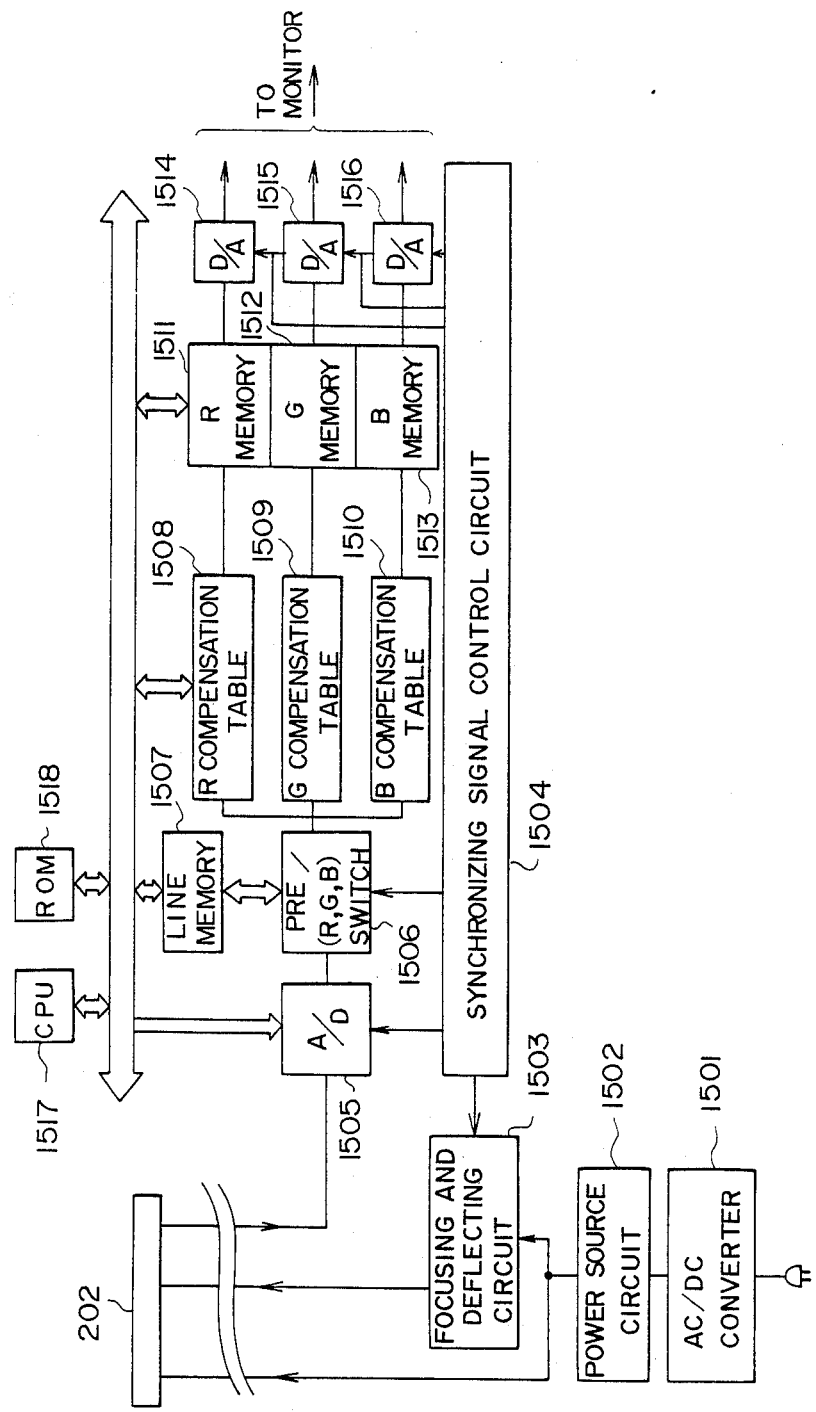
FIG. 51 is a block diagram of a nineteenth embodiment of the image recording and/or reproducing apparatus present invention.

FIG. 51 is a block diagram of the signal recording and reproducing unit. This unit includes an AC/DC converter 1501, a power supply circuit 1502, a focusing deflection circuit 1503, a synchronizing signal control circuit 1504, an A/D converter 1505 and a pre-/(R,G,B) change-over switch 1506 for conducting a switching between a state in which the output from the A/D converter 1505 is delivered to the line memory 1507 and another state in which the same is delivered to later-mentioned tables 1508 to 1510.

The tables 1508 to 1510 are ROM tables for conducting later-mentioned correction by means of R, G and B correction tables. Numerals 1511 to 1513 denote R, G and B memories, respectively, while 1514 to 1516 denote D/A converters the outputs of which are delivered to a monitor which is not shown.

Numerals 1517 designates a CPU, while a numeral 1518 denotes a ROM.

The operation of the processing circuit will be explained hereinunder with reference to FIG. 51.

Figure 52:
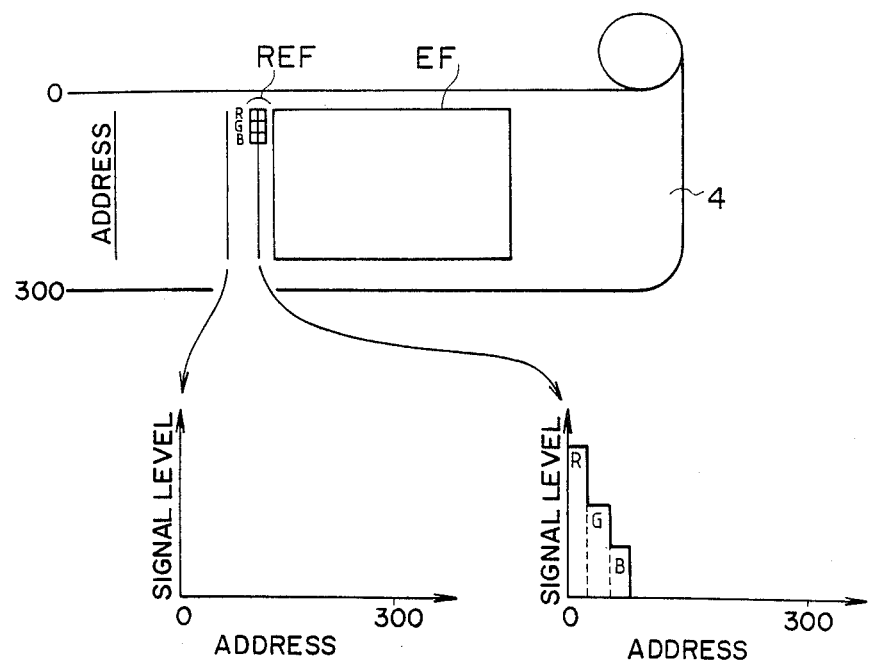
FIG. 52 is an illustration of the output from a reference color recording part.

The scanning with the electron beam is commenced in the direction as shown in FIG. 50, and data is picked up through the A/D converter 1505. In this state, the change-over switch 1506 is in the pre-position. Therefore, the line memory 1507 stores data corresponding to one vertical scanning line. A CPU conducts a scanning through the line memory so as to judge whether there is any data in the line memory. When the scanning beam reaches the recorded region REF formed by the fiber glass, the CPU judges that data exists and stores the data transmitted through the R, G and B filters in accordance with the scanning address. The state of storage of the data is shown in FIG. 52.

The CPU then skips over next several lines in accordance with the scanning density, operates the change-over switch 1506 so as to connect to the correction tables 1508, 1509 and 1510 for the respective colors R, G and B. As a result, the RGB pattern in the recording portion EF in which image has been recorded through the color filter array are changed-over in synchronization with the gate signals which have 120° phase difference. In consequence, the R signal, G signal and the B signal are delivered to the R correction table, G correction table and B correction table, respectively.

The respective correction tables are constituted by ROM tables which receive both the signal levels of R, G and B color signals of the light source stored through the R, G and B filters when the change-over switch is in the preposition and the levels of the signals derived through the actual scanning from the image recorded in the effective field of the image accumulator.

In order to obtain a color balance of the image, gains for the respective colors are adjusted such that the levels of the three color signals obtained from the reference color recording region REF are equalized, and changing the levels of the image color signals in accordance with the thus determined gains.

The output signals R', G' and B' are given by the following formulae:

$$R' = \frac{MA \times R}{LR} \times R \times C$$

$$G' = \frac{MA \times G}{LG} \times G \times C$$

$$B' = \frac{MA \times B}{LB} \times B \times C$$

where LR, LG and LB represent the levels of the signals derived from the reference color recording region REF, R, G and B represent the input signals, and MAXR, MAXG and MAXB represent the upper limits of the signal levels of the respective colors in the reference color recording region.

In these formulae, a symbol C represents a constant which commonly applies to all these formulae determining the output levels R', G' and B'. The values of the output levels R', G' and B' for the respective combinations of R and LR, G and LG and B and LB are stored in the ROM tables 1508 to 1510.

Figure 53:
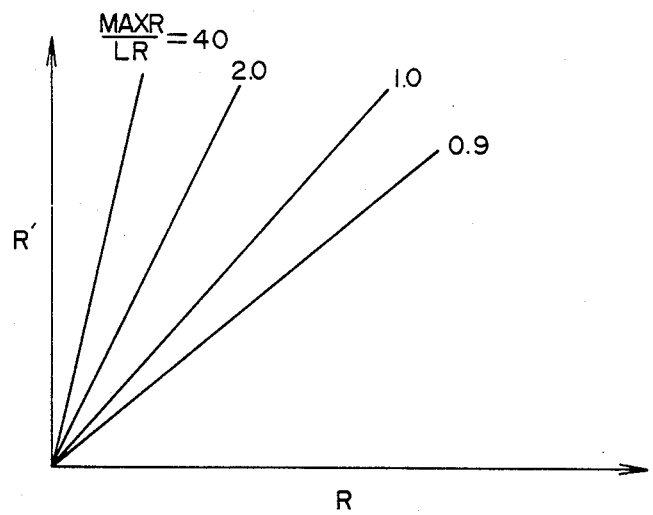
FIG. 53 is an illustration of an example of the characteristics of a correction table.

An example of the characteristic of the data concerning R will be explained hereinunder with reference to FIG. 53.

As the scanning is commenced on the effective field EF where the image is recorded, one of the conversion tables in the respective tables 1508 to 1510 is selected in accordance with the values of LR, LG and LB which have been stored beforehand, and the correcting operation is made for the respective colors in accordance with the selected conversion tables. The corrected values are then stored in the R, G and B memories 1511, 1512 and 1513.

The stored values are then converted into analog signals by the D/A converters 1514 to 1516 and the thus obtained analog signals are delivered to the monitor which is not shown.

In this embodiment, the image accumulator is sealed in the container 102. This, however, is not exclusive and the arrangement may be such that the wall thickness of the beam landing portion of the container 102 is reduced and the image accumulator is held in close contact to the external surface of the beam landing portion from the outside of the container 102 so that the beam is applied to the image accumulator through the wall of the container, thereby reading the image stored in the image accumulator in the form of electrostatic charges.

The image accumulator may be of any type capable of chemically accumulating images in accordance with the optical image patterns, although in the described embodiment the image accumulator is made of a photoconductive material.

The reference colors to be recorded on the image accumulator need not always be the combination of R, G and B colors. For instance, only the R and B colors may be recorded as the reference colors because the color temperature information can be expressed only by these two colors. Alternatively, the color temperature information to be recorded on the image accumulator may be formed by a combination of complementary colors.

It is also to be understood that the direction of the scanning by the beam may be the same as the direction of feed of the image accumulator, although in this embodiment the scanning by the beam is conducted in the direction perpendicular to the direction of feed.

As will be understood from the foregoing description, this embodiments enables color images to be recorded at a high level of resolution, as well as recording of the information concerning the light source, so that correction of color balance (white balance), which has been difficult to conduct in the prior art, can be conducted without difficulty even after the exposure.

Figure 54:
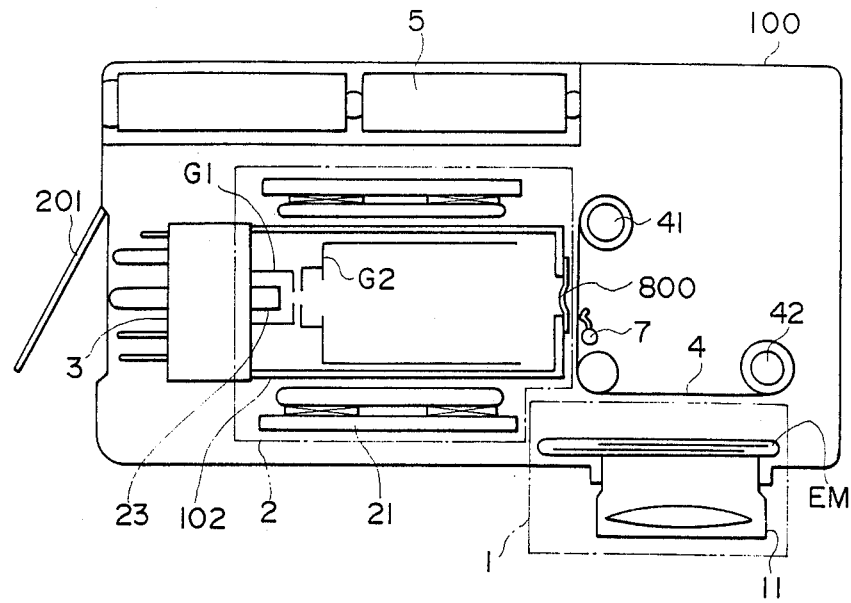
FIG. 54 is a schematic partially cut away top view of a twentieth embodiment of the image recording and/or reproducing apparatus in accordance with the present invention.
Figure 55:
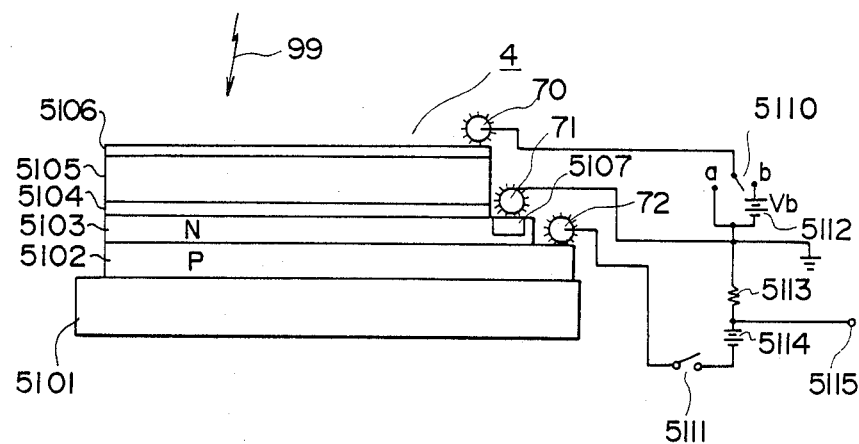
FIG. 55 is an illustration of the recording and reproducing method by the apparatus of the twentieth embodiment.

FIG. 54 shows a twentieth embodiment of the recording and/or reproducing system in accordance with the present invention, while FIG. 55 is an illustration of the recording and reproduction of images in the twentieth embodiment.

The twentieth embodiment of the apparatus in accordance with the present invention is basically composed of the following constituents: a film-type image accumulator 4 for electronically accumulating images; an image recording part 1 including an exposure member EM and other members necessary for the exposure of the image accumulator to an image; a beam scanning unit 2 for scanning, by means of an electron beam, the image accumulator 4 in order to read the images accumulated in the image accumulator 4; and a connector unit 3 including input terminals connected to an external power supply for driving the beam scanning unit 2 and an external driving circuit for inputting focusing and deflection signals, as well as output terminals for delivering signals to external memory and other external devices from a detection unit 7 which is composed of a plurality of rollers 70 to 72 as shown in FIG. 55.

To explain in more detail, the recording unit 1 includes an optical system 11 and an exposure member EM having an aperture, shutter and so forth. The quantity of light of the optical image passed through the optical system 11 and the length of time for which the light is passed through the optical system 11 are controlled by the exposure member EM.

The image accumulator 4 is wound at its both ends on winding shafts 41 and 42 so as to be stretched therebetween. The beam scanning unit 2 includes a scan control section which forms an electric field or a magnetic field which is controllable so as to deflect an electron beam from an electron gun 23 thereby allowing the electron beam to correctly scan the aimed area of the imge accumulator 4.

The electron beam emitted from the electron gun 23 and focused and deflected by the beam control section 21 is then applied to the image accumulator 4 through an electron transmitting window 800 in the form of a thin film. As a result of application of the electron beam, the accumulator 4 emits a current. This current is detected by the detection unit 7 mentioned before. Lead lines (not shown) are extended from the detection unit 7 to the output terminals in the connector 3.

The electron gun 23 as a beam generator and grids G1 and G2 are accommodated by the container 102 the interior of which is evacuated to a certain level of vacuum. The power supply terminals for the electron gun 23 and the beam control unit 21, as well as signal input terminals and signal output terminals associated with these parts, are installed in the connector 3.

The connector 3 is normally closed by a cover 201 but can be exposed to the outside of the camera 100 as the cover 201 is opened. A connector for supplying power control and beam focusing and deflecting signals from an external recording and reproducing unit (not shown) to the camera 100, as well as for receiving image signals output from the camera 100, can be connected to the connector 3 after opening the cover 201.

During the recording of images by the camera 100, the power is supplied from a battery pack 5 attached to the camera 100. Application of a bias voltage to the image accumulator is conducted by making use of the power supplied from the power pack 5. The power from the power pack 5 also is used for the purpose of intermittently feeding the image accumulator so that different images can be recorded in the form of electrostatic latent images in successive frames on the image accumulator 4.

When reading the recorded image, the connector of the external recording and reproducing unit is connected to the connector 3 of the camera 100. As a result of opening of the cover 201 in advance of the connection, the power supply line is switched so that the power is supplied from an external power supply annexed to the external recording and reading unit.

Thus, the camera itself has only a small power supply which enables the camera to record images, whereby the size of the camera is reduced.

In addition, since the power supply is switched between the external power supply and the internal supply in response to the operation for connecting the camera 100 to the external image recording and reproducing unit, the reading of the images from the image accumulator in the camera 100 can be conducted without consuming the internal power supply annexed to the camera 100, thus saving the power of the internal power supply having a limited capacity.

Furthermore, a large quantity of images can be recorded at a high level of resolution because the image accumulator 4 is movable in the camera 100.

It is to be noted also that the reading can be carried out by a simple operation without necessitating any large-scale reading apparatus which is required by the conventional apparatus of the type described.

The recording of the image on the image accumulator 4 may be in various forms of an electronic latent image pattern, e.g., electrostatic latent image or distribution of electronic traps.

When the latent image pattern is scanned by the electron beam, secondary electrons are emitted from the image accumulator. The quantity of the emitted secondary electrons varies depending on the contrast of the latent image scanned by the electron beam. It is therefore possible to detect the contrast of the image by detecting the rate of emission of the secondary electrons and, therefore, to read the recorded images in the form of time-series electric signals. However, the arrangement is preferably such that the image is read through the detection of electric current in the image accumulator in response to the application of the electron beam.

The tape-like form of the image accumulator 4 also is not exclusive. Namely, the image accumulator 4 can have the form of a rotaty disk composed of a glass disk as a substrate and an image accumulating layer formed on this substrate. This type of image accumulator can ensure a high degree of flatness of the image accumulator surface. It is also possible to construct the image accumulator 4 in the form of a slide plate constituted by a glass substrate and an image accumulating layer.

A detailed description will be provided hereinunder of the constructions of the significant portions of the image recording and/or reproducing apparatus of the invention.

The explanation will be first provided of the construction of an image accumulator and a recording method which do not make use of the returning beam and the secondary electrons during reading of the recorded images.

FIG. 55 shows an example of the image accumulator used in this embodiment. The image accumulator 4 generally has the form of a film constituted by a laminated structure including a plurality of layers: namely, a transparent film substrate 5101, a P-type semiconductor layer 5102, an N-type semiconductor layer 5103, an insulating layer 5104, a photoconductive layer 5105 and a conductive layer 5106.

A detailed description will be made hereinunder as to each of these layers. The transparent film substrate 5101 is made of a material having high levels of flexibility and light-transmittance, as well as a strength large enough to prevent the image accumulator 4 from being torn by a tension applied during the loading. This substrate film is preferably made from a polymeric material such as polyethylene terephthalate, polyimide or the like, although metallic materials can be used satisfactorily.

In order to realize the required properties mentioned above, the substrate film preferably has a thickness of 10 to 50 $\mu$m, when the film material is polyethylene terephthalate and when the film material is polyimide, respectively.

The conductive layer 5106 is a thin film made of a metal such as aluminum and is formed by evaporation deposition to a thickness of several hundreds of μm so as not to impede the introduction of the electron beam during reading.

The P-type semiconductor layer 5102 is a layer composed of a known P-type silicon semiconductor doped with, for example, boron. In order to attain a high recording density, the P-type semiconductor layer 5102 preferably has a thickness which is not greater than several μm.

The N-type semiconductor layer 5103 is a layer composed of a known N-type silicon semiconductor doped with, for example, phosphorus. In order to increase the efficiency of generation of electron-hole pairs in the semiconductor in response to the reading electron beam so as to attain a high resolution with low accelerating voltage for the electron beam, the thickness of this layer 5103 is preferably not greater than 10 μm, more preferably not greater than 1 μm. When the thickness is below 1 μm, it is possible to attain a high resolution on the order of 1000 lines/mm.

The insulating layer 5104 is a layer made of SiO$_2$ or the like material and haiing a thickness on the order of several thousands of A. This layer is formed by forming N-type silicon and keeping the same in dry oxygen at a high temperature of about 1000° C. for more than 10 hours.

The photoconductive layers 5105 is formed by RF spattering or a similar method from an N-type photoconductive material such as CdS, CdSe and ZnO. The photoconductive layer formed by thus formed should have a thickness which is not greater than several μm, in order to improve the resolution and the efficinecy of the irradiation with light. A reference numeral 5107 designates an N+ type semiconductor diffusion section, 5110 and 5111 denote switches, 5112 and 5114 denote power supplies, 5113 denotes a resistor and 5115 denotes an output terminal.

The recording of images on this image accumulator is conducted in a manner which will be explained hereinunder.

The switch 5110 is turned to connect to the terminal b, while the switch 5111 is turned off, so that a DC voltage Vb is applied by the power supply 5112 between the conductive layer 5106 and the N-type semiconductor layer 5103 of the image accumulator such that the potential of the photoconductive layer 5106 is positive. The voltage Vb thus applied preferably is on the order of several tens of volts. At the same time, a voltage is applied to the layer 5103 through the N+ diffusion section 5107. Then, the image accumulator with the voltage Vb applied thereto is exposed to an object image for a predetermined time through the exposure member EM in the device shown in FIG. 54. In consequence, electron-hole pairs are generated in the regions of the photoconductive layer 5105 which have been exposed to the light from the object. Under the influence of the external magnetic field, the electrons and the holes of the thus generated electron-hole pairs are moved towards the conductive layer 5106 and towards the insulating layer 5104, respectively. The holes further penetrate into the insulating layer 5104 and are accumulated on the side of the insulating layer 5104 adjacent to the interface between the N-type semiconductor layer 5103 and the insulating layer 5104, and are stored to keep the image there. The movement of the holes into the insulating layer 5104 takes place for the following reasons. Namely, the photosemiconductor layer 5105 having N-type semiconductor characteristic exhibits P-type semiconductor characteristic in the region thereof adjacent to the insulating layer 5104, due to influence of the external electric field. In addition, the surface charges appear on the side of the insulating layer 5104 adjacent to the photoconductive layer 5105, due to the influence of the N-type semiconductor layer 5103. Thus, the injection of the holes into the insulating layer 5104 occurs due to the P-type characteristics exhibited by the photosemiconductor 5105 and the surface charges appearing on the side of the insulating layer 5104 adjacent to the photoconductive layer 5105. The holes, however, cannot come into the N-type semiconductor layer 5103 from the insulating layer 5104 because of a large gap of the energy level.

Thus, the holes are distributed in a pattern corresponding to the quantity of the incident light, thus recording the image in the form of electric charges.

A description will be provided hereinunder of the method of reading the image recorded in the image accumulator 4. The reading is conducted by allowing an electron beam 99 to access the image accumulator 4 through the window 800 under the deflection control so as to scan the surface of the image accumulator 4. For the purpose of reading a recorded image, the switch 5110 is connected to a terminal a, while the switch 5111 is turned on, thus equalizing the potentials of the conductive layer 5106 and the N-type semiconductor layer 5103, while applying a DC bias voltage from the power supply 5114 between the N-type semiconductor layer 5103 and the P-type semiconductor layer 5102. The biasing voltage preferably ranges between 10 and 20V, and the polarity is determined such that the N-type semiconductor layer 5103 exhibits positive polarity while the P-type semiconductor layer 5102 exhibits a negative polarity. Then, the conductive layer 5106 is irradiated and scanned by an electron beam of an energy level of about 15 KeV from the same side as the conductive layer 5106. The electron of the electron beam thus applied come into the N-type semiconductive layer 5103 through the conductive layer 5106, N-type photoconductive layer 5105 and the insulating layer 5104, so as to form electron-hole pairs in the N-type semiconductor layer 5103. The holes as the minor carrier of the pairs are then moved by diffusion. Since the N-type semiconductor layer has a small thickness which is not greater than 10 μm, the diffusion distance of the holes exceeds the thickness of the N-type semiconductor layer, the holes penetrate into the P-type semiconductor layer across the PN junction surface, so as to supply an electric current to an external circuit. The level of the electric current supplied to the external circuit varies depending on the pattern of distribution of the holes, so that the image is read by measuring this electric current through the output terminals 5115. In other words, the rate of recoupling of electrons and holes in response to the incident reading beam in the exposed region is different from that in the non-exposed region, because the charges (holes) have been accumulated in the exposed region. In consequence, the number of the holes which move across the PN junction varies depending on whether the region has been exposed or not. This variation causes a change in the electric current which in turn is read as the image signal through the output terminal 5115.

The image accumulator 4 has the form of a film, so that slide contacts or brush rollers 70 and 72 are preferably used as the detection unit 7 for the purpose of application of voltage to various parts of the image accumulator 4 or for the purpose of reading voltages therefrom.

In this embodiment, in order to attain an ohmic contact between the slide contact or roller 71 and the N-type semiconductor layer 5103, an N+ type semiconductor portion 5107 is provided on the region contactable with the roller 71 and this portion 5107 is covered by a conductive layer. In consequence, the wear resistance is remarkably improved when the brush roller is used.

A description will be provided hereinunder as to the method of applying electron beam to the image accumulator 4, with specific reference to FIG. 54.

The electron gun 23 as the source of electrons may be an ordinary thermal electron source, but an electron source of the type which produces electrons from a semiconductor substrate by avalanche effect and induces these electrons into a vacuum can be used equally well. This type of electron source is disclosed, for example, in Japanese Patent Publication No. 30274/1979, Japanese Patent Laid-Open No. 111272/(U.S. Pat. No. 4,259,679), Japanese Patent Laid-Open No. 15529/1981 (U.S. Pat. No. 4,303,930) and Japanese Patent Laid-Open No. 38528/1982. It is also possible to use, as a solid electron beam source making use of a PN junction, an electron source of negative work function type which operates in response to a forward bias, an electron source of so-called electric field discharge type, and so forth are usable equally.

The window 800 for transmitting electrons may be made of a NB or an SiC film having a thickness on the order of several $\mu$m. It has been confirmed that the window 800 having such a construction allows about 90% of electron rays of about 25 KeV to be transmitted to the atmosphere.

Preferably, the window for transmitting the electrons is made of a material having a comparatively small atomic number. Thus, an insulating material such as mica and metallic material such as Al or Ti, as well as BN and SiC mentioned above, can be used suitably as the material of the electron transmitting window. When a metallic thin film is used as the material of the electron transmitting window 800, the acceleration voltage may be applied directly to this window. The window 800 serves also as a member which seals the interior of the container, so that it is required to have a strength to withstand atmospheric pressure. To this end, it is preferred that a comparatively thick metal mesh is provided on the vacuum side of the window so as to increase the mechanical strength. Such a reinforcement means, however, may be neglected provided that the size of the window 800 is not so large. In order to keep the recorded image in good condition, the image accumulator 4 is preferably spaced from the window by a small distance, e.g., several to several hundreds of $\mu$m, although it may be held in close contact with the window 800. Thus, it is to be understood that the term "in the vicinity of" is used to cover both the cases where the image accumulator directly contacts with the window and the case where the same is slightly spaced from the latter.

As explained before, in this embodiment, it is preferred that the reading electron beam is applied from the side which is opposite to the substrate film 5101. This embodiment is characterized also in that the light from the object image impinges upon the conductive layer 5106 which is on the side of the image accumulator 4 opposite to the substrate film 5101. Preferably, the conductive layer 5106 is made a transparent electrode material such as ITO or an extremely thin layer of Au, Ag and Cu having a very small thickness of several to several hundreds of nm. The light from the object image may impinge upon the image accumulator from the same side as the substrate film 5101. In such a case, however, it is essential that the substrate film 5101 be transparent.

Although in this embodiment the recording part 1 and the beam scanning unit 2 are integrated within the camera, this is not exclusive and the arrangement may be such that the recording part 1 and the beam scanning unit 2 are constructed as separate units, while the image accumulator 4 and the rollers 70 and 72 are accommodated by a cassette-like structure so as to facilitate mounting and demounting to and from the camera body, since the recording and the reading may be conducted without placing the image accumulator 4 in the vacuum. It is also possible to provide a power supply 5112, 5114 in the cassette for supplying electric power necessary for the recording. In such a case, the arrangement is preferably such that signal pins for signals used for the purpose of determining the timing of application of bias voltage during exposure are automatically connected to the camera as the cassette is mounted on the camera.

When the power supply 5112, 5114 and the associated circuit are built-in the camera, the image accumulator can have a form similar to that of ordinary silver salt film accommodated in a patrone. In such a case, exposure can be conducted satisfactorily by making use of the brush-type electrodes mentioned before.

Thus, the described embodiment offers an advantage in that the construction is simplified because no movable part is housed by the vacuum container. In addition, a large quantity of images can be stored without requiring any the external memory, because a multiplicity of images can be recorded only by using a plurality of image accumulators in the form of films.

What we claim is:

1. An image recording and/or reproducing apparatus comprising:
    a photoelectric conversion member for converting an optical image into electrical image data, said photoelectric conversion member being in the form of a thin film on a base member;
    means for applying light from predetermined optical images to different areas on said photoelectric conversion member, thus accumulating a plurality of images on said photoelectric conversion member;
    scanning means for scanning said photoelectric conversion member with an electron beam; and
    means for sealing at least said photoelectric conversion means and said scanning means from the exterior of said apparatus.

2. An image recording and/or reproducing apparatus according to claim 1, further comprising biasing means for controlling the potential of a predetermined portion of said photoelectric conversion member.

3. An image recording and/or reproducing apparatus according to claim 1, wherein said applying means includes a plurality of color filters.

4. An image recording and/or reproducing apparatus according to claim 3, further comprising means for selectively displacing said plurality of color filters.

5. An image recording and/or reproducing apparatus according to claim 3, further comprising reference color forming means for accumulating the color of a light source on another portion of said photoelectric conversion member through color filters having different spectral characteristics.

6. An image recording and/or reproducing apparatus according to claim 5, further comprising a white-color diffusion means provided on the front side of said color filters.

7. An image recording and/or reproducing apparatus comprising:
(a) photoelectric conversion means for converting an optical image into electrical image data and for accumulating said electrical image data;
(b) scanning means for scanning said photoelectric conversion means with a beam;
(c) displacing means for displacing said photoelectric conversing means with respect to said scanning means and for rolling said photoelectric conversion means in a stack; and
(d) control means for equalizing the levels of potential of the obverse and reverse sides of said photoelectric conversion means before being rolled by said displacing means.

8. An image recording and/or reproducing apparatus according to claim 7, further comprising a metallic film, wherein said photoelectric conversion means is covered at one side by said metallic film.

9. An image recording and/or reproducing apparatus comprising:
(a) photoelectric conversion means for converting an optical image into electrical image data and for accumulating said electrical image data;
(b) scanning means for scanning said photoelectric conversion means with a beam;
(c) displacing means for displacing said photoelectric conversion means with respect to said scanning means;
(d) an internal power supply for supplying electric power to internal circuits other than said scanning means; and
(e) a connector for connecting an external power supply to said apparatus for supplying electric power at least to said scanning means.

10. An image recording and/or reproducing apparatus comprising:
(a) photoelectric conversion means for converting an optical image into electrical image data and accumulating said electrical image data;
(b) scanning means for scanning said photoelectric conversion means with a beam;
(c) displacing means for displacing said photoelectric conversion means with respect to said scanning means;
(d) a vacuum container housing said photoelectric conversion means, said scanning means and said displacing means; and
(e) driving means for driving said displacing means by applying an electromagnetic force externally of said vacuum container.

11. An image recording and/or reproducing apparatus according to claim 10, wherein said driving means is detachably secured to said vacuum container.

12. An image recording and/or reproducing apparatus according to claim 10, further comprising scanning means disposed between said driving means and said electromagnetic shielding means.

13. An image recording and/or reproducing apparatus comprising: a photosensitive member; driving means for moving said photosensitive member; scanning means for scanning said photosensitive member with a beam; a vacuum container housing said photosensitive member; and an optical system through which optical data is supplied to said photosensitive member from the outside of said vacuum container.

14. An image recording and/or reproducing apparatus comprising:
a vacuum container;
a beam generator disposed in said vacuum container for generating a beam for scanning a photosensitive material so as to read images in the form of electrostatic patterns on different portions of said photosensitive material; and
driving means disposed in said vacuum container for effecting a sub-scan by moving said photosensitive member with respect to said beam generator.

15. An image recording and/or reproducing apparatus comprising:
a photosensitive member capable of recording a plurality of image patterns on different portions thereof;
driving means for moving said photosensitive member;
reading means for scanning said photosensitive member with a beam so as to convert the data recorded on said photosensitive member into electrical signals;
a container hermetically accommodating at least said photosensitive member and having a planar inner wall; and
control means for controlling said driving means so as to selectively press a part of said photosensitive member against said planar inner wall of said container.

16. An image recording and/or reproducing apparatus according to claim 15, wherein said recording means includes means for manually moving said photosensitive member.

17. An image recording and/or reproducing apparatus according to claim 15, further comprising a rotatable disk, wherein said photosensitive member is provided on said rotatable disk.

18. An image recording and/or reproducing apparatus according to claim 15, wherein said disk includes a glass plate.

19. An image recording and/or reproducing apparatus according to claim 15, wherein said photosensitive member includes a photoconductive layer and a protective layer which protects said photoconductive layer from being directly irradiated by said beam.

20. An image recording and/or reproducing apparatus according to claim 15, wherein a light-shielding means is provided inside of said container except for a predetermined aperture.

21. An image recording and/or reproducing apparatus according to claim 20, wherein said light-shielding means is provided on the inner surface of said container.

22. An image recording and/or reproducing apparatus according to claim 15, further comprising means for electrostatically charging said photosensitive member or for removing charges therefrom.

23. An image recording and/or reproducing apparatus according to claim 16, wherein said beam is an electron beam and wherein said means for charging or removing charges employs said electron beam.

24. An image recording and/or reproducing apparatus according to claim 22, wherein said means for charging said photosensitive member includes means for varying the pressure acting on said photosensitive member.

25. An image recording and/or reproducing apparatus according to claim 22, wherein said beam is an electron beam and wherein the same surface of said photosensitive material is used as the surface for recording said image and as the surface which is scanned by the electron beam from said reading means.

26. An image recording and/or reproducing apparatus according to claim 25, further comprising pressing means provided on the reverse side of said surface of said photosensitive material and adapted for maintaining the flatness of said photosensitive member.

27. An image recording and/or reproducing apparatus according to claim 22, wherein said means for charging or removing charges is included in said driving means.

28. An image recording and/or reproducing apparatus according to claim 27, wherein said control means is adapted for selectively pressing said photosensitive member against said planar inner wall of said container by the operation of said means for charging or removing charges included in said driving means.

29. An image recording and/or reproducing apparatus according to claim 28, wherein said means for charging or removing charges is adapted for applying a predetermined level of tension to said photosensitive material.

30. An image recording and/or reproducing apparatus comprising: a photosensitive member; driving means for moving said photosensitive member; scanning means for scanning said photosensitive member with a beam; a vacuum container housing said photosensitive member, said driving means and said scanning means; and optical system through which optical data is introduced to said photosensitive member from the outside of said container; fixing means for integrally fixing said vacuum container and said optical system to each other; and a resilient member for resiliently supporting the integral vacuum container and optical system within a camera body.

31. An image recording and/or reproducing apparatus according to claim 30, further comprising a finder optical system, wherein said fixing means also said finder optical system to said vacuum container.

32. An image recording and/or reproducing apparatus comprising:
a photoelectric conversion member for converting an optical image into electrical image data, said photoelectric conversion member being constructed as a thin film formed on a predetermined base and adapted to be moved in a predetermined direction; and
means for introducing a plurality of optical images to respective different areas of said photoelectric conversion member, wherein said respective different areas are arrayed in a direction perpendicular to the direction of movement of said photoelectric conversion member.

33. An image recording and/or reproducing apparatus according to claim 32, further comprising a plurality of optical systems for introducing said optical images.

34. An image recording and/or reproducing apparatus according to claim 32, further comprising moving means for moving the optical axis of said optical system.

35. An image recording and/or reproducing apparatus according to claim 32, wherein said optical images have different spectral characteristics.

36. An image recording and/or reproducing apparatus according to claim 32, wherein said photoelectric conversion member is flexible and, is adapted to be wound in the form of a roll.

37. An image recording and/or reproducing apparatus according to claim 32, further comprising a vacuum container and an electron beam source therein, wherein said photoelectric conversion member is sealed in said vacuum container having said electron beam source.

38. An image recording and/or reproducing apparatus according to claim 32, further comprising a vacuum container and an electron beam source therein, wherein said photoelectric conversion member is adapted to be scanned by san electron beam while it is held in contact with the outer surface of said vacuum container having said electron beam source.

39. An image recording and/or reproducing apparatus according to claim 32, further comprising scanning means for scanning said photoelectric conversion member by applying an electron beam to said photoelectric conversion member.

40. An image recording and/or reproducing apparatus according to claim 39, further comprising a plurality of said scanning means.

41. An image recording and/or reproducing apparatus comprising:
a photoelectric conversion member capable of converting an optical image into electrical image data and constructed as a thin film formed on a disk-like base, said photoelectric conversion member being rotatable so that different portions thereof are adapted to receive optical images; and
means for introducing a plurality of optical images to respective different areas on said photoelectric conversion member arrayed in the radial direction of said photo-electric conversion member at each angular position of said photoelectric conversion member.

42. An image recording and/or reproducing apparatus comprising:
a photoelectric conversion member capable of converting an optical image into electrical image data and constructed as a thin film on a disk-like base; and
means for introducing a plurality of optical images to respective different areas on said photoelectric conversion member, whereby said photoelectric conversion member can store a plurality of images accumulated thereon, wherein marks are provided on said photoelectric conversion member to indicate reference positions of the respective images.

43. An image recording and/or reproducing apparatus according to claim 42, further comprising scanning means for scanning said photoelectric conversion member by applying an electron beam to said photoelectric conversion member.

44. An image recording and/or reproducing apparatus according to claim 42, wherein said marks are provided on a plurality of portions of said photoelectric conversion member before said plurality of optical images are introduced to said respective different areas on said photoelectric conversion member.

45. An image recording and/or reproducing apparatus according to claim 42, wherein said marks are formed on said photoelectric conversion member simultaneously with the introduction of the optical image to said photoelectric conversion member.

46. An image recording and/or reproducing apparatus comprising: a beam generator having a window portion in the form of thin film for introducing an electron beam to a photoelectric conversion member disposed in the vicinity of said beam generator and carrying electrical image data accumulated thereon; and scanning means for scanning said photoelectric conversion member with said electron beam; wherein said photoelectric conversion member in which still image data are accumulated on different areas thereon is selectively moved to bring said areas to a position in the vicinity of said beam generator, thus enabling said still image data to be read by said electron beam.

47. An image recording and/or reproducing apparatus according to claim 46, further comprising displacing means for displacing said photoelectric conversion member with respect to said window; and a cartridge holding said photoelectric conversion member and said displacing means as a unit with each other.

48. An image recording and/or reproducing apparatus according to claim 47, wherein said cartridge is capable of accommodating a power supply for supplying electric power to said displacing means.

49. An image recording and/or reproducing apparatus according to claim 47, wherein said cartridge incorporates a biasing means for providing a predetermined bias potential to said photoelectric conversion member.

50. An image reproducing apparatus comprising: a beam generator having a window portion in the form of a thin film for introducing an electron beam to a photoelectric conversion member disposed in the vicinity of said beam generator and carrying electrical image data accumulated thereon; and scanning means for scanning said photoelectric conversion member with said electron beam, thus enabling said still image data to be read by said electron beam.

51. An image reproducing apparatus according to claim 50, further comprising driving means for displacing said photoelectric conversion member with respect to said window.

52. An image recording and/or reproducing apparatus comprising:
   (a) photoelectric conversion means for converting an optical image into an electrical image signal and for accumulating said electrical image signal;
   (b) scanning means for scanning said photoelectric conversion means with a beam;
   (c) displacing means for displacing said photoelectric conversion means with respect to said scanning means and for storing said photoelectric conversion means in a stack; and
   (d) biasing means for equalizing the levels of potential of the obverse and reverse sides of said photoelectric conversion means before being stored by said displacing means.

53. An image recording and/or reproducing apparatus according to claim 50, wherein said displacing means stores said photoelectric conversion means by rolling said photoelectric conversion means.

54. An image recording and/or reproducing apparatus according to claim 50, further comprising a metallic film, wherein said photoelectric conversion means is covered on one side by said metallic film.

* * * * *

UNITED STATES PATENT AND TRADEMARK OFFICE
CERTIFICATE OF CORRECTION

PATENT NO. : 4,786,971

DATED : November 22, 1988

INVENTOR(S) : Kaneko, et al.

It is certified that error appears in the above-identified patent and that said Letters Patent is hereby corrected as shown below:

AT [56] REFERENCES CITED:

"4,489,351 12/1984 d'Arc" should read --4,489,351 12/1984 d'Alayer de Cistemore d'Arc--.

AT [57] ABSTRACT:

Line 16, "recoding" should read --recording--.

FIG. 24B:

"SHUTTEN ON" should read --SHUTTER ON--.

FIG. 25:

Box 403, "FOCUSING AND DEFLECTING CIRCIT" should read --FOCUSING AND DEFLECTING CIRCUIT--.

COLUMN 1:

Line 66, "sizes" should read --size--.

UNITED STATES PATENT AND TRADEMARK OFFICE
CERTIFICATE OF CORRECTION

PATENT NO. : 4,786,971

DATED : November 22, 1988

INVENTOR(S) : Kaneko, et al.

It is certified that error appears in the above-identified patent and that said Letters Patent is hereby corrected as shown below:

COLUMN 8:

Lines 46 and 51, "illustration" should read --illustrations--.

COLUMN 9:

Line 47, "thereof," should read --thereof, wherein--.

COLUMN 10:

Line 31, "present" should read --of the present--.

COLUMN 11:

Line 7, "ends" should read --end--.

Line 44, change "through via" to --through--.

COLUMN 13:

Line 10, "a form" should read --the form--.

UNITED STATES PATENT AND TRADEMARK OFFICE
CERTIFICATE OF CORRECTION

PATENT NO. : 4,786,971            Page 3 of 9

DATED : November 22, 1988

INVENTOR(S) : Kaneko, et al.

It is certified that error appears in the above-identified patent and that said Letters Patent is hereby corrected as shown below:

COLUMN 17:

Line 1, "by" should read --by an--.

Line 46, "upon the" should read --upon--.

Line 59, "rolls" should read --rollers--.

COLUMN 19:

Line 27, "timeseries" should read --time-series--.

Line 32, "of" should read --of an--.

COLUMN 23:

Line 9, "several of" should read --several--.

Lines 47 and 65, "rolls" should read --rollers--.

COLUMN 24:

Line 27, "is" should read --are--.

Line 64, "roll," should read --roller,--.

UNITED STATES PATENT AND TRADEMARK OFFICE
CERTIFICATE OF CORRECTION

PATENT NO. : 4,786,971
DATED : November 22, 1988
INVENTOR(S) : Kaneko, et al.

It is certified that error appears in the above-identified patent and that said Letters Patent is hereby corrected as shown below:

COLUMN 26:

Lines 10 and 30, "roll" should read --roller--.

Line 59, "shown," should read --shows,--.

COLUMN 27:

Line 44, "(pottasium" should read --(potassium--.

Line 63, "arrows OF," should read --arrows F,--.

COLUMN 28:

Line 24, "itself" should read --themselves--.

COLUMN 30:

Line 22, "passes" should read --passed--.

Line 43, "exoosed" should read --exposed--.

COLUMN 31:

Lines 2 and 3, "substrating" should read --subtracting--.

UNITED STATES PATENT AND TRADEMARK OFFICE
CERTIFICATE OF CORRECTION

PATENT NO. : 4,786,971

DATED : November 22, 1988

INVENTOR(S) : Kaneko, et al.

It is certified that error appears in the above-identified patent and that said Letters Patent is hereby corrected as shown below:

COLUMN 32:

Line 59, "charged" should read --charge--.

COLUMN 33:

Line 35, "the main-scan" should read --of the main-scan--.

Line 66, "thateach" should read --that each--.

COLUMN 34:

Line 24, "grounding" should read --grounded--.

Line 30, "of to" should read --of--.

Line 40, "lane" should read --plane--.

Line 59, "Thus" should read --Thus,--.

COLUMN 35:

Line 34, "grounding" should read --grounded--.

UNITED STATES PATENT AND TRADEMARK OFFICE
CERTIFICATE OF CORRECTION

PATENT NO. : 4,786,971  Page 6 of 9
DATED : November 22, 1988
INVENTOR(S) : Kaneko, et al.

It is certified that error appears in the above-identified patent and that said Letters Patent is hereby corrected as shown below:

COLUMN 36:

Line 1, "on" should read --to an--.

Line 11, "grounding" should read --grounded--.

Line 35, "serves" should read --serve--.

Line 67, "as" should read --as a--.

COLUMN 37:

Line 4, "illustrates" should read --illustrate--.

COLUMN 38:

Line 13, "shaft." should read --shaft occur.--

Line 27, "GI" should read --G1--.

Line 38, "by moving" should read --moving--.

Line 40, "curves" should read --curved--.

Line 55, "system" should read --systems--.

Line 59, "requires" should read --require--.

UNITED STATES PATENT AND TRADEMARK OFFICE
CERTIFICATE OF CORRECTION

PATENT NO. : 4,786,971
DATED : November 22, 1988
INVENTOR(S) : Kaneko, et al.

It is certified that error appears in the above-identified patent and that said Letters Patent is hereby corrected as shown below:

COLUMN 39:

Line 10, "maybe" should read --may be--.

Line 30, "embodiment" should read --embodiments--.

Line 59, "4011" should read --4001--.

COLUMN 40:

Line 8, "are an" should read --are--.

COLUMN 41:

Line 55, change "descriminated" to --discriminated--.

COLUMN 42:

Line 33, "the rough" should read --through--.

COLUMN 43:

Line 36, "preposition" should read --pre-position--.

UNITED STATES PATENT AND TRADEMARK OFFICE
CERTIFICATE OF CORRECTION

PATENT NO. : 4,786,971

DATED : November 22, 1988

INVENTOR(S) : Kaneko, et al.

It is certified that error appears in the above-identified patent and that said Letters Patent is hereby corrected as shown below:

COLUMN 44:

Line 47, "embodiments" should read --embodiment--.

COLUMN 47:

Line 26, "haiing" should read --having--.

Line 27, "A." should read --Å.--.

Line 34, "formed by" should be deleted.

Line 36, "efficinecy" should read --efficiency--.

COLUMN 48:

Line 42, "electron" should read --electrons--.

COLUMN 49:

Line 14, "as to" should read --of--.

COLUMN 52:

Line 66, "claim 16," should read --claim 22--.

UNITED STATES PATENT AND TRADEMARK OFFICE
CERTIFICATE OF CORRECTION

PATENT NO. : 4,786,971
DATED : November 22, 1988
INVENTOR(S) : Kaneko, et al.

It is certified that error appears in the above-identified patent and that said Letters Patent is hereby corrected as shown below:

COLUMN 53:

Line 47, "means also" should read --means fixes also--.

COLUMN 54:

Line 6, "and," should read --and--.

Line 17, "san" should read --an--.

COLUMN 56:

Lines 26 and 30, "claim 50," should read --claim 52,--.

Signed and Sealed this

Twenty-seventh Day of March, 1990

Attest:

JEFFREY M. SAMUELS

Attesting Officer

Acting Commissioner of Patents and Trademarks